(12) United States Patent
Glew et al.

(10) Patent No.: US 10,032,542 B2
(45) Date of Patent: Jul. 24, 2018

(54) COMPOSITIONS FOR COMPOUNDING, EXTRUSION AND MELT PROCESSING OF FOAMABLE AND CELLULAR HALOGEN-FREE POLYMERS

(71) Applicant: CABLE COMPONENTS GROUP, LLC, Pawcatuck, CT (US)

(72) Inventors: Charles A. Glew, Charlestown, RI (US); Nicolas M. Rosa, Newtown, CT (US); David M. Braun, North Attleboro, MA (US); Richard W. Speer, Kernersville, NC (US)

(73) Assignee: Cable Components Group, LLC, Pawcatuck, CT (US)

( * ) Notice: Subject to any disclaimer, the term of this patent is extended or adjusted under 35 U.S.C. 154(b) by 0 days.

(21) Appl. No.: 14/934,792

(22) Filed: Nov. 6, 2015

(65) Prior Publication Data
US 2016/0133355 A1 May 12, 2016

Related U.S. Application Data

(60) Provisional application No. 62/076,736, filed on Nov. 7, 2014.

(51) Int. Cl.
*F16L 3/00* (2006.01)
*H01B 7/295* (2006.01)
(Continued)

(52) U.S. Cl.
CPC ............... *H01B 7/295* (2013.01); *H01B 1/02* (2013.01); *H01B 1/22* (2013.01); *H01B 3/004* (2013.01);
(Continued)

(58) Field of Classification Search
USPC ......................................................... 248/49
See application file for complete search history.

(56) References Cited

U.S. PATENT DOCUMENTS 3,624,250 A 11/1971 Carlson
4,029,868 A 6/1977 Carlson
(Continued)

FOREIGN PATENT DOCUMENTS

CN 103467850 A 12/2013
CN 103804775 A 5/2014
(Continued)

OTHER PUBLICATIONS

Extended European Search Report received in EP Application No. 15857512.6 dated Oct. 27, 2017; 7 pages.
(Continued)

*Primary Examiner* — Monica E Millner
(74) *Attorney, Agent, or Firm* — Reza Mollaaghababa; Thomas J. Engellenner; Pepper Hamilton LLP

(57) ABSTRACT

Described herein are foamable compositions and methods of making foamed compositions. The foamable composition comprises at least one polymer and a foaming agent. The foaming agent comprises a talc or a talc derivative. The polymers described herein comprise a substantially non-halogenated polymer. One or more additives are added to render the compositions flame retardant and/or smoke suppressant. Also described are Power over Ethernet (PoE) cables, having at least one electrical conduit comprising an electrically conductive core, an insulation that at least partially surrounds said electrically conductive core and a polymeric separator extending from a proximal end to a distal end and having at least one channel adapted for receiving the at least one electrical conduit. The PoE cables are capable of carrying about 1 watt to about 200 watts of power.

23 Claims, 37 Drawing Sheets

(51) Int. Cl.
  *H01B 1/02* (2006.01)
  *H01B 1/22* (2006.01)
  *H01B 3/00* (2006.01)
  *H01B 3/30* (2006.01)
  *H02G 3/04* (2006.01)
  *G02B 6/44* (2006.01)

(52) U.S. Cl.
  CPC ............ *H01B 3/30* (2013.01); *H02G 3/0406* (2013.01); *H02G 3/0481* (2013.01); *G02B 6/443* (2013.01); *G02B 6/4459* (2013.01)

(56) References Cited

U.S. PATENT DOCUMENTS

| | | |
|---|---|---|
| 4,331,619 A | 5/1982 | Chung et al. |
| 4,394,460 A | 7/1983 | Chung et al. |
| 4,513,129 A | 4/1985 | Nakagawa et al. |
| 4,524,194 A | 6/1985 | Dumoulin |
| 4,711,811 A | 12/1987 | Randa |
| 4,739,024 A | 4/1988 | Moggi et al. |
| 4,982,009 A | 1/1991 | Hung |
| 5,229,432 A | 7/1993 | Muschiatti |
| 5,310,838 A | 5/1994 | Hung et al. |
| 5,571,462 A | 11/1996 | Hashimoto et al. |
| 5,610,203 A | 3/1997 | Buckmaster et al. |
| 5,677,404 A | 10/1997 | Blair |
| 5,688,885 A | 11/1997 | Blair |
| 5,703,185 A | 12/1997 | Blair |
| 5,789,711 A * | 8/1998 | Gaeris .............. H01B 11/02 174/113 C |
| 5,883,197 A | 3/1999 | Barbieri et al. |
| 5,912,278 A | 6/1999 | Venkataraman |
| 5,952,615 A * | 9/1999 | Prudhon ............ H01B 11/02 174/113 C |
| 5,959,022 A | 9/1999 | Lin et al. |
| 6,064,008 A | 5/2000 | Craton |
| 6,139,957 A | 10/2000 | Craton |
| 6,150,612 A | 11/2000 | Grandy et al. |
| RE37,010 E | 1/2001 | Newmoyer |
| 6,231,919 B1 | 5/2001 | Craton |
| 6,232,357 B1 | 5/2001 | Barbieri et al. |
| 6,248,954 B1 | 6/2001 | Clark et al. |
| 6,288,340 B1 | 9/2001 | Arnould |
| 6,297,454 B1 | 10/2001 | Gareis |
| 6,335,490 B1 | 1/2002 | Higashikubo et al. |
| 6,365,836 B1 | 4/2002 | Blouin et al. |
| 6,395,795 B1 | 5/2002 | Hrivnak |
| 6,506,809 B2 | 1/2003 | Hrivnak |
| 6,506,976 B1 | 1/2003 | Neveux, Jr. |
| 6,512,013 B2 | 1/2003 | Hrivnak |
| 6,573,303 B2 | 6/2003 | Liu et al. |
| 6,639,152 B2 * | 10/2003 | Glew .............. G02B 6/4435 174/113 C |
| 6,687,437 B1 | 2/2004 | Starnes et al. |
| 6,787,697 B2 | 9/2004 | Stipes et al. |
| 6,800,811 B1 | 10/2004 | Boucino |
| 6,812,314 B2 | 11/2004 | Lunardi et al. |
| 6,818,832 B2 | 11/2004 | Hopkinson et al. |
| 6,855,889 B2 * | 2/2005 | Gareis .............. H01B 11/06 174/113 C |
| 6,946,495 B2 | 9/2005 | Zwynenburg et al. |
| 7,109,424 B2 | 9/2006 | Nordin et al. |
| 7,172,719 B2 | 2/2007 | Jackson et al. |
| 7,196,271 B2 * | 3/2007 | Cornibert .......... H01B 11/06 174/113 C |
| 7,196,272 B2 | 3/2007 | Glew |
| 7,202,418 B2 | 4/2007 | Glew |
| 7,208,683 B2 | 4/2007 | Clark |
| 7,241,826 B2 | 7/2007 | Shiotsuki et al. |
| 7,256,351 B2 | 8/2007 | Dillon et al. |
| 7,271,343 B2 | 9/2007 | Clark |
| 7,432,447 B2 | 10/2008 | Glew |
| 7,439,297 B2 | 10/2008 | Abusleme et al. |
| 7,465,879 B2 | 12/2008 | Glew |
| 7,473,849 B2 | 1/2009 | Glew |
| 7,473,850 B2 | 1/2009 | Glew |
| 7,560,648 B2 | 7/2009 | Wiekhorst et al. |
| 7,663,061 B2 | 2/2010 | Gareis et al. |
| 7,696,438 B2 * | 4/2010 | Clark .............. H01B 7/184 174/113 AS |
| 7,772,494 B2 | 8/2010 | Vexler et al. |
| 7,816,606 B2 | 10/2010 | Wiekhorst |
| 7,897,875 B2 | 3/2011 | Gareis |
| 8,455,762 B2 | 6/2013 | Vexler et al. |
| 8,704,094 B1 | 4/2014 | Gebs et al. |
| 8,729,394 B2 | 5/2014 | Clark et al. |
| 8,785,782 B2 | 7/2014 | Kim et al. |
| 9,269,476 B2 * | 2/2016 | Camp, II ............. H01B 11/04 |
| 2002/0061934 A1 | 5/2002 | Hrivnak |
| 2004/0055781 A1 | 3/2004 | Cornibert et al. |
| 2004/0118593 A1 | 6/2004 | Augustine et al. |
| 2004/0198886 A1 | 10/2004 | Shiotsuki et al. |
| 2004/0216914 A1 | 11/2004 | Vexler et al. |
| 2005/0006132 A1 | 1/2005 | Clark |
| 2005/0023028 A1 | 2/2005 | Clark |
| 2005/0165165 A1 | 7/2005 | Zwynenburg et al. |
| 2005/0199415 A1 | 9/2005 | Glew |
| 2005/0255741 A1 | 11/2005 | Ashida et al. |
| 2006/0125136 A1 | 6/2006 | Kratzmuller |
| 2006/0237217 A1 | 10/2006 | Glew |
| 2006/0237218 A1 | 10/2006 | Glew |
| 2006/0237219 A1 | 10/2006 | Glew |
| 2006/0237221 A1 | 10/2006 | Glew |
| 2007/0026742 A1 | 2/2007 | Park et al. |
| 2007/0052124 A1 | 3/2007 | Park et al. |
| 2007/0102188 A1 | 5/2007 | Glew |
| 2007/0149629 A1 | 6/2007 | Donovan et al. |
| 2007/0163800 A1 | 7/2007 | Clark et al. |
| 2007/0203281 A1 | 8/2007 | Alric et al. |
| 2007/0209825 A1 | 9/2007 | Glew |
| 2007/0219324 A1 | 9/2007 | Aneja et al. |
| 2008/0066947 A1 | 3/2008 | Glew |
| 2008/0087454 A1 | 4/2008 | Ohno et al. |
| 2008/0264670 A1 | 10/2008 | Glew |
| 2008/0283271 A1 | 11/2008 | Kenny et al. |
| 2009/0018225 A1 | 1/2009 | Gemmel et al. |
| 2009/0048359 A1 | 2/2009 | Glew et al. |
| 2009/0069480 A1 | 3/2009 | Zangara et al. |
| 2009/0130356 A1 | 5/2009 | Mouriuchi et al. |
| 2009/0236120 A1 | 9/2009 | Wiebelhaus et al. |
| 2009/0272571 A1 | 11/2009 | Gromko et al. |
| 2010/0072644 A1 | 3/2010 | Glew |
| 2010/0108355 A1 | 5/2010 | Perez et al. |
| 2010/0116521 A1 | 5/2010 | Nordin et al. |
| 2010/0151243 A1 | 6/2010 | Glew |
| 2010/0200269 A1 | 8/2010 | Camp, II et al. |
| 2010/0206609 A1 | 8/2010 | Glew |
| 2010/0243291 A1 | 9/2010 | Glew |
| 2010/0326697 A1 | 12/2010 | Venkataraman et al. |
| 2011/0220390 A1 | 9/2011 | Szylakowski et al. |
| 2011/0224318 A1 | 9/2011 | Glew et al. |
| 2011/0259626 A1 | 10/2011 | Speer |
| 2011/0284287 A1 * | 11/2011 | Glew .............. G02B 6/4429 174/99 R |
| 2012/0045186 A1 | 2/2012 | Wessels, Jr. et al. |
| 2013/0011106 A1 | 1/2013 | Congdon, II et al. |
| 2013/0037302 A1 | 2/2013 | Kroushl et al. |
| 2013/0248218 A1 | 9/2013 | Glew et al. |
| 2013/0248240 A1 | 9/2013 | Glew et al. |
| 2013/0269967 A1 | 10/2013 | Camp, II et al. |
| 2014/0069687 A1 | 3/2014 | Tryson et al. |
| 2014/0262427 A1 | 9/2014 | Brown et al. |

FOREIGN PATENT DOCUMENTS

| | | |
|---|---|---|
| EP | 0413255 B1 | 3/1996 |
| EP | 1520880 A | 4/2005 |
| EP | 2176326 B1 | 7/2011 |
| EP | 2380923 A1 | 10/2011 |
| JP | 0726050 A | 1/1995 |
| JP | 08012796 A | 1/1996 |
| JP | 2007126631 A | 5/2007 |
| KR | 0129862 B1 | 4/1998 |

(56) References Cited

FOREIGN PATENT DOCUMENTS

| KR | 20070004583 A | 1/2007 |
|---|---|---|
| WO | 97/15623 A1 | 5/1997 |
| WO | 03/000792 A1 | 1/2003 |
| WO | 2009/019209 A1 | 2/2009 |
| WO | 2009/020554 A2 | 12/2009 |

OTHER PUBLICATIONS

Final Office Action received in U.S. Appl. No. 15/284,177 dated Aug. 29, 2017; 14 pages.
Non-Final Office Action received in U.S. Appl. No. 15/248,177 dated Jan. 26, 2017; 17 pages.
International Search Report and Written Opinion for PCT/US2015059485, dated Feb. 25, 2016; 18 pages.
International Preliminary Report on Patentability for PCT/US2015/059485, dated May 18, 2017; 15 pages.

* cited by examiner

1000

1100

1010

COMPOSITIONS FOR COMPOUNDING, EXTRUSION AND MELT PROCESSING OF FOAMABLE AND CELLULAR HALOGEN-FREE POLYMERS

CROSS-REFERENCE TO RELATED APPLICATIONS

This application claims priority to U.S. Provisional Application No. 62/076,736, filed on Nov. 7, 2014, which is hereby incorporated by reference in its entirety.

BACKGROUND OF INVENTION

A broad range of electrical cables and buffered optical fibers cables are installed in modern buildings for a wide variety of uses. These cables are used, for example, to provide data transmission between computers, voice communications, as well as control signal transmission for building security, fire alarms, and temperature control systems. Cable networks extend throughout modern office and industrial buildings, and frequently extend through the space between the dropped ceiling and the floor above.

Ventilation system components are also frequently extended through this space for directing heated and chilled air to the space below the ceiling and also to direct return air exchange. The space between the dropped ceiling and the floor above is commonly referred to as the plenum area. Electrical cables and fiber optic cables extending through plenum areas are governed by special provisions of the National Electric Code ("NEC").

Because flame and smoke can travel along the extent of a plenum area in the event of electrical fire, the National Fire Protection Association ("NFPA") developed a standard to reduce the amount of flammable material incorporated into insulated electrical conductors, fiber optic buffers and jacketing of cables. Reducing the amount of flammable material, according to the NFPA, would reduce the potential of insulation, fiber optic buffering, and jacket materials to spread flames and smoke to adjacent plenum areas and potentially to more distant and widespread areas in a building.

In 1975, the NFPA recognized the potential flame and smoke hazards created by burning cables in plenum areas and adopted in the NEC a standard for flame retardant and smoke suppressant cables. This standard, commonly referred to as "the Plenum Cable Standard," permits the use of a cable without a conduit, so long as the cable exhibits low smoke and flame retardant characteristics. The test method for measuring these characteristics is commonly referred to as the Steiner Tunnel Test. The Steiner Tunnel Test has been adapted for the burning of cables according to the following test protocols: NFPA 262, Underwriters Laboratories ("U.L.") 910, or Canadian Standards Association ("CSA") FT-6. The test conditions for each of the U.L. 910 Steiner Tunnel Test, CSA FT-6, and NFPA 262 are: a 300,000 BTU/hour flame is applied for 20 minutes to 24-foot lengths of test cables mounted on a horizontal tray within a tunnel. The criteria for passing the Steiner Tunnel Test are as follows:

Flame Spread Requirement: less than 5 feet
Smoke Generation Requirements:
1. Maximum optical density of smoke less than 0.5
2. Average optical density of smoke less than 0.15 of fire retardant cabling This standard is one of the most stringent test methods for residential and commercial buildings. In plenum applications for voice and data transmission, electrical conductors and cables should exhibit low smoke evolution, low flame spread, and favorable electrical properties to pass the stringent requirements of copper data cables. Category 5e cables have evolved to provide even higher data transmission speeds with 10 gigabit per second cables, which are now designated Categories ("Cat") 6, 6e and 6A. A Category 8, or a 40 gigabit per second cable, is being developed. Cables selected for plenum applications must exhibit a balance of properties and every component in a communications cable must perform its role.

Separators, jackets, insulations, buffer tubes and blown fiber tubing used in cables that meet the electrical requirements of Categories 6 and 7 must also pass the new norms for flammability and smoke generation. Tables 2 and 3, below, indicate categories for flame and smoke characteristics and associated test methods as discussed herein.

Fiber optic cables and fiber optic blown tubing, which are used in the plenum areas of buildings, must adhere to the same flame retardancy and low smoke characteristics of the NFPA 262 Plenum Test. Underwriters Laboratory (UL 2885) is a test method for determining whether components or materials of a cable can be designated as a non-halogen cable. Underwriters Laboratory (UL 2885), titled *Acid Gas, Acidity and Conductivity of Combusted Materials and Assessment*, uses IEC 60754-1, IEC 6074-2 and IEC 62821-1 to benchmark "all materials" within the cable design, i.e., insulation, spline or crosswebs, tapes or other cable fillers, fiber optic buffer and the overall jacket. Based on these test methods, a determination can be made for the presence of halogens, e.g., chlorine, bromine and fluorine. Test protocol 62821-1 Annex B, determines the presence of a halogen using the Sodium Fusion Procedure as described in Part 5.3 IEC 62821-2, i.e., Chemical Test: Determination of Halogens—Elemental Test.

Materials evaluated to IEC 62821-1 Annex B Assessment of Halogens Required for extruded material.

The test protocol consists of the following stages:

Stage 0: Determination of Halogens—elemental test for chlorine, bromine and fluorine using the sodium fusion procedure as described in part 5.3 of IEC 62821-2 (Chemical Test: Determination of Halogens—Elemental Test). If the results for chlorine or bromine or fluorine are positive, proceed to Stage 1.

Stage 1: Test according to 6.2.1 of 60754-2 for pH and Conductivity. If the pH is $\geq 4.3$, the conductivity is $>2.5$ $\mu$S/mm and $\leq 10$ $\mu$S/mm, proceed to Stage 2.

Stage 2: Test according to 6.1.1 of 60754-1 for chlorine and bromine content expressed as HCI. If the result if $\leq 0.5\%$, proceed to Stage 3.

Stage 3: Test for the determination of low levels of fluorine as described in part 45.2 of IEC 60684-2 (Determination of low levels of fluorine) Methods A (Ion selective electrode method fluoride) or B (Alizarin fluorine blue method).

The European standards have similar goals of fire retardant and low smoke generation cables. Polyvinylchloride, a halogenated material, remains a dominant jacketing grade throughout the European cable community. The standards which have evolved are the so-called International Classification and Flame Test Methodology for Communications Cable. Based on these evolving standards, a new list of acronyms has evolved, albeit with much similarity to the North American standards.

These Euro-classes for cables measure the following:

| A. | Flame Spread = | FS |
| B. | Total Heat Release = | THR |
| C. | Heat Release Rate = | HRR |
| D. | Fire Growth Rate = | FIGRA |
| E. | Total Smoke Production = | TSP |
| F. | Smoke Production Rate = | SPR |

The European International Classification and Test Methodology for Communication Cables is shown below in Table 1 and it is shown in an abbreviated form.

TABLE 1

The European International Classification and Test Methodology for Communication Cables

| Class | Test Methods | Classification Criteria | Additional Classification |
|---|---|---|---|
| $A_{ca}$ | EN ISO 1716 | PCS ≤2.0 MJ/kg (1) | Note: Mineral filled circuit integrity cable |
| $B1_{ca}$ | EN 50399 (30 kW flames source) and | FS ≤1.75 m and $THR_{1200}$ ≤10 MJ and Peak HRR ≤20 kW and FIGRA ≤120 $Ws^{-1}$ | Smoke production (2, 5) and Flaming droplets/particles (3) and Acidity (4, 7) |
|  | EN 60332-1-2 | H ≤425 mm |  |
| $B2_{ca}$ | EN 50399 (20.5 kW flames source) and | FS ≤1.5 m and $THR_{1200s}$ ≤15 MJ and Peak HRR ≤30 kW and FIGRA ≤150 $Ws^{-1}$ | Smoke production (2, 5) and Flaming droplets/particles (3) and Acidity (4, 7) |
|  | EN 60332-1-2 | H ≤425 mm |  |
| $C_{ca}$ | EN 50399 (20.5 kW flames source) and | FS ≤2.0 m and $THR_{1200s}$ ≤30 MJ and Peak HRR ≤60 kW and FIGRA ≤300 $Ws^{-1}$ | Smoke production (2, 6) and Flaming droplets/particles (3) and Acidity (4, 7) |
|  | EN 60332-1-2 | H ≤425 mm |  |
| $D_{ca}$ | EN 50399 (20.5 kW flames source) and | $THR_{1200s}$ ≤70 MJ and Peak HRR ≤400 kW and FIGRA ≤1300 $Ws^{-1}$ | Smoke production (2, 6) and Flaming droplets/particles (3) and Acidity (4, 7) |
|  | EN 60332-1-2 | H ≤425 mm |  |
| $E_{ca}$ | EN 60332-1-2 | H ≤425 mm |  |
| $F_{ca}$ |  | No Performance Determined |  |

Table 2, below, provides a listing and comparison of the North American standards and the European standards from most stringent flame retardancy and low smoke requirements to least stringent.

The use of halogens (e.g. fluoropolymers) in communications cables, such as for insulation materials, crosswebs, tapes, tubes or cable fillers, and the use of low-smoke PVC jacket materials has been widespread in copper based and fiber based cables. Optimizing and meeting the electrical requirements of copper communication cables, i.e., Cat 5e to Cat 6A to Cat 8, without the use of materials comprising halogens, has been the unsolved challenge for over three decades. The materials used for fiber optic buffers and jackets utilize similar halogenated materials to reduce flame spread and smoke generation.

TABLE 2

A comparison of North American & European Fire Performance Standards from most severe to least severe for Communications Cables

|  | North America Standard | European Standard | North American Test Protocols | European Test Protocols |
|---|---|---|---|---|
| Most Severe | Plenum Test UL 910 NFPA 262 FT-6 CMP | Class B1 LAN Comm. Cables EN 50399-30 KW EN 60332-1-2 | Steiner Tunnel - 88 KW 300 BTU @ 20 minutes plus smoke peak <.5 Average <.15 | Class B1 30 KW Flame Sources FS <1.75 m, THR <10 mg Peak HRR <20 KW FIGRA <120 WS |
| Severe | Riser Test UL 1666 FT-4 CMR | Class C EN 50399-10..5 KW & EN60332-1-2 | Riser Test - 154 KW 527 KW @ 30 minutes | Class C 20.5 KW Flame Source FS <2.0 m TGR <30 m; Peak HRR <60 KW FIGRA <300 WS |
| Less Severe | General Purpose Tray Cable Test UL 1581 FT-2/CM | Class D IEC 60332-3 EN 50399-20.5 KW | General Purpose 20.5 KW 70K BIT @ 20 minutes | Class D 20.5 KW Flame Source THR <70 m; PEAK HRR <400 KW FIGRA 1300 WS |
| Least Severe | VW-1 FT-1 | Class E IEC 60332-1 | Bunsen Burner Test 1 minute (15 seconds flame) | Class E H <425 mm |

Communication cables conforming to NEC/CEC/IEC requirements are characterized by possessing superior resistance to ignitability, improved resistance to flame spread and lower levels of smoke generation during fires than cables having lower fire ratings. Often these properties can be anticipated by measuring a Limited Oxygen Index (LOI) for the specific materials used to construct the cable. Conventional copper and fiber optic cable designs of data grade telecommunication cables for installations in plenum chambers employ a halogenated low smoke polyvinylchloride (PVC) generating jacket material. For example, a conventional design may include a filled PVC formulation or a fluoropolymer material surrounding a core of twisted conductor pairs, with each conductor individually insulated with a fluorinated-based insulation (e.g., fluorinated ethylene propylene (FEP)).

Recently, the development of "high-end" Category 6 and 7 cables has increased the need for fluorinated ethylene propylene (FEP), perfluoroalkoxy (PFA) and perfluorom-ethylalkoxy (MFA) that include power sum near end crosstalk ("NEXT") and power sum equal level far end crosstalk ("ELFEXT") considerations along with attenuation, impedance, and attenuation crosstalk ratio ("ACR") values in design of such cables.

Recent and proposed cable standards are increasing maximum frequencies supported by the cables from 100-200 MHz to 250-1000 MHz Recently, 30 Gbits of data over copper high-speed standards have been proposed. The maximum upper frequency of a cable is that frequency at which the attenuation/cross-talk ratio ("ACR") is approximately equal to 1. Since signal strength decreases with frequency data attenuation and cross-talk increases with frequency, the design of cables that would support high frequencies poses a significant challenge. This is especially true since many conventional designs for cable components, e.g., fillers and spacers, may not provide sufficient cross-talk isolation at the higher frequencies.

The selection of materials for forming cables that can support high frequencies and concurrently exhibit favorable flame and smoke characteristics can be challenging. Fluorinated ethylene/propylene polymers traditionally exhibit better electrical performance comparable to non-halogenated polyolefin polymers, such as polyethylene or polypropylene. Polyethylene has favorable mechanical properties as a cable jacket due to its tensile strength and elongation to break. However, polyethylene exhibits unfavorable flame and smoke characteristics.

Limiting Oxygen Index (ASTM D-2863) ("LOI") is a test to determine the percent concentration of oxygen that will support flaming combustion of a test material. The greater the LOI, the less susceptible a material is to burning. In the atmosphere, there is approximately 21% oxygen, so a material exhibiting an LOI of 22% or more cannot burn under ambient conditions. As pure polymers without flame retardant additives, members of the polyolefin family, namely, polyethylene and polypropylene, have an LOI of approximately 19. Because of their LOI, these polyolefins exhibit disadvantageous properties relative to flame retardancy in that they do not self-extinguish a flame, but rather propagate a flame with a high rate of heat release. Moreover, the burning melt can spread and drip on surrounding areas, thereby further propagating the flame. These materials could burn similarly to kerosene or gasoline when ignited which is unacceptable for use in building plenum areas.

Table 3 below summarizes the electrical performance and flame retardancy characteristics of several conventional polymeric materials. Besides fluorinated ethylene/propylene, other commercially used melt extrudable thermoplastics generally do not provide a favorable balance of properties (i.e., high LOI, low dielectric constant, and low dissipation factor). Moreover, when flame retardant and smoke suppressant additives are included within such thermoplastic materials, the overall electrical properties generally deteriorate.

TABLE 3

Fire Retardancy Characteristics for Copper Cabling and Fiber Optic LAN Cables

| | Electrical Properties | | |
|---|---|---|---|
| Material Type*<br>(Flame Retardant Used) | Dielectric<br>Constant<br>1 MHz,<br>23° C. | Dissipation<br>Factor<br>1 MHz,<br>23° C. | LOI %** |
| PE (No Halogen) | 2.2 | 0.0003 | 19 |
| FRPE (Brominated) | 2.6-3.0 | 0.003 | 28-32 |
| FEP (Fluorinated) | 2.1 | 0.0003 | >90 |
| PVC (Chlorinated) | 2.7-3.5 | 0.024 | 32 |
| RSFRPVC (Chlorinated) Reduced Smoke Fire Retardant | 3.2-3.6 | 0.018 | 39 |
| LSFRPVC (Chlorinated) Low Smoke Fire Retardant | 3.5-3.8 | 0.038-0.080 | 49 |

*PE = polyethylene; FRPE = flame resistant polyethylene; FEP = fluorinated ethylene-propylene; PVC = polyvinyl chloride; RSFRPVC = reduced smoke flame retardant polyvinyl chloride; LSFRPVC = low smoke flame retardant polyvinyl chloride
**LOI = Limiting Oxygen Index In addition to the requirement of low smoke evolution and flame retardancy for plenum cables, there is a growing need for enhanced electrical properties for the transmission of voice and data over twisted pair cables. In this regard, standards for electrical performance of twisted pair cables are set forth in the Telecommunications Industry Association (TIA) and American National Standards Institute (ANSI) in ANSI/TIA-568-C.2. Similarly, the standards for data transmission over optical fiber cables are covered in ANSI/TIA-568-C.3.

A balance of properties or attributes is needed for each component (e.g., insulation, buffer, cable fillers, fiber optic strength member, fiber optic blown tubing and jacketing) within copper and fiber communications cable so that it can meet the electrical performance of copper cabling or the transmission characteristics of fiber optic high speed data cable and pass the NFPA 262 Flame and Smoke Requirements, the NFPA 259 flame requirements and similarly the European standards for Class B and Class C.

Optical fiber cables exhibit a set of needs that include unique mechanical properties to prevent damage to the fragile glass fibers. These needs are evolving for hybrid copper and fiber designs, Passive Optical Networks (PON) or Power over Ethernet (PoE). For instance, PoE will generate more heat as it provides data transmission as well as power to LED lighting, wireless interface points, cameras and is employed in a wide range of other applications whereby temperature control systems and office automation will be accomplished remotely from interactive phones and computer devices. These cables will require higher temperature rated polymers, e.g., 125° C. to 250° C. operating use temperatures. A direct current with up to 51 watts can be used over a single 4-pair cable if all 4 pairs of the category 5, 5e, 6 and 6A are energized.

Power Over Ethernet (POE) relates to a system in which electrical power can pass safely along with data on these Ethernet cables. IEEE 802.3 af-2003 standard provides up to 15.4 watts of DC power and can operate with Category 3 cables at this low power requirement. IEEE 802.3 at-2009 standard also known as POE+ or POE plus provides 25.5 watts of power over Category 5 or higher with some vendors announcing that up to 51 watts of power could be transmitted with higher temperature performance polymers as the insulation.

There remains a need for a communications cable that can operate reliably while minimizing or eliminating cross-talk between conductors within a cable or alien cross-talk between cables, and also a need for separators for use in such telecommunications cables, while meeting the design criteria described above, such as having a temperature rating up to 200° C. or even 250° C. There also remains a need for a communications cable that can provide low smoke generation and overall flame retardancy, e.g., as required by the NEC for use in plenum and riser areas of a building. Further, despite advances in fabricating polymeric foamed articles for use in cable design, there is still a need for improved foamable and foamed compositions, and methods of their fabrication, for use in cables, e.g., telecommunications cables.

SUMMARY OF THE INVENTION

In one aspect, the present invention relates to the use of a class of non-halogenated polymers, herein referred to as engineered resins, for fabricating various components of a cable, e.g., a telecommunications cable, a Power over Ethernet (PoE) cable. It has been have discovered that talc and talc derivatives can be employed to foam such polymers, thus allowing great flexibility in forming cables that can meet stringent cabling standards. In some embodiments, such cables can be substantially free of halogens. The teachings of the invention are applicable to forming copper cables, fiber optic cables, and cables that include both copper conductors and optical fibers, as well as PoE cables.

There are some differences between components of a copper cable and components of a fiber optic cable. For example, copper cables have insulation, but fiber optic cables have buffers. Also, copper cables use tapes, separators (e.g., crosswebs or splines), shielding tapes and other extruded fillers to improve electrical performance. Fiber optic cables can use Kevlar and glass reinforcing rods to strengthen the core of the cable based on the fragile characteristics of glass fiber especially during cable installation. Glass fiber can be blown into raceways or tubing that are referred to as blown optical fiber tubing. Both copper cables and fiber optic or blown fiber optic cables can also require an overall jacket material.

One aspect of the invention described herein is the foaming of an engineered polymer, which can be in the form of a pellet or a so-called foamable pellet that foams during the extrusion process. The foaming of the polymer advantageously lowers the combustible footprint of the entire cable, e.g., they can reduce the plastic footprint for cabling in a building by 20% to 50%. Further, in some embodiments, the foamed components can be substantially free of halogens.

Another aspect of the invention is the development of a non-halogen cable that bridges the difference between the most stringent North American standards for fire retardancy and the most stringent European standard.

In one aspect, the present invention provides a globally accepted non-halogen copper communications cable, a non-halogen fiber optic cable and a non-halogen, blown fiber optic tubing or raceway design that meets the most stringent flame retardancy and low smoke requirement in North America and the European community.

In another aspect, the invention provides non-halogen engineered polymers with enhanced fire retardancy and methods for foaming such polymers for both the most severe North American Plenum test and European Class B1, as well as the severe North American Riser test and European Class C applications.

As discussed in more detail below, the polymers and polymer blends of the present invention allow fabricating separators, wire insulation and cable jackets that can be used to form cables that meet the most stringent flammability and smoke generation requirements. Further, the polymers and polymer blends of the present invention can be employed to form blown tubing for optical fibers.

In one aspect, the invention is directed to a foamable composition. The foamable composition comprises at least one polymer and a chemical foaming agent. In some aspects, the at least one polymer is a non-halogen foamable polymer. The polymer can comprise any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof. In some embodiments, the foaming agent comprises talc or a talc derivative.

TABLE 4

List of Non-Halogen Polymers

| Material | Manufacturer | Trade Name | Sg | Dielectric Constant | Dissipation Factor | LOI % |
| --- | --- | --- | --- | --- | --- | --- |
| COC | TOPAS Advanced Polymers | TOPAS | 1.02 | 2.35 10 kHz | 0.00007 1 kHz | 19 |
| PEI | SABIC | Ultem ™ | 1.27 | 3.15 1 kHz | 0.0012 1 kHz | 47 |
| PEI | LTL Color Copounders | ColorFast | 1.27 | 3.15 1 kHz | 0.0012 1 kHz | 47 |
| PSU | Solvay | UDEL ® | 1.24 | 3.04 1 MHz | 0.0060 1 MHz | 26 |
| PSU | BASF | Ultrason | 1.24 | 3.04 1 MHz | 0.0060 1 MHz | 26 |
| PPSU | Solvay Specialty Polymers | Radel ® | 1.29 | 3.44 60 Hz | 0.0076 1 MHz | 38 |
| PEEK | Solvay Specialty Polymers | KetaSpire ® | 1.30 | 3.07 1 MHz | 0.0030 1 MHz | 40 |
| PES/PESU | Solvay Specialty Polymers | Veradel ® | 1.37 | 3.54 1 MHz | 0.0056 1 MHz | 39 |
| LCP | Celanese Corp. | Vectra ® | 1.50 | 3.00 1 MHz | 0.0180 1 MHz | 44 |
| PEKK | Arkema | Kepstan ™ | 1.27 | 2.50 1 MHz | 0.0007 1 kHz | 38 |
| PPS | Chevron Phillips | Ryton ® | 1.34 | 3.20 1 MHz | 0.002 1 MHz | 44 |

TABLE 4-continued

List of Non-Halogen Polymers

| Material | Manufacturer | Trade Name | Sg | Dielectric Constant | Dissipation Factor | LOI % |
|---|---|---|---|---|---|---|
| PPS | Celanese Corp. | FORTRON ® | 1.4 | 4.60 1 MHz | 0.0011 1 MHz | 49 |
| PC | Bayer | Makrolon ® | 1.29 | 3.20 1 MHz | 0.0090 1 MHz | 27 |
| PPE | Evonik | VESTORAN ® | 1.19 | 2.70 1 MHz | 0.0018 1 MHz | 29 |

In some embodiments, a foamable composition according to the present teachings can comprise a combination of styrene-ethylene/butylene-styrene (SEBS) polymers and/or other compatibilizers, as well as polyolefins and blends of all materials herein described. All of these non-halogen materials may be chemically foamed in accordance with the present teachings to lower the combustible footprint in cables used in buildings.

In some embodiments, a variety of organic and inorganic additives can be used to improve the electrical and/or flammability and smoke generation of the foamed articles fabricated according to the various embodiments of the present teachings. An additive can enhance the fire retardancy and/or smoke suppressant characteristics of the articles described herein. Some examples of such additives include nano-composites of clay and other inorganics such as ZnO, $TiO_2$, and nitrogen phosphorus based fire retardants. In some embodiments, the additives can be in the form of nano-sized particles. Other examples include insulative or semi-conductive Buckminster fullerenes and doped fullerenes of the $C_{60}$ family, nanotubes of the same and the like, which offer unique properties that allow for maintaining electrical integrity as well as providing the necessary reduction in flame retardance and smoke suppression.

In one aspect of the foamable composition, the talc or talc derivative constitutes the only foaming agent present in the foamable composition. In other embodiments, in addition to talc or a talc derivative, other chemical foaming agents, such as $MgCO_3$ and $CaCO_3$ can be present in the foamable composition.

In some embodiments, the foamable composition is melt processable at an elevated temperature that is sufficient to cause the melting of the at least one polymer and to cause the talc or talc derivative to foam, i.e., to cause decomposition of the talc or talc derivative so as to generate gas for foaming the composition. For example, in some embodiments, the foamable composition is melt processable at a temperature of at least about 600° F. In another embodiment, the foamable composition is melt processable at a temperature of at least about 610° F. In another embodiment, the foamable composition is melt processable at a temperature of at least about 620° F. In another embodiment, the foamable composition is melt processable at a temperature of at least about 630° F. In another embodiment, the foamable composition is melt processable at a temperature of at least about 640° F. In another embodiment, the foamable composition is melt processable at a temperature of at least about 650° F. In another embodiment, the foamable composition is melt processable at a temperature of at least about 660° F.

In one embodiment of the foamable composition, the talc or talc derivative comprises about 1% to about 50% by weight of said foamable composition. In another embodiment of the foamable composition, the talc or talc derivative comprises about 2% to about 40% by weight of said foamable composition. In another embodiment of the foamable composition, the talc or talc derivative comprises about 3% to about 30% by weight of said foamable composition. In another embodiment of the foamable composition, the talc or talc derivative comprises about 4% to about 20% by weight of said foamable composition. In another embodiment of the foamable composition, the talc or talc derivative comprises about 5% to about 10% by weight of said foamable composition.

In one embodiment of the foamable composition, the at least one polymer comprises at least about 10% by weight of said foamable composition. By way of example, the at least one polymer can comprise about 10% to about 80% by weight of said foamable composition. In one embodiment of the foamable composition, the at least one polymer comprises at least about 20% by weight of said foamable composition. In another embodiment of the foamable composition, the at least one polymer comprises at least about 30% by weight of said foamable composition. In another embodiment of the foamable composition, the at least one polymer comprises at least about 40% by weight of said foamable composition. In another embodiment of the foamable composition, the at least one polymer comprises at least about 50% by weight of said foamable composition. In another embodiment of the foamable composition, the at least one polymer comprises at least about 60% by weight of said foamable composition. In another embodiment of the foamable composition, the at least one polymer comprises at least about 70% by weight of said foamable composition. In another embodiment of the foamable composition, the at least one polymer comprises at least about 80% by weight of said foamable composition.

In one aspect, the invention is directed to a foamed article made by a process comprising heating a foamable composition according to the present teachings to an elevated temperature (e.g., at least about 600° F.) sufficient to cause melting of at least one polymeric component of the foamable composition and to cause the talc or talc derivative present in the foamable composition to foam. The foamable composition can comprises one or more of the following polymers: polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof. The foamable composition can further comprise talc or talc derivative.

In one embodiment, the above foamed article is formed by heat processing a foamable composition according to the present teachings, which comprises talc or talc derivative at a concentration of about 1% to about 20% by weight of the foamable composition. In another embodiment, the talc or the talc derivative comprises about 5% to about 10% by weight of the foamable composition. In an embodiment, the talc or the talc derivative constitutes the only foaming agent in the foamable composition.

In an embodiment of the foamed article, the foamed article has a tensile strength of about 2,500 psi to about 10,000 psi. Further, in an embodiment, the foamed article has a specific gravity of about 0.60 to about 1.45 g/cm$^3$.

In some embodiments, the foamed article is substantially free of halogens. In some embodiments, the foamed article is a non-halogen foamed article. In another embodiment, the foamed article is a non-halogen foamed article defined by the UL 2885 protocol.

In some embodiments, the foamed article can comprise foamed cells having a maximum dimension (e.g., a diameter) in a range of about 0.0005 inches to about 0.003 inches. In some cases, the foamed cells can have an average diameter of about 0.0008 inches. The foamed cells can have a closed cell structure, an open cell structure, or a combination thereof. In some embodiments, a majority of the foamed cells (e.g., greater than 50%) have a closed cell structure. For example, greater than 50%, greater than 60%, greater than 70%, greater than 80% or greater than 90% of the foamed cells have a closed cell structure. Another embodiment includes using talc as chemical foaming agent to form uniform cell structures in the foamed or blown composition.

In one aspect, the present teachings are directed to a communications cable (e.g., electrical and/or fiber optic), which comprises a separator providing a plurality of channels, each of which can receive an electrical conductor and/or glass fiber. Typically, a twisted pair of conductors is disposed in each of the channels. In some embodiments, there are 1, 2, 3, 4, 5, 6 or more channels. In another embodiment, one or more fiber optic channels are also present in the communications cable. The electrical conductor can include an electrically conductive core (e.g., an electrically conductive element formed, e.g. of copper) and an insulation that at least partially surrounds the conductive core.

In some embodiments the separator comprises any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof.

In some such embodiments, the separator can have a foamed structure. For example, the separator can have a cellular structure characterized by a plurality of cells (e.g., filled with a gas such as air) distributed therein. As discussed in more detail below, such cellular structure can improve the electrical and/or thermal properties of the foamed article. By way of example, the separator can exhibit a foaming level in a range of about 10% to about 80%, e.g., in a range of about 15% to about 70%, or in a range of about 20% to about 60%, or in a range of about 25% to about 50%, or in a range of about 30% to about 40%. In some embodiments, the foaming level is about 10%, about 15%, about 20%, about 25%, about 30%, about 35%, about 40%, about 45%, about 50%, about 55%, about 60%, about 65%, about 70%, about 75%, or about 80%.

In other embodiments, the separator can comprise the above polymers and can be formed as a solid structure. Further, in some embodiments, the separator can be substantially free of any halogen.

In some embodiments, the separator can include an additive distributed therein. In some cases, the additive can be a smoke suppressant additive and/or flame retardant additive.

By way of example, the additive can by any of the molybdate derivatives, such as molyoxide, ammonium octamolybdate (AOM), calcium molybdate and zinc molybdate, metal oxides, such as Ongard II, zinc and other oxides, borates, such as zinc borate and meta borate, stannates, such as zinc hydroxyl stannates and zinc stannates, nitrogen-phosphorus, phosphorus based esters, such as triaryl, tri aklkyl, and/or magnesium hydrates/carbonates, such as magnesium hydroxide, magnesium carbonate, and antimony trioxide, decachlorodiphenyloxide, alumina trihydrate, and calcium carbonate.

In some embodiments, an insulation, which at least partially surrounds the electrically conductive core of an electrical conductor is provided, which comprises any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof.

In some such embodiments, the insulation can have a foamed structure, while in other embodiments the insulation can have a solid structure. In some embodiments, the insulation can include a multi-layer (e.g., a bi-layer) structure in which different layers can comprise different polymers. In some such embodiments, one layer can have a solid structure and an adjacent layer can have a foamed structure. In another embodiment, both layers can have a foamed structure. By way of example, one layer can be formed as a solid structure comprising polyolefin, and an adjacent layer can comprise polyetheretherketone (PEEK) and can have a foamed structure. For example, the insulation can have a bi-layer structure in which an inner layer (i.e., the layer in contact with the conductive core of the electrical conductor) is a solid layer and an outer layer (i.e., a layer disposed on the inner layer) is a foamed layer. Alternatively, the inner layer can be a foamed layer and the outer layer can be a solid layer. Yet in other embodiments, both the inner and the outer layers are foamed layers.

In one aspect of the communications cable, the inner layer comprises a foamed layer with a foaming level of about 10% to about 80%, e.g., in a range of about 15% to about 70%, or in a range of about 20% to about 60%, or in a range of about 25% to about 50%, or in a range of about 30% to about 40%. In some embodiments, the foaming level is about 10%, about 15%, about 20%, about 25%, about 30%, about 35%, about 40%, about 45%, about 50%, about 55%, about 60%, about 65%, about 70%, about 75%, or about 80%.

In some embodiments, the insulation can have a bi-layer structure in which any of the inner and/or the outer layer comprises at least one additive. In some embodiments, the additive can be a smoke suppressant and/or flame retardant additive. For example, the additive can be any of molybdate derivatives, such as molyoxide, ammonium octamolybdate (AOM), calcium molybdate and zinc molybdate, metal oxides, such as Ongard II, zinc and other oxides, borates, such as zinc borate and meta borate, stannates, such as zinc hydroxyl stannates and zinc stannates, Nitrogen-Phosphorus, phosphorus based esters, such as triaryl, tri aklkyl, and ADP, and magnesium hydrates/carbonates, such as magnesium hydroxide, magnesium carbonate, and antimony trioxide, decachlorodiphenyloxide, and alumina trihydrate.

In some embodiments, the insulation can be substantially free of any halogen.

In some embodiments, the communications cable can further include a jacket that at least partially encloses the separator and one or more electrical conductors that are disposed in the channels provided by the separator. In some embodiments, the jacket can comprise any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof.

In some embodiments, the communications cable is substantially free of any halogen. For example, the communications cable can include a separator that is substantially free of any halogen. Further, the insulation of the electrical conductors (e.g., twisted pairs) disposed in the channels provided by the separator is substantially free of any halogen. In addition, the jacket of the cable is substantially free of any halogen.

In some embodiments, the compositions and communication cables described herein comprise an engineered resin (e.g., a non-halogenated polymer) and a plurality of electrically conductive elements distributed within the engineered resin. At least some of the electrically conductive elements can be formed at least partially of a metal.

In this embodiment and in other embodiments disclosed herein, the electrically conductive elements can comprise any of a metal, a metal oxide, or other electrically conductive materials, such as carbon nanotubes, carbon fibers, nickel coated carbon fibers, single or multi-wall graphene, or copper fibers, $C_{60}$ fullerene, among others. By way of example, in some embodiments, the electrically conductive inclusions include any of silver, aluminum, copper, gold, bronze, tin, zinc, iron, nickel, indium, gallium, or stainless steel. In some embodiments, the electrically conductive inclusions can include metal alloys, such as tin alloys, gallium alloys, or zinc alloys. In other embodiments, the electrically conductive inclusions can include metal oxides, such as copper oxide, bronze oxide, tin oxide, zinc oxide, zinc-doped indium oxide, indium tin oxide, nickel oxide, or aluminum oxide. In some embodiments, some of the electrically conductive inclusions are formed of one material while others are formed of another material. Further, in some embodiments, the electrically conductive inclusions are formed of metals and are substantially free of any metal oxides, e.g., metal oxides form less than 5% of the inclusions.

In some embodiments, a weight ratio of the conductive elements to the one or more engineered resins can be in a range of about 1% to about 30%. In some embodiments the electrically conductive elements comprise at least about 5% by weight of the composition, at least about 7% by weight of the composition, at least about 10% by weight of the composition, at least about 15% by weight of the composition, at least about 20% by weight of the composition, or at least about 25% by weight of the composition.

In some embodiments, the electrically conductive elements can also have a plurality of different shapes. For example, a first plurality of the conductive elements can have needle-like shapes and a second plurality of the conductive elements can have flake-like shapes (e.g., rectangular shapes).

In some embodiments, at least some of the conductive elements can be formed of a metal. In some embodiments, the metal can include, without limitation, any of silver, aluminum, copper, gold, bronze, tin, zinc, iron, nickel, indium, gallium, and stainless steel.

In some embodiments, at least some of the conductive elements can be formed of a metal oxide. In some embodiments, the metal oxide can include, without limitation, any of copper oxide, bronze oxide, tin oxide, zinc oxide, zinc-doped indium oxide, indium tin oxide, nickel oxide, and aluminum oxide.

In some embodiments, the conductive elements can include a plurality of metallic particles having an average particle size in a range of about 1 micron to about 6000 microns. For example, the conductive elements can have an average particle size in a range of about 10 microns to about 50 microns, or in a range of about 50 microns to about 500 microns, or in a range of about 500 microns to about 1000 microns.

In another aspect, the compositions and communication cables disclosed herein, which comprises at least one engineered resin, a plurality of electrically conductive elements distributed within the at least one engineered resin, and a chemical foaming agent distributed within the at least one engineered resin. In some embodiments, at least a portion of the electrically conductive elements is formed of a metal. In some embodiments, the electrically conductive elements can have a plurality of different shapes. For example, a first plurality of the conductive elements have needle-like shapes and a second plurality of the conductive elements have flake-like shapes, e.g., rectangular shapes. In some embodiments, a first plurality of the conductive elements have a shape primarily configured to reflect electromagnetic radiation in a range of about 1 MHz to about 40 GHz. In some embodiments, a second plurality of the conductive elements have a shape primarily configured to dissipate electromagnetic radiation in a range of about 1 MHz to about 40 GHz.

In some embodiments, the electrically conductive elements comprise a plurality of fibrils. In some embodiments, the fibrils include a metal. In some embodiments, the metal comprises any of silver, aluminum, copper, gold, bronze, tin, zinc, iron, nickel, indium, gallium, and stainless steel. In some embodiments, the fibrils include a metal oxide. In some embodiments, the metal oxide comprises any of copper oxide, bronze oxide, tin oxide, zinc oxide, zinc-doped indium oxide, indium tin oxide, nickel oxide, and aluminum oxide.

In one aspect, the invention is directed to a method of manufacturing a foamed article. The method comprises processing a foamable composition, which comprises at least one of polyphenylenesulfide (PPS), polyetherimide (PEI), polysulfone (PSU), polypheylsulfone (PPSU), polyethersulfone (PES), polyetheretherketone (PEEK), polyaryletherketone (PAEK), or polyolefins such as polyethylene (PE), polyproplylene PP, cyclic olefin copolymer (COC), polyetherketone (PEK), polycarbonate (PC), polyphenylene ether (PPE), liquid crystal polymer (LCP), and/or combinations thereof, and talc or talc derivative blended with the polymer, at an elevated temperature so as to cause melting of the polymer and decomposition of talc or talc derivative to generate gas, where the gas causes foaming of the melted composition.

In some embodiments of the above method for manufacturing a foamed article, the at least one polymer comprises about 10% to about 80% by weight of said foamable composition. In some embodiments, the at least one polymer comprises about 30% to about 60% by weight of said foamable composition. In some embodiments, the at least one polymer comprises about 40% to about 55% by weight of said composition. In some embodiments, the at least one polymer comprises about 45% to about 50% by weight of said composition. In some embodiments, the at least one polymer comprises about 15%, 20%, 25%, 30%, 35%, 40%, 45%, 50%, 55%, 60%, 65%, 70% or 75%.

In some embodiments of the above method for manufacturing the foamed article, the talc or talc derivative comprises about 1% to about 50% by weight of said foamable composition. In some embodiments, the talc or talc derivative comprises about 2% to about 40% by weight of said foamable composition. In some embodiments, the talc or talc derivative comprises about 3% to about 30% by weight of said foamable composition. In some embodiments, the talc or talc derivative comprises about 4% to about 20% by weight of said foamable composition. In some embodiments, the talc or talc derivative comprises about 5% to about 10% by weight of said foamable composition. In some embodiments, the talc or talc derivative comprises about 6% to about 8% by weight of said foamable composition. In some embodiments, the talc or talc derivative is the only foaming agent in the foamable composition.

In some embodiments of the above method of manufacturing a foamed composition, the resultant foamed composition comprises a tensile strength of about 2,000 psi to about 10,000 psi. In some embodiments, the foamed article can be a separator, e.g., a separator suitable for use in a telecommunications cable, an insulation for an electrical conductor, or a jacket for a cable, e.g., a telecommunications cable.

In one embodiment, the processing of the foamable composition is performed by heating the foamable composition at a temperature of at least about 600° F. In another embodiment, the foamable composition is heated to a temperature of at least about 610° F., at least about 620° F., at least about 630° F., at least about 640° F., at least about 650° F., or at least about 660° F.

In one embodiment, the processing of the foamable composition is performed without employing gas injection. In other words, the processing of the foamable composition is performed without injecting gas from an external source into the molten composition. In such embodiments, the foaming of the composition to generate the foamed article is achieved only via chemical foaming, e.g., via decomposition of talc or talc derivative present in the foamable composition. In another embodiment, gas injection is employed in addition to decomposition of talc or talc derivative to generate the foamed article.

In some embodiments, the present invention is directed to a Power over Ethernet (PoE) cable. The PoE cable can comprise at least one electrical conduit comprising an electrically conductive core, an insulation that at least partially surrounds said electrically conductive core, and a polymeric separator extending from a proximal end to a distal end and having at least one channel adapted for receiving the at least one electrical conduit.

In some embodiments, the at least one electrical conduit in the PoE cable is capable of transmitting telecommunications data and carrying electrical power in a range of about 1 watt to about 25 watts.

In some embodiments, at least one of said insulation and said separator of the PoE cable comprises at least one foamed polymer. For example, the at least one foamed polymer can be substantially free of halogen. In some embodiments, the polymer is selected from the group consisting of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and combinations thereof. In some embodiments, the polymer comprises about 10% to about 80% by weight of said foamed polymer.

In some embodiments, the separator of the PoE cable can further comprise a fiber-optic channel for receiving an optical fiber cable. In some embodiments, an optical fiber is disposed in said fiber-optic channel. In some embodiments, the separator can include four or more (e.g., 4, 5, 6, 7, 8, 9, 10 or more) channels.

In some embodiments, the PoE cable further comprises a polymeric jacket surrounding said electrical conduit and the polymeric support element, said jacket being substantially free of halogens. In some embodiments, the jacket has a tensile strength of about 2,000 psi to about 10,000 psi.

In some embodiments, the insulation can further comprise an additive. For example, the additive can comprise at least one smoke suppressant additive, at least one flame retardant additive, or a combination thereof There are a wide range of applications for the compositions described herein, including the wire & cable, automotive, medical, filtration, oil and gas, and other industrial industries.

BRIEF DESCRIPTION OF THE DRAWINGS

Features and advantages of the claimed subject matter will be apparent from the following description of embodiments consistent therewith, which the description should be considered in conjunction with the accompanying drawings.

DETAILED DESCRIPTION OF THE INVENTION

Figure 1:
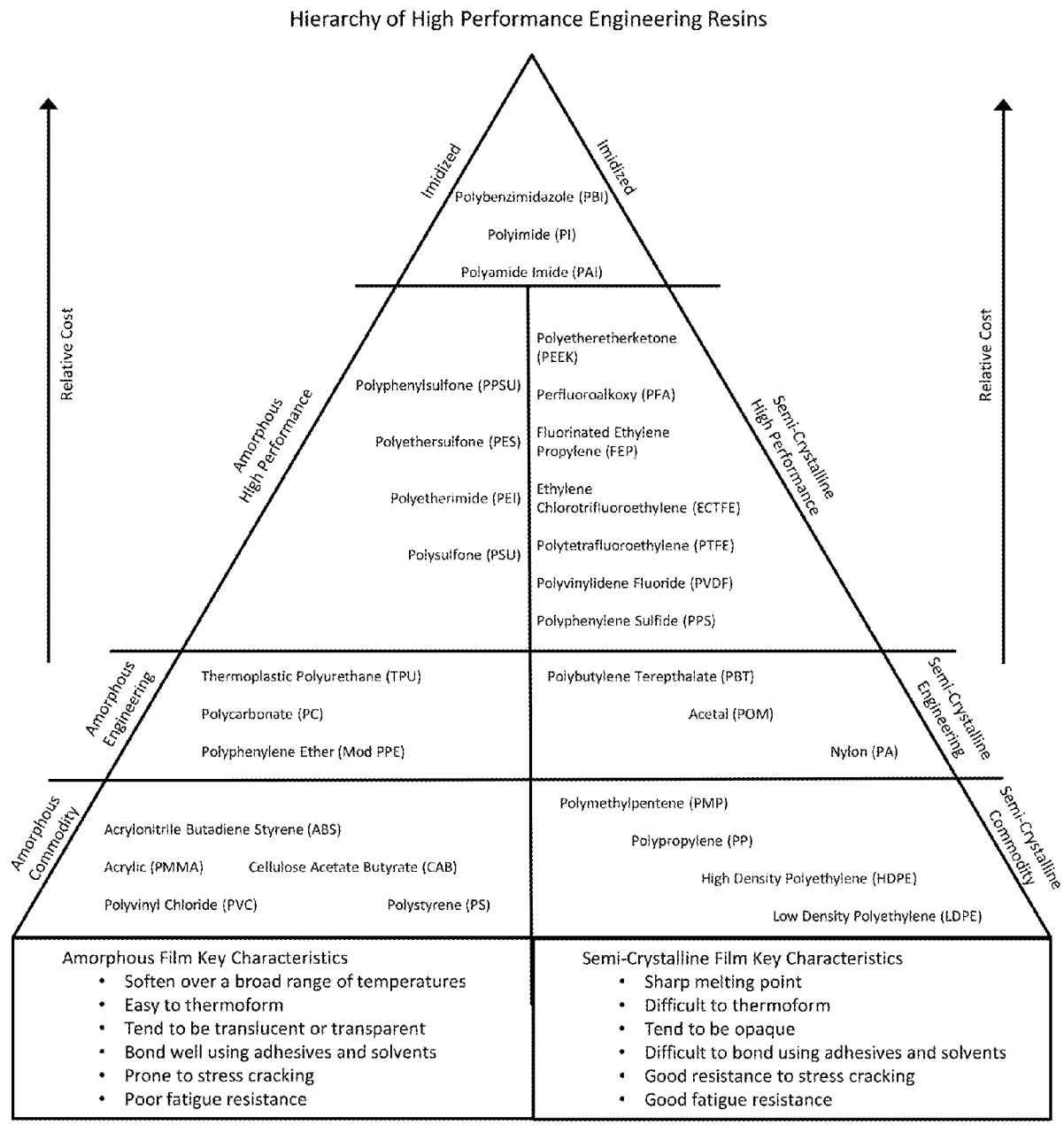
FIG. 1 illustrates a hierarchy of high performance engineering resins.

Certain exemplary embodiments will now be described to provide an overall understanding of the principles of the structure, function, manufacture, and use of the compositions, devices, and methods of producing and making the communication cables disclosed herein. One or more examples of these embodiments are illustrated in the accompanying drawings. Those skilled in the art will understand that the cables, cable components and methods of making the same specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

So that the invention may more readily be understood, certain terms are first defined.

As used herein, the terms "about" or "approximately" for any numerical values or ranges indicate a suitable dimensional tolerance that allows the composition, part, or collection of elements to function for its intended purpose as described herein. These terms indicate at most a ±5% variation about a central value.

The term "cross-talk" is used herein consistent with its common usage in the art to refer to electromagnetic interference between conductors, cables, or other electronic circuit elements.

The term "engineered resin" or "engineering polymer" as used herein refers to any of the following polymers: polyphenylenesulfide (PPS), polyetherimide (PEI), polysulfone (PSU), polypheylsulfone (PPSU), polyethersulfone (PES/

PESU), polyetheretherketone (PEEK), polyaryletherketone (PAEK), polyetherketoneketone (PEKK), polyetherketone (PEK), or polyolefins such as polyethylene (PE), polypropylene (PP), cyclic olefin copolymer (COC), polycarbonate (PC), polyphenylene ether (PPE), liquid crystal polymer (LCP), and/or combinations thereof.

The term "fibril" as used herein refers to a small slender filament having a length equal or less than about 200 microns and an aspect ratio defined as a ratio of length to width that is equal to or greater than about 100.

The term "electrically conductive material" as used herein refers to a material that exhibits an electrical surface resistivity less than about 50 ohms per square or a volume resistivity less than about 40 ohms-cm.

The term "inclusion" as used herein refers to a material that is at least partially contained within another material.

The term "needle-like" as used herein refers to the art recognized use of the term for a shape having a high aspect ratio, e.g., an aspect ratio greater than about 75.

The term "flake-like" as used herein refers to the art recognized use of the term for any polygonal shape.

The term "talc" is used herein consistent with its common usage in the art to refer to any natural or synthetic minerals with the chemical formula MgSiOH, $H_2Mg_3(SiO_3)_4$, $Mg_3Si_4O_{10}(OH)_2$, $3MgO.4SiO_2.H_2O$, or $MgOH.H_2O.SiOH$. The term "talc derivative" is used herein to refer to "talc" that includes additives or impurities such as, for example, dolomite (a magnesium calcium carbonate), chlorite (a magnesium aluminum silicate), magnesite (a magnesium carbonate), and calcium carbonate. Additives and/or impurities can be present as one or more minor components with talc, for example, each additive or impurity can comprise less than 1% (by weight), less than 2%, less than 3%, less than 4%, less than 5%, less than 6%, less than 7%, less than 8%, less than 9%, or less than 10% or more.

A "talc derivative" can also include other magnesium compounds, such as, for example, hydrotalcite. Hydrotalcite ($Mg_6Al_2CO_3(OH)_{16}.4(H_2O)$) can be natural or synthetic. An example of a synthetic hydrotalcite can be found in U.S. Pat. No. 5,075,087, the entirety of which is hereby incorporated by reference. Hydrotalcite mineral data can be found online, for example at: http://webmineral.com/data/Hydrotalcite.shtml#.VGt_u_nF-e5. Hydrotalcite is a layered double hydroxide whose name is derived from its resemblance with talc and its high water content. The layers of the structure may stack in different ways, to produce a 3-layer rhombohedral structure (3R Polytype), or a 2-layer hexagonal structure (2H polytype). The two polytypes are often intergrown. The carbonate anions that lie between the structural layers are weakly bound, so hydrotalcite has anion exchange capabilities.

As used herein, the term "melt-processable" is meant that the polymer can be processed (i.e. fabricated into shaped articles, insulation(s), jacket coatings, films, fibers, tubes, wire coatings and the like) by conventional melt extruding, injecting or casting means.

The term "thermoplastic" as used herein, refers to polymers that are pliable or moldable above a specific temperature and return to a solid state upon cooling. These polymers have the property of becoming soft when they are heated and of becoming rigid again when they are cooled, without undergoing an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

As used herein, the term "elastomer" is intended to designate a true elastomer or a polymer resin serving as a base constituent for obtaining a true elastomer. True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

As used herein, the term "active nucleating agent" is intended to denote a compound which acts both as a nucleating agent, as above described and, at the same time, participates in blowing, by at least partially decomposing to yield gaseous components.

As used herein, the terms "substantially halogen-free" or "substantially non-halogenated," and "substantially free of halogens" and similar terms are used interchangeably and describe a composition or an article of manufacture that is substantially free of one or more halogens (e.g. fluorine, chlorine, bromine, iodine). Such a composition (or article of manufacture) can be a composition (or article of manufacture) in which the halogen concentration is less than 10%, less than 5%, less than 2%, or less than 1% by weight of said composition (or article of manufacture). The substantially non-halogenated composition is a composition that is greater than 90%, 91%, 92%, 93%, 94%, 95%, 96%, 97%, 98%, 99%, 99.5%, or 99.9% free by weight of a (one or more) halogen. The compositions and articles of manufacture described herein that are substantially free of halogens may contain undetectable or untraceable amounts of halogens.

As used herein, "foaming level" is the ratio of the volume of cells in a cellular structure, e.g. a cellular separator, relative to the total volume of the structure.

Foamable Compositions

In one aspect, it has been discovered that talc (or talc derivative) can be utilized as a chemical foaming agent for foaming the following polymers: polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof.

In some embodiments, talc (or talc derivative) can be blended with one or more of these polymers to provide foamable compositions, which can foam when exposed to an elevated temperature at which talc (or talc derivative) disintegrates to generate gas. In some embodiments, the foamable composition comprise at least one of the above polymers (herein also referred to as engineered resins) at a concentration in a range of about 10% to about 80% by weight of the composition. In some embodiments, the polymer can comprise about 20% to about 70%, about 30% to about 60%, or about 40% to about 50%, by weight of the composition.

The concentration of the talc (or talc derivative) blended with one or more of the above polymers in a foamable composition according to the present teachings can typically vary in a range about 1% to about 50% by weight of the composition. By way of example, in some embodiments, the concentration of talc (or talc derivative) can be in a range of about 2% to about 40% by weight, about 3% to about 30% by weight, about 4% to about 20% by weight, about 5% to about 10% by weight, about 6% to about 8% by weight or about 7.5% by weight of the foamable composition. In some embodiments, the foamable composition can comprise talc (or talc derivative) at a concentration of about 1%, 2%, 3%, 4%, 5%, 6%, 7%, 8%, 9%, 10%, 11%, 12%, 13%, 14%, 15%, 16%, 17%, 18%, 19%, or 20% by weight of the foamable composition.

In some embodiments, talc (or talc derivative) is the only foaming agent present in a foamable composition according to the present teachings. In other embodiments, in addition to talc (or talc derivative), the foamable composition can include other chemical foaming agents. By way of example, such additional chemical foaming agents can include, without limitation, magnesium carbonate, calcium carbonate, and dolomite. In some embodiments, the concentration of such additional foaming agents in a foamable composition according to the present teachings can be, e.g., in a range of about 0.1% to about 20%. In some embodiments, the combined concentration of talc (or talc derivative) and one or more additional foaming agents can be in range of about 1% to about 50%, e.g., in a range of about 5% to about 40%, about 10% to about 35%, about 20% to about 30%.

In some embodiments, in a foamable composition according to the present teachings, talc (or talc derivative) functions as both a foaming agent as well as a nucleating agent. In other words, in such embodiments, talc (or talc derivative) functions as an active nucleating agent.

In some embodiments, a foamable composition according to the present teachings can further include a nucleating agent. Some examples of suitable nucleating agents include, without limitation, boron nitride (BN), zinc oxide, titanium dioxide, calcium carbonate, clay and nano-clays and carbon and nano-carbons.

The foamable compositions described herein are melt processable, at a temperature sufficient to melt at least one polymer constituent of the composition and to cause talc (or talc derivative) to disintegrate so as to generate gas for foaming the composition. For example, in some embodiments, a foamable composition according to the present teachings is melt processable at a temperature of at least about 600° F., at least about 610° F., at least about 620° F., at least about 630° F., at least about 640° F., at least about 650° F., at least about 660° F., at least about 670° F., at least about 680° F., or at least about 690° F.

In some embodiments, a foamable composition according to the present teachings can be in the form of a plurality of pellets. As discussed in more detail below, such pellets can be processed, e.g., via extrusion, so as to fabricate a variety of different types of foamed articles, e.g., separators, wire insulation, cable jackets, etc.

Foamed Articles

The foamable compositions according to the present teachings can be utilized to fabricate a plurality of different types of foamed articles. The foamed articles can include foamed separators, insulation for conductors, tape, cable jackets, and other components of communication cables as described herein.

In some embodiments, the foamed articles comprise polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polypropylene (PP), cyclic olefin copolymer (COC), polycarbonate (PC), polyphenylene ether (PPE), liquid crystal polymer (LCP), and/or combinations thereof. In some embodiments, the foamed articles are substantially free of halogens. Commercially available solid or foamed flame retardant/smoke suppressed engineered resins, PPS, PEI, PSU, PPSU, PES/PESU, PEEK, PAEK, PEKK, PEK, PE, PP or COC all possess good dielectric properties. In addition, they also exhibit a good resistance to burning and generally produce less smoke than FEP under burning conditions. A combination of the two different polymers can reduce costs while minimally sacrificing physio-chemical properties. Additional advantages with the PPS, PEI, PSU, PPSU, PES/PESU, PEEK, PAEK, PEKK, PEK, PE, PP or COC are reduction in cost and toxicity effects as measured during and after combustion.

In some embodiments, the foamed articles further comprise one or more additives. In one aspect, the additive comprises a smoke suppressant additive. In another aspect, the additive comprises a flame retardant additive. In another aspect, the additive comprises a smoke suppressant additive and a flame retardant additive.

For example, additives for the foamed articles described herein include the molybdate derivatives, such as molyoxide, ammonium octamolybdate (AOM), calcium molybdate and zinc molybdate, metal oxides, such as Ongard II, zinc and other oxides, borates, such as zinc borate and meta borate, stannates, such as zinc hydroxyl stannates and zinc stannates, Nitrogen-Phosphorus, phosphorus based esters, such as triaryl, tri aklkyl, and ADP, and magnesium hydrates/carbonates, such as magnesium hydroxide, magnesium carbonate, and antimony trioxide, decachlorodiphenyloxide, and alumina trihydrate. In one aspect, an additive is a combination of 2, 3, 4, 5, 6, or more additives. For example, an additive comprises zinc oxide. In another aspect, an additive comprises calcium molybdate. In one aspect, an additive comprises zinc oxide, calcium molybdate, or combinations thereof. In another aspect, the at least one additive comprises antimony trioxide and at least one of decachlorodiphenyloxide, chlorinated dioctylphthalate, and chlorinated diisooctylphthalate.

In some embodiments, the foamable compositions and foamed articles can comprise blends of PEI, PSU, PPSU, PES, PEEK, PAEK, PE, PP or COC as well as comprise additives that include $C_{60}$ fullerenes and compounds that incorporate the fullerenes and substituted fullerenes including nanotubes as well as inorganic clays and metal oxides as required for insulative or semi-conductive properties in addition to the flame and smoke suppression requirements.

In some embodiments, the foamed articles can have a tensile strength greater than about 2000 psi, greater than about 2500 psi, greater than about 3000 psi, greater than about 3500 psi, greater than about 4000 psi, greater than about 4500 psi, greater than about 5000 psi, greater than about 5500 psi, greater than about 6000 psi, greater than about 7000 psi, greater than about 8000 psi, greater than about 9000 psi, or greater than about 10000 psi. Typically, a foamed article according to the present teachings exhibits a tensile strength in a range of about 2000 psi to about 10,000 psi.

In some embodiments, a foamed article according to the present teachings can exhibit a specific gravity greater than about 0.75, greater than about 1, greater than about 1.1, greater than about 1.2, greater than about 1.3, greater than about 1.4, greater than about 1.5, greater than about 1.6, greater than about 1.7, greater than about 1.8, or greater than about 1.9 g/liter. In some embodiments, a foamed article according to the present teachings can exhibit a specific gravity in a range of about 0.75 to about 1.5 g/liter.

Some examples of foamed articles according to the present teachings include, without limitation, separators, insulation for electrical conductors, tapes, cable jackets, and fiber optic sheathing.

In some embodiments, the foamed articles described herein exhibit a foaming level of about 10% to about 80%, e.g., in a range of about 15% to about 70%, or in a range of about 20% to about 60%, or in a range of about 25% to about 50%, or in a range of about 30% to about 40%. In some embodiments, the foaming level is about 10%, about 15%, about 20%, about 25%, about 30%, about 35%, about 40%, about 45%, about 50%, about 55%, about 60%, about 65%, about 70%, about 75%, or about 80%.

In some embodiments, the foamed article can comprise foamed cells having a maximum dimension (e.g., diameter) in a range of about 0.0005 inches to about 0.003 inches. In some cases, the foamed cells can have an average diameter of about 0.0008 inches. The foamed cells can have a closed cell structure, an open cell structure, or a combination thereof. In some embodiments, a majority of the foamed cells (e.g., greater than 50%) have a closed cell structure. For example, greater than 50%, greater than 60%, greater than 70%, greater than 80% or greater than 90% of the foamed cells have a closed cell structure. Another embodiment includes talc, during blowing or foaming, reacting synergistically with another composition (e.g., $MgCO_3$) to form smaller, more uniform cell structures in the foamed or blown other composition.

Separators

Figure 2A:
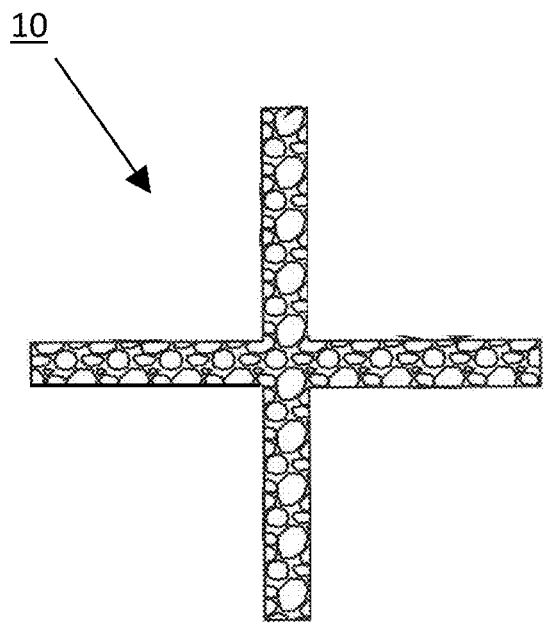
FIG. 2A depicts a cross-sectional view of a foamed separator according to an embodiment of the invention.
Figure 2B:
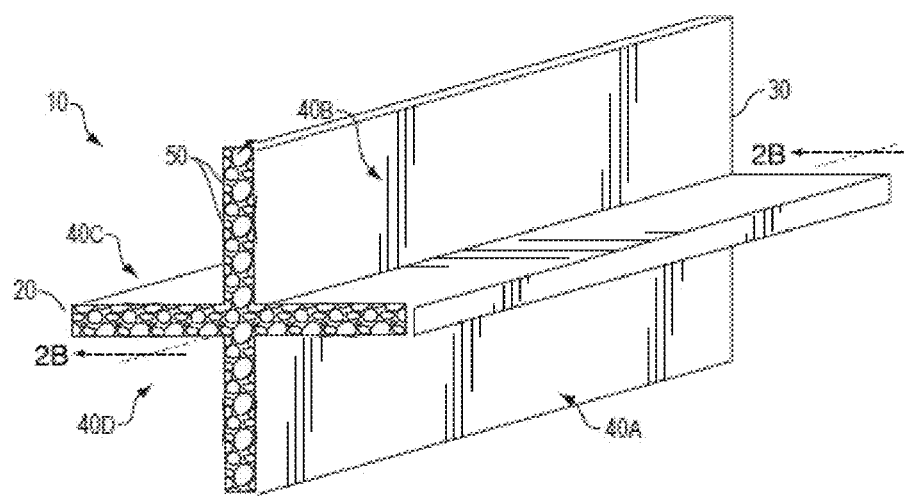
FIG. 2B depicts a longitudinal view of the foamed separator of FIG. 2A.

In one aspect, the invention provides separators, e.g., for use in telecommunications cables, that provide shielding of electromagnetic radiation. In some embodiments such separators can be formed into predefined shapes, e.g., by extrusion via a die. For example, a die with a cross-shaped opening can be used to form an elongated separator that has an elongated cross-shaped form. By way of example, FIGS. 2A and 2B schematically depict a pre-formed foamed separator 10 according to one embodiment of the invention that has an elongated cross-shaped form, which extends from a proximal end 20 to a distal end 30. The separator 10 provides four elongated channels 40A, 40B, 40C, 40D, in each of which one or more conductors, e.g., a twisted-pair wire, can be disposed. In many embodiments, the separator 10 is particularly effective in lowering the cross-talk in a frequency range of about 1 MHz to about 40 GHz, or in a range of about 1 MHz to about 10 GHz, or in a range of about 1 MHz to about 2 GHz, or in a range of about 1 MHz to about 1.5 GHz between the conductors disposed in neighboring channels. In other embodiments, the separator 10 is particularly effective in lowering cross-talk in a frequency range of about 500 MHz to about 1 GHz, in a range of about 500 MHz to about 10 GHz, in a range of about 1 MHz to about 40 GHz, in a range of about 1 MHz to about 10 GHz, in a range of about 1 MHz to about 2 GHz, or in a range of about 1 MHz to about 1.5 GHz. These frequency ranges are particularly useful for separators in cables used for high speed transmission of information. For example, to transmit information through a cable at a higher bit rate, a higher bandwidth is required which, in turn, requires transmission of signals at higher frequencies.

Current data cabling performance requirements are defined by ANSI-TIA-568-C.2. One performance requirement for communications cables is known as attenuation to crosstalk ratio, far end ("ACRF"). ACRF is a measure of how much signal is received at the far end of a given cable as a ratio of the interfering signal induced by adjacent conductor pairs in the cable. Improved reduction of cross talk between conductors in a cable can enable data transmission at higher frequencies. For example, cables that incorporate the separators, tapes, and other materials according to embodiments of the invention can reduce cross talk at a given frequency, raising ACRF and thereby enabling high performance cable properties.

Referring to FIGS. 2A and 2B, separator 10 comprises any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof.

In some embodiments, the polymer can comprise at least about 30%, or at least about 40%, or at least about 50%, or at least about 60%, or at least about 70%, or at least about 80%, or at least about 85%, or at least about 90%, or at least about 95% of the volume of the separator.

Referring back to FIGS. 2A and 2B, in this embodiment separator 10 has a foamed structure. In other words, a plurality of cells (e.g., gas-filled cells) 50 are distributed throughout separator 10 (the size and the density of the cells are not necessarily shown to scale in the figures). While in some embodiments, the cells 50 can be distributed substantially uniformly throughout the separator 10, in other embodiments, the distribution of the cells 50 can be non-uniform. In some embodiments, the cells 50 comprise a volume fraction of the separator 10 in range of about 10% to about 50%, e.g., in a range of about 15% to about 45%, or in a range of about 20% to about 40%, or in a range of about 20% to about 40%, or in a range of about 25% to about 35%. In some embodiments, at least a portion of the cells, or in some cases the majority or even all of the cells, have a closed structure.

Figure 3A:
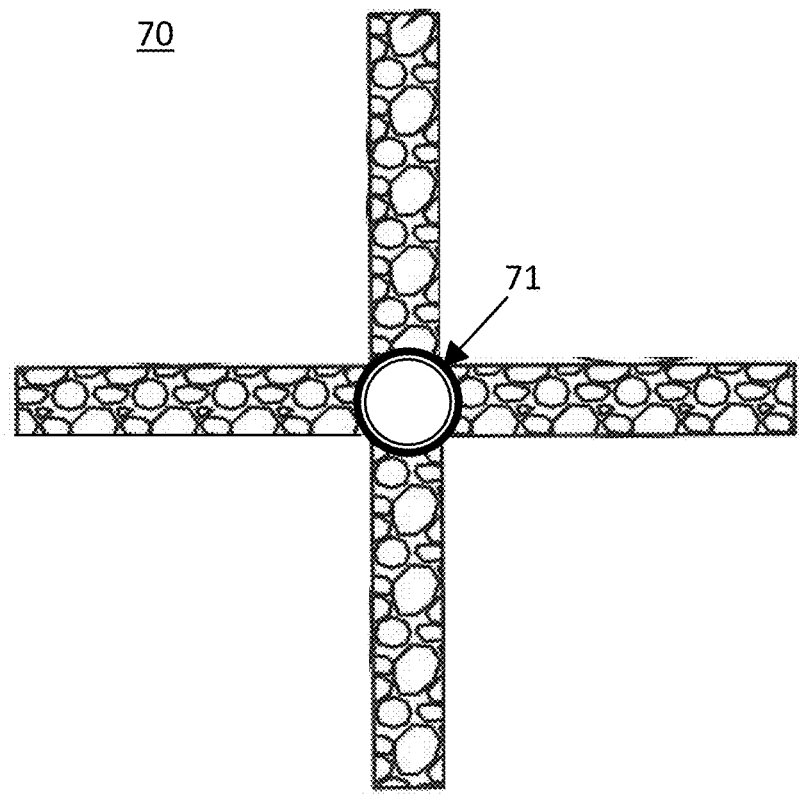
FIG. 3A depicts a cross-sectional view of a foamed separator and a center channel disposed in the separator according to another embodiment of the invention.

The separator 70 shown in FIG. 3A also has a foamed structure. Separator 70 further comprises a center channel 71, which is configured for receiving a fiber optic cable and/or an electrical conductor. In some embodiments, center channel 71 is empty (i.e., it does not receive a fiber optic cable and/or an electrical conductor). This configuration can allow for the dissipation (e.g., by convection) of heat generated from the electrical conductors disposed in the channels defined by the separator 70. The fiber optic blown tube for fiber and/or electrical conductor channel 71 runs substantially along the center of separator 70.

Figure 6:
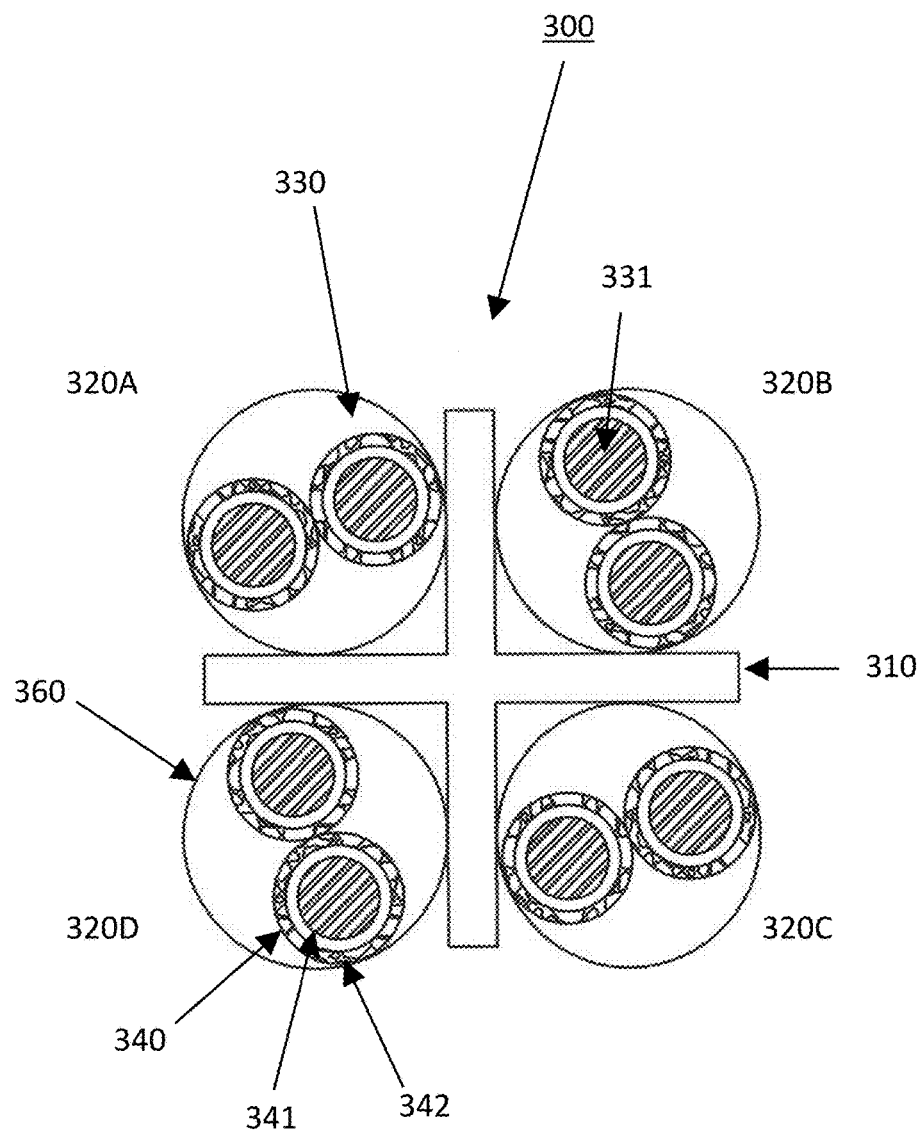
FIG. 6 schematically depicts a cross-sectional view of a separator and a plurality of conductors disposed in longitudinal channels provided by the separator in accordance with an embodiment of the invention.

As shown schematically in FIG. 6, in use, a plurality of conductors 331 can be disposed in the channels 320A, 320B, 320C, and 320D provided by the separator 310. The conductors can be, for example, twisted pairs of wires. The separator 310 minimizes, and preferably eliminates, cross-talk between the conductors 331 disposed in channels 320A, 320B, 320C, and 320D. For example, when conductors 331 are used to transmit telecommunications data at rates up to about 100 Gbits/sec, or in a range of about 1 Mbit/sec to about 100 Gbits/sec, or in a range of about 1 Mbit/sec to about 40 Gbits/sec., the foamed structure of the separator can facilitate electromagnetic shielding of the conductors disposed in neighboring channels from one another. The shielding can in turn minimize, and preferably effectively eliminate, the cross-talk between the neighboring conductors at frequencies corresponding to those emitted by the conductors, e.g., frequencies in a range of about 500 MHz to about 1 GHz or a frequencies in a range of about 500 MHz to about 10 GHz.

Figure 4:
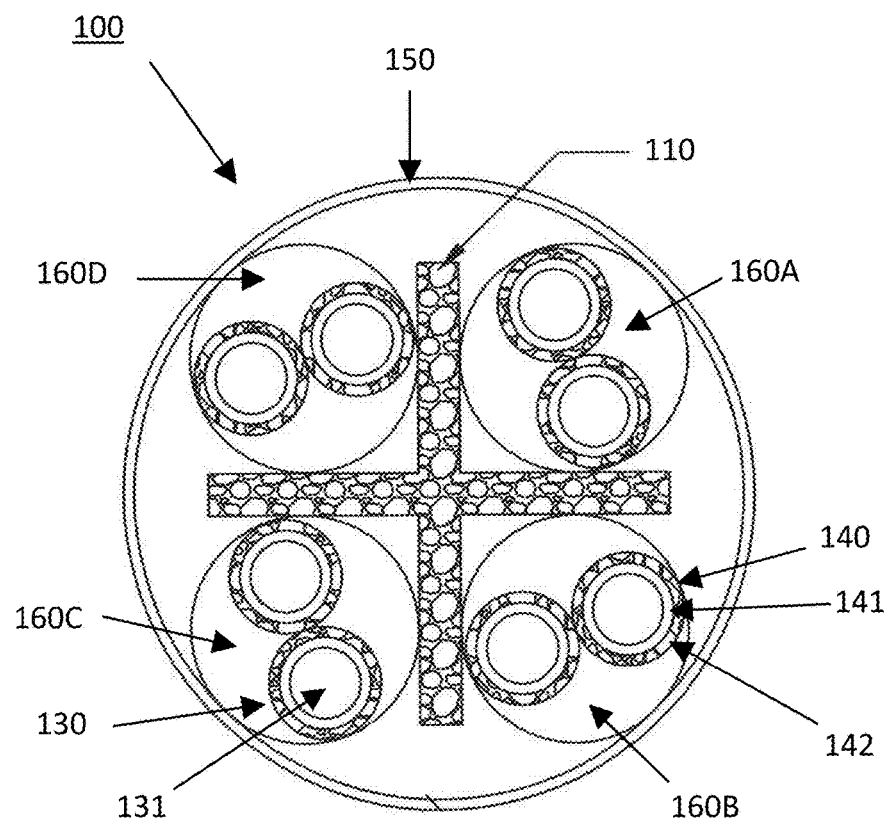
FIG. 4 illustrates a communications cable in accordance with an embodiment of the invention.
Figure 5:
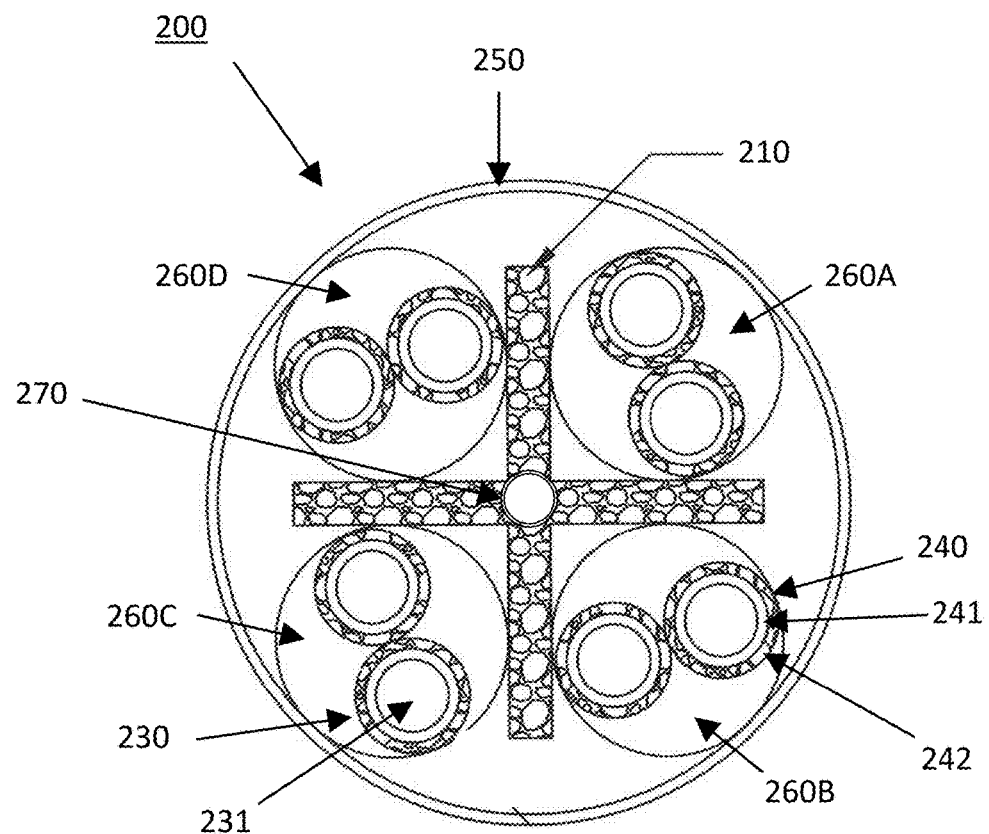
FIG. 5 illustrates another communications cable in accordance with an embodiment of the invention.

Conductors, such as the insulated twisted pairs, for example shown in FIGS. 4 and 5, can be disposed in each channel of separator 110 or 210 according to the present teachings. The pairs run the longitudinal length of the separator. While this embodiment depicts one twisted pair per channel, there may be more than one pair per channel. The twisted pairs are insulated with a suitable polymer, copolymer, or dual extruded foamed insulation with solid skin surface. The conductors are those normally used for optical or conventional data transmission. The twisted pairs may be banded such that the insulation of each conductor is physically or chemically bound in an adhesive fashion, or an external film could be wrapped around each conductor pair to provide the same effect. Although some embodiments utilize twisted pairs, one could utilize various types of insulated conductors within the separator channels or cavities.

While the separators 110 and 210 have a cross-shaped cross-sectional profile, in other embodiments the separator can have other shapes. Other exemplary shapes that can be used for separators according to the present teachings are disclosed in US Publication No. 2010/0206609, filed Apr. 6, 2010, entitled "High Performance Support-Separators for Communications Cables Providing Shielding for Minimizing Alien Crosstalk," US Publication No. 2007/0151745, filed Mar. 2, 2007, entitled "High Performance Support-Separators for Communications Cables," US Publication No. 2008/0066947, filed Jul. 16, 2004, entitled "upport Separators for Communications Cable," and U.S. Pat. No. 7,098,405, filed May 1, 2002, entitled "High Performance Support-Separator for Communications Cables," the teachings of which are each incorporated herein by reference in their entirety.

Figure 3B:
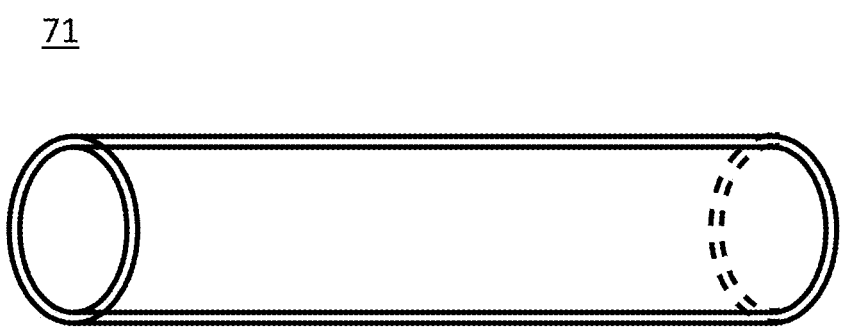
FIG. 3B depicts a longitudinal view of the center channel of FIG. 3A.

For example, a separator can have configurations shown in FIGS. 15, 16, 17, 18, and 19. As shown and described herein, a separator can be a polymeric preformed elongate support element. The separator extends from a proximal end to a distal end. The separator also defines a plurality of channels, e.g., 2, 3, 4, 5, 6, 7, 8, 9, 10, 11, 12, 13, 14, 15, 16, 17, 18, 19, 20 or more channels. The channels are each adapted for receiving, for example, an electrical (e.g., copper) conductor, an optical fiber cable, or a combination thereof. In some aspects, the separator may also define a center channel (e.g., see FIGS. 3A-3B), adapted to receive, for example, a copper conductor, an optical fiber cable, or a combination thereof. It will be readily apparently to one of ordinary skill in the art that a number of configurations are possible for riser and plenum applications. In any of these configurations, the separator can be formed from a (one or more) substantially non-halogenated polymer.

Referring back to FIGS. 2A and 2B, in some embodiments, the separator 10 is substantially halogen-free. For example, in some embodiments, the separator 10 can be formed of one or more substantially non-halogenated polymer. In some embodiments, such a halogen-free separator can be formed by using only one or more of the engineered resins disclosed herein. In some embodiments, the separator 10 can further include non-halogen additives, such as those disclosed herein. Such a halogen-free separator according to the present teachings can be used in cables, e.g., telecommunications cable, that can satisfy the most stringent standards, such as the North American Standard for Plenum (CMP) U.L. 910, North American Standard for Riser (CMR) U.L. 1666 Vertical and the European Standard Class $B1_{ca}$, $B2_{ca}$, and $C_{ca}$.

The separators described herein can be used in a variety of cables, including shielded and unshielded cables. A shielded cable comprises a metal braid, metal tape, or both that surrounds the separator 10 to provide shielding of alien cross-talk. In some cases, in use, the metal braid, metal tape, or both can be grounded. The metal braid, metal tape, or both is in turn surrounded by a jacket, which can be formed of a polymeric material. In some embodiments, the jacket is formed of a polymer, such as polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof.

In some embodiments, the foamed articles described herein such as the separators, exhibit a foaming level of about 10% to about 80%, e.g., in a range of about 15% to about 70%, or in a range of about 20% to about 60%, or in a range of about 25% to about 50%, or in a range of about 30% to about 40%. In some embodiments, the foaming level is about 10%, about 15%, about 20%, about 25%, about 30%, about 35%, about 40%, about 45%, about 50%, about 55%, about 60%, about 65%, about 70%, about 75%, or about 80%.

In some embodiments, the separator 10 can comprise an additive, such as a smoke suppressant additive. In another aspect, the additive comprises a flame retardant additive. Some examples of suitable additives include molybdate derivatives, such as molyoxide, ammonium octamolybdate (AOM), calcium molybdate and zinc molybdate, metal oxides, such as Ongard II, zinc and other oxides, borates, such as zinc borate and meta borate, stannates, such as zinc hydroxyl stannates and zinc stannates, Nitrogen-Phosphorus, phosphorus based esters, such as triaryl, tri aklkyl, and ADP, and magnesium hydrates/carbonates, such as magnesium hydroxide, magnesium carbonate, and antimony trioxide, decachlorodiphenyloxide, and alumina trihydrate. In some embodiments, an additive is a combination of 2, 3, 4, 5, 6, or more additives. For example, an additive can comprise zinc oxide, calcium molybdate, or a combination of zinc oxide and calcium molybdate.

Figure 25:
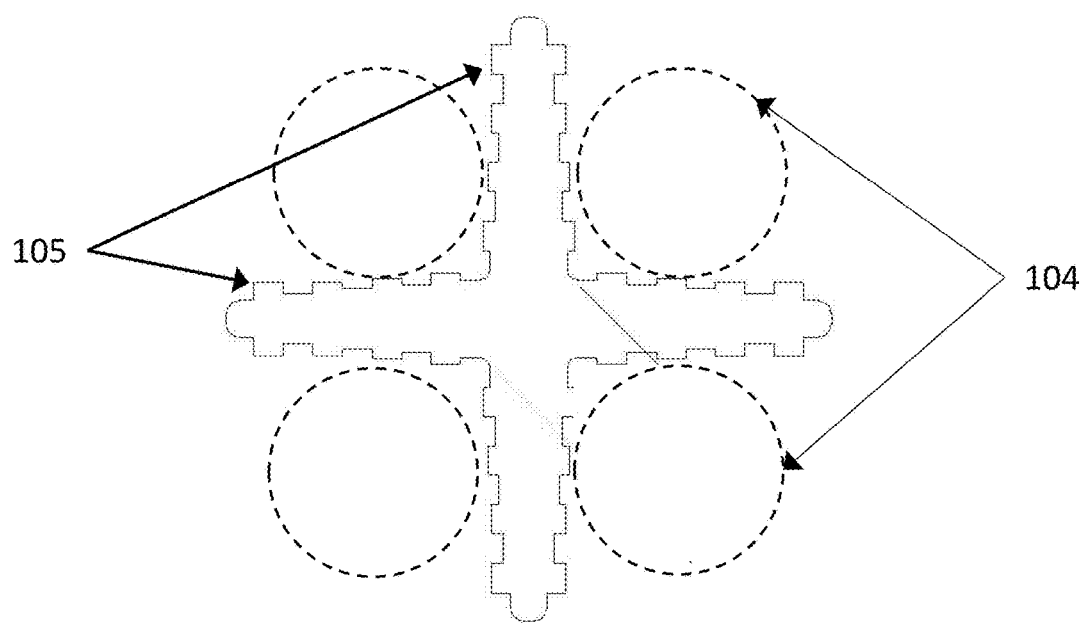
FIG. 25 is a cross-sectional view of a cross-shaped separator with rifled or "saw-blade" like members according to an embodiment of the invention.

In some embodiments, the separators described herein in accordance with the present teachings can include rifled slot members or "saw-blade" like members. For example, FIG. 25 is a cross-sectional view of separator 103, which provides a plurality of channels 104 and includes rifled slots (members) or "saw-blade" like members 105. The use of interior slotted rifled slot sections allows for improved heat dissipation (i.e., cooling of the cable) based on the overall depth and number of slots of the rifled section. This allows for more air to dissipate heat (e.g., via convection) generated by the electrical conductors or twisted pairs. Separator 103 with rifled slots can be solid or foamed and can be formed of one or more polymeric materials (e.g., one or more engineered resins).

In some embodiments, rifled slot separators disclosed in published U.S. patent application Ser. No. 13/183,733, filed Jul. 15, 2011, the contents of which are incorporated by reference, can be foamed in accordance with the present teachings, e.g., by using one or more engineered resins and employed in PoE cables.

Figure 26:
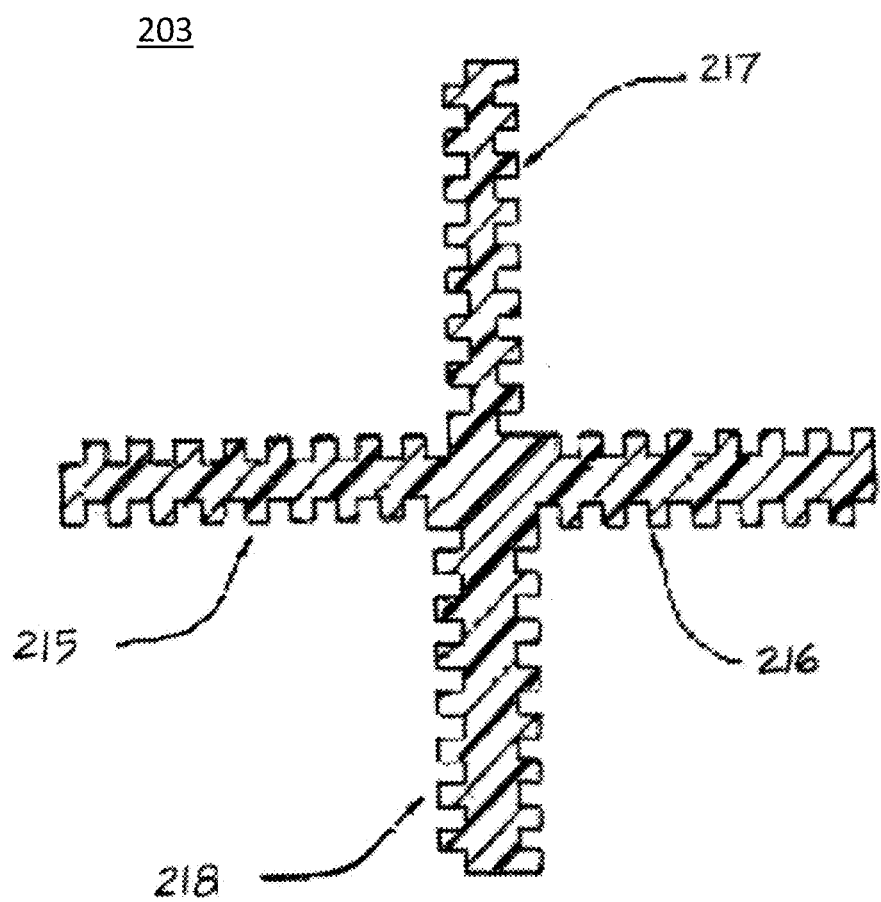
FIG. 26 is a cross-sectional view of an asymmetric cross-shaped separator with rifled or "saw-blade" like members according to an embodiment of the invention.

For example, shown in FIG. 26, separator 203 is asymmetrical and can comprise one or more polymeric materials (i.e., engineered resins) in accordance with the present teachings. The vertical and horizontal sections along an axis can have varying widths. The left side horizontal member 215 is narrower in width than that of the right side horizontal member 216. Similarly, the vertical member 217 extending in an upward direction is narrower in width than that of the other vertical member 218. Separator 203 can include rifled slots (members) or "saw-blade" like members. As described herein, this configuration can allow for the dissipation of heat (e.g., by convection) generated from the electrical conductors.

Figure 27:
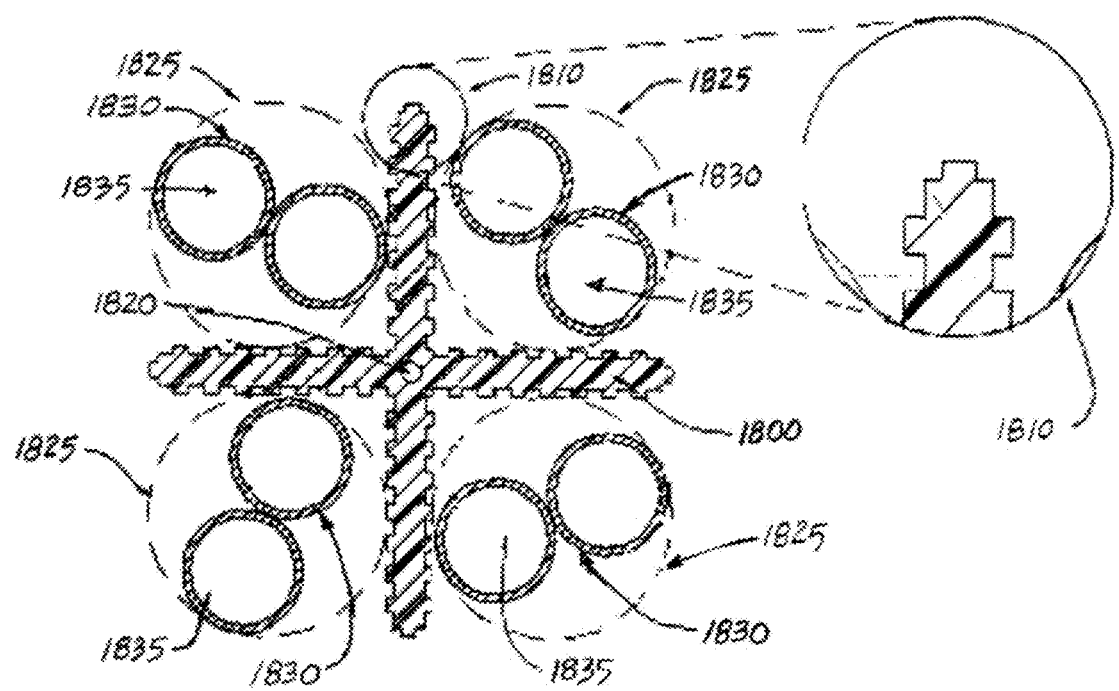
FIG. 27 is a cross-sectional view of a symmetrically shaped separator with rifled like members and a plurality of conductors disposed in longitudinal channels provided by the separator in accordance with an embodiment of the invention.

In another embodiment, FIG. 27 illustrates separator 1800 including rifled slots (members) and is symmetrically balanced. Separator 1800 can optionally be formed using a solid or foamed polymeric material (e.g., substantially free of halogen) as described herein. The rifled separator can also have four "tipped" ends that have key-like features 1810. The rifled cross separator provides channels for conductors or conductor pairs 1825 (i.e., twisted pairs) that can be insulated. Each conductor or conductor pair can include an outer insulation material 1830 and an electrically conducting portion of the conductor 1835. A hollow center channel in the center 1820 can optionally aid for the purpose of heat dissipation and heat reduction of the cable.

Figure 28A:
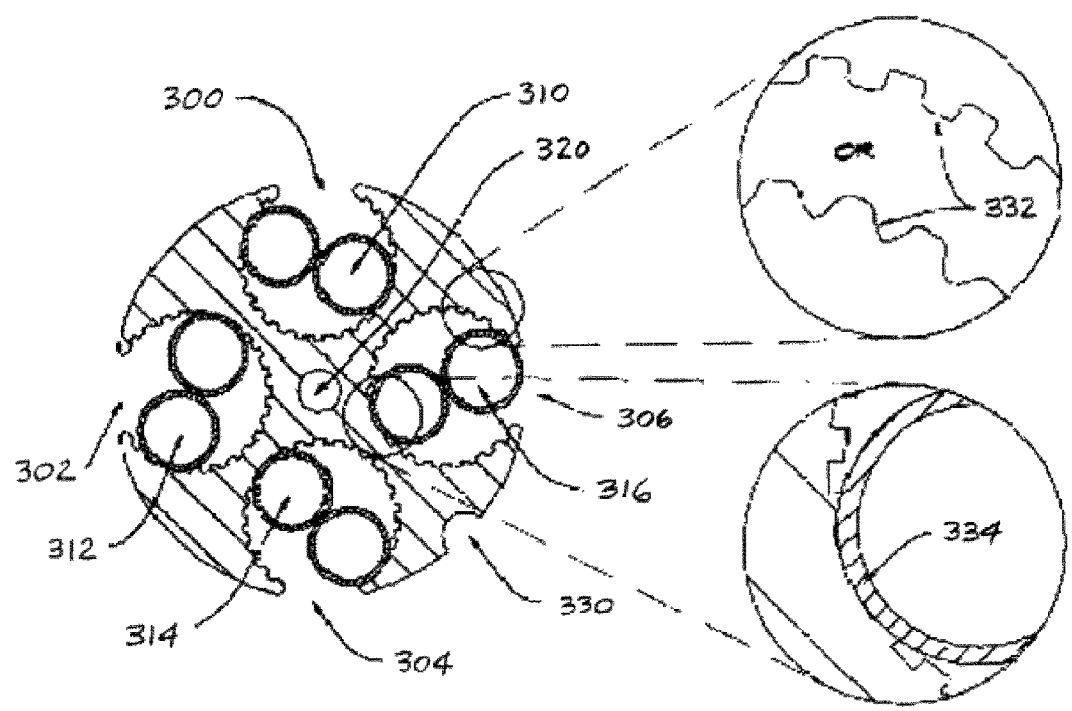
FIG. 28A is a cross-sectional end view of an anvil-shaped separator having slotted rifled sections.

FIG. 28A depicts a cross-section of an anvil-shaped separator. The anvil-shaped separator can include four channels (300, 302, 304, and 306) that are configured to receive electrical conductors (e.g., twisted pairs) and/or fiber optic cables. The channel centers are about 90 degrees apart relative to the center of the separator. As illustrated in FIG. 28A, in each channel is one set of twisted pairs (310, 312, 314, and 316). This embodiment also includes a cavity in the center (e.g., center channel) 320 of the anvil-shaped separator for an electrical conductor, fiber optic cable, or air. The exploded view of FIG. 28A also indicates the use of an interior slotted rifled section or sections 332 that allows for improved heat dissipation (i.e., cooling of the cable) based on overall depth and number of slots of the rifled section and improving electrical characteristics as described above (allowing for more air around each insulated conductor or pair). As shown in the other exploded view (334), the individual conductor may compress against a solid or foamed slotted rifled surface (e.g., a polymeric engineered resin) to ensure the semi-permanently fixed position.

Figure 28B:
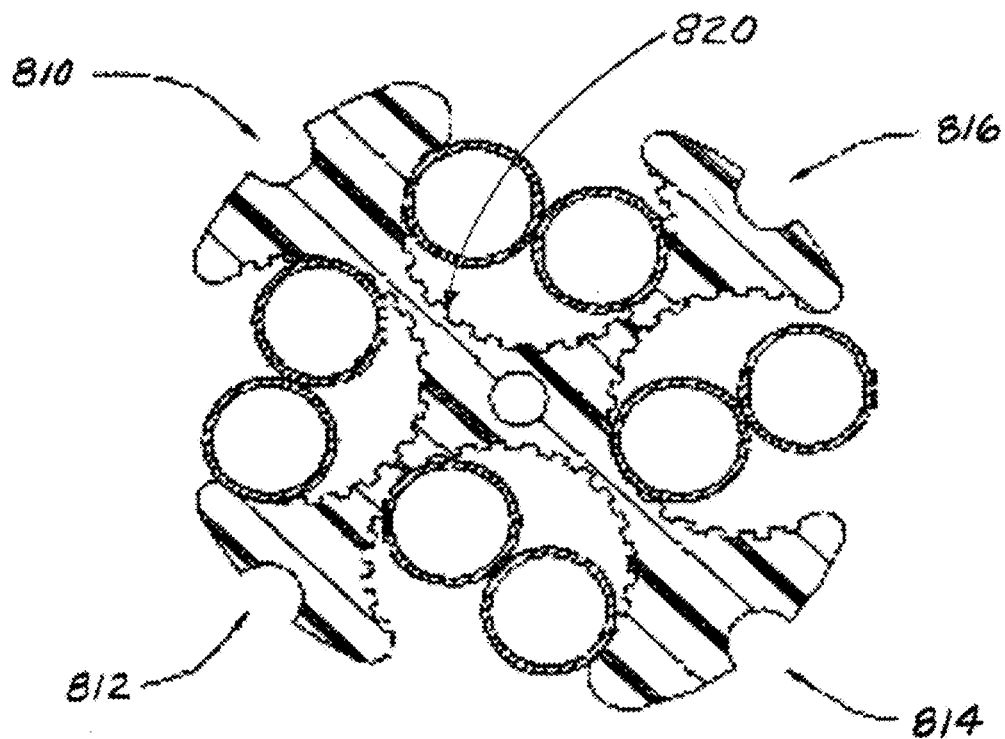
FIG. 28B is a cross-sectional view of a separator with rounded regions at the end of each anvil section.

FIG. 28B depicts an embodiment of an anvil-shaped separator which has end sections 810, 812, 814 and 816 to reduce weight and allow for the dissipation of heat (e.g., by convection) generated from the electrical conductors resulting in enlarged channels for electrical conductors and/or fiber optic cables. This separator also has rifled slots within each channel and an optional asymmetric conductor pair offset due to the skewed elongated axis.

The separators shown, for example, in FIGS. 25-28, can be substantially free of halogens (e.g., an engineered resin) in accordance with the present teachings. It will be readily apparent that any of the separators, such as, for example, those illustrated in FIGS. 15-19C, can include rifled slots or "saw-blade" like members. The separators illustrated in FIGS. 25-28 can be foamed or solid. The rifled or ribbed-like structures can allow for and aid in cooling of the cable. The rifled structures create space (i.e., air gaps) within the cable (e.g., between a jacket and the separator, between the twisted pairs and the separator, etc.). Air inside can cool the cable through convection, allowing air to travel along the cable, mitigating heat rise.

Insulation for Conductors

In one aspect, the present invention provides insulation for metal conductors. In some embodiments, such insulation can have a multi-layer structure formed, e.g., of different polymeric materials. For example, the insulation can include a bi-layer structure in which the inner layer (i.e., the layer in direct contact with the conductor) is a foamed polymeric layer, and the outer layer is either a foamed or a solid polymeric layer. In some embodiments, one or both layers include flame retardant and/or smoke suppressant additives. In some embodiments, a bi-layer structure can be extruded in tandem or co-extruded.

By way of example, FIG. 6 schematically depicts an insulated twisted pair of electrical conductors 330 according to an embodiment of the present teachings, which includes a centrally disposed elongated electrical conductor 331 and an insulation 340 that surrounds the electrical conductor. In some embodiments, the electrical conductor 331 can comprise copper or silver, though other metals can also be employed. For example, the electrical conductor 331 can be formed of any of 16, 18, 20, 22, or 24 AWG copper.

In some embodiments, the insulation 340 includes an inner layer 341 and an outer layer 342. The inner layer 341 can completely or partially surround the electrical conductor 331 and the outer layer 342 can completely or partially surrounding the inner layer 341.

In some embodiments, the thickness of the insulation 340 can be, e.g., in a range of about 0.005 to about 0.009 inches. By way of example, the inner layer 341 can have a thickness in a range of about 3.5 to about 8.0 mils and the outer layer 342 can have a thickness in a range of about 3.5 to about 8.0 mils.

In this embodiment, the inner layer 341, which is in contact with and surrounds the electrical conductor 331, comprises a foamed or a solid polyolefin. By way of example, the inner layer 341 can comprise a foamed polyolefin, such as a foamed polyethylene, a foamed polypropylene, or a foamed cyclic olefin copolymer. Further, in some embodiments, the inner layer can comprise solid or foamed polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof. In some embodiments, the inner layer can comprise a silicone polymer.

In some embodiments, a smoke and/or flame retardant additive can be added to the inner layer. In some embodiments, such additive can include, without limitation, magnesium complexes, molybdate complexes, phosphate complexes, alumina trihydrate (ATH), zinc borate, zinc oxide or talc (or talc derivative) or a combination of two or more of such additives. By way of example, in some embodiments, particulates (e.g., particles, such as nanosized particles) of zinc oxide (ZnO), or calcium molybdate (or other smoke and/or fire retardant) can be added to the inner layer. In some embodiments, a combination of zinc oxide and ATH is added to the inner layer for both flame retardancy and smoke suppression. In some embodiment, the molybdate complexes added to the inner layer can include, without limitation, molybdenum oxide, calcium molybdate, zinc molybdate, ammonium octamolybdate. In some embodiment, the additive added to the inner layer can be a phosphate complex, such as ammonium polyphosphate, melamine phosphate, or PNS phosphate.

By way of example, in some embodiments, the inner layer is formed of a foamed polyolefin and the outer layer is formed of solid PEEK.

In some embodiments, both the inner and the outer layer are substantially halogen-free so that to provide a halogen-free insulation. As discussed in more detail below, such halogen free insulation can be used for electrically insulating conductors employed in a halogen-free cable. Again, as discussed in more detail below, such a halogen-free cable can meet the most stringent tests for flame retardancy and smoke suppression, such as the North American Standard for Plenum (CMP) U.L. 910, North American Standard for Riser (CMR) U.L. 1666 Vertical and the European Standard Class $B1_{ca}$, $B2_{ca}$, and $C_{ca}$.

Figure 7:
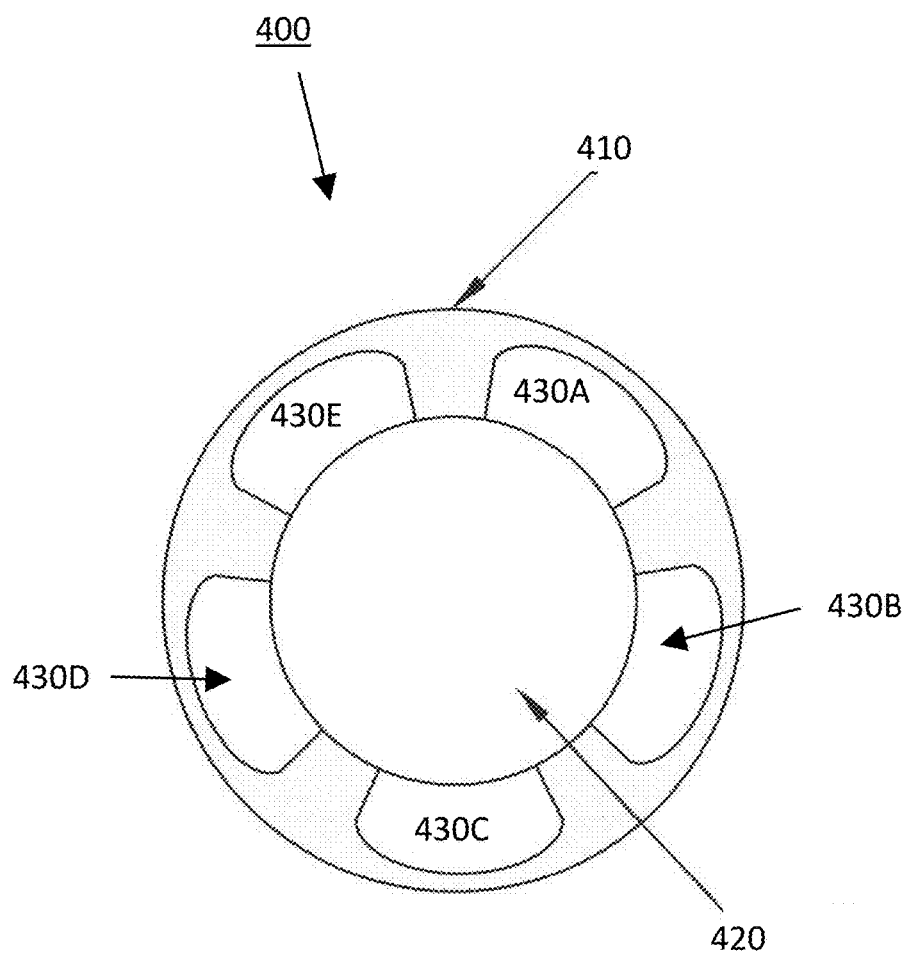
FIG. 7 schematically depicts a cross-sectional view of one embodiment of an electrical conduit in accordance with an embodiment of the invention.

Referring to FIG. 7, an insulation 410 according to the present teachings, surrounds a conductor 420 (which is a copper wire in this embodiment, but can be any other suitable conductor). The insulation 410 includes a plurality of cavities 430A, 430B, 430C, 430D, and 430E (herein referred to collectively as cavities 430). In some embodiments, these cavities are filled with air, though other gases can also be employed. The insulation 410, which can be a solid or a foamed insulation, comprises any of PEI, PSU, PPSU, PEEK, and PEK. In some embodiments, flame retardant and/or smoke suppressant additives, such as those listed above, can be added to the insulation 410.

Figure 8:
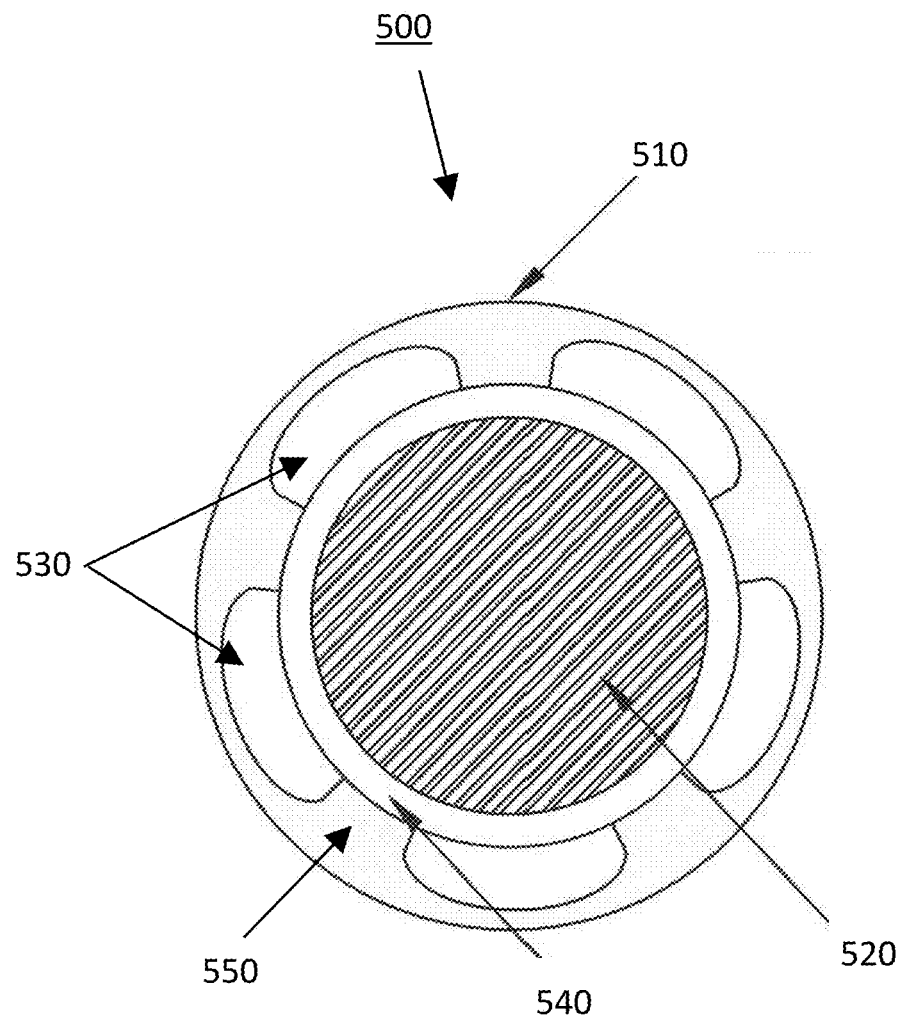
FIG. 8 schematically depicts a cross-sectional view of another embodiment of an electrical conduit in accordance with an embodiment of the invention.

FIG. 8 schematically depicts an insulation 510 according to another embodiment, which surrounds a conductor 520, such as an elongate copper conductor. The insulation 510 includes an inner layer 540 and an outer layer 550. The inner layer can be a solid or foamed polymeric layer, such as the inner layer 540 discussed in connection with FIG. 4. Similar to the previous embodiment, the insulation 510 includes a plurality of cavities 530, which are filled with air or other gases. In some embodiments, the inner layer 540 can comprise a solid or foamed polyolefin. One or more flame retardant and/or smoke suppressant additives can be added to the inner layer 540, such as the additives discussed in connection with the embodiment of FIG. 4. The insulation 510, which can be a solid or a foamed insulation, comprises any of PEI, PSU, PPSU, PEEK, and PEK. In some embodiments, flame retardant and/or smoke suppressant additives, such as those listed above, can be added to the insulation 510.

Tapes

Figure 10:
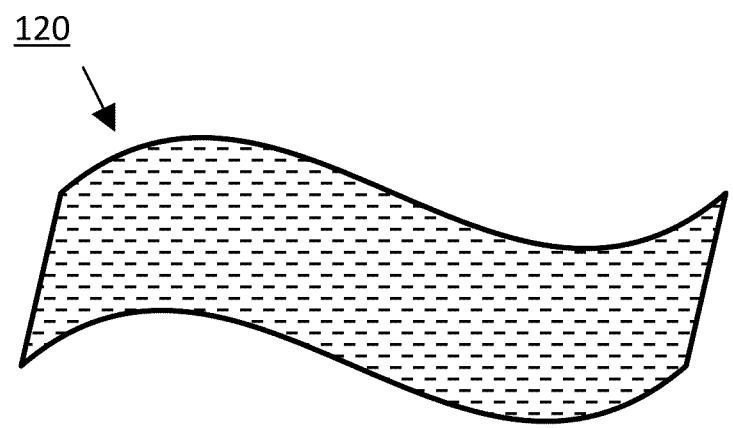
FIG. 10 illustrates a tape in accordance with an embodiment of the invention.

In some embodiments, a flexible tape (e.g., a non-woven tape) can be fabricated using any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof. By way of example, FIG. 10 schematically depicts a non-woven tape 120, which comprises a plurality of fibers formed of any of polyolefins, PSU, PPSU, PEEK, PEK, or a combination thereof. In some embodiments, the tape 120 is sufficiently flexible to be configured into a desired shape (e.g., for wrapping around one or more conductors). By way of example, the exemplary tape can be utilized as a flexible separator to electrically isolate (or at least partially electrically isolate) one or more conductors (e.g., a twisted pair) from other conductors.

In some embodiments, the tape 120 is substantially halogen-free.

Figure 21:
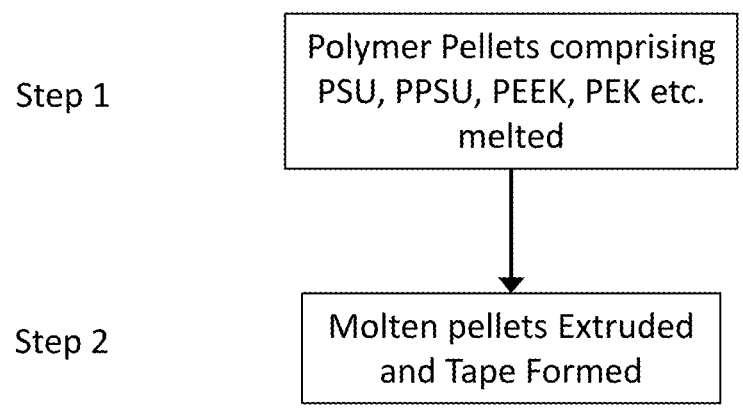
FIG. 21 is a flow chart of a method of manufacturing a tape in accordance with an embodiment of the invention.

The above tape 120 having a plurality of electrically conductive inclusions 130 can be manufactured in a variety of ways. By way of example, with reference to flow chart of FIG. 21 in one exemplary method of manufacturing the tape, a plurality of polymer pellets, e.g., pellets formed using any of PSU, PPSU, PEEK, PEK can be melted (step 1) and the molten pellets can be extruded to form the tape (step 2). The tape can be formed, e.g., by methods discussed in some of the examples provided below.

In some embodiments, the non-woven tape can comprise any of the engineered resin described herein. The tape can be wrapped around the separator to enclose the twisted pairs or optical fiber bundles. In some embodiments, a layered metal can be disposed on one or both surfaces of the tape.

Figure 20:
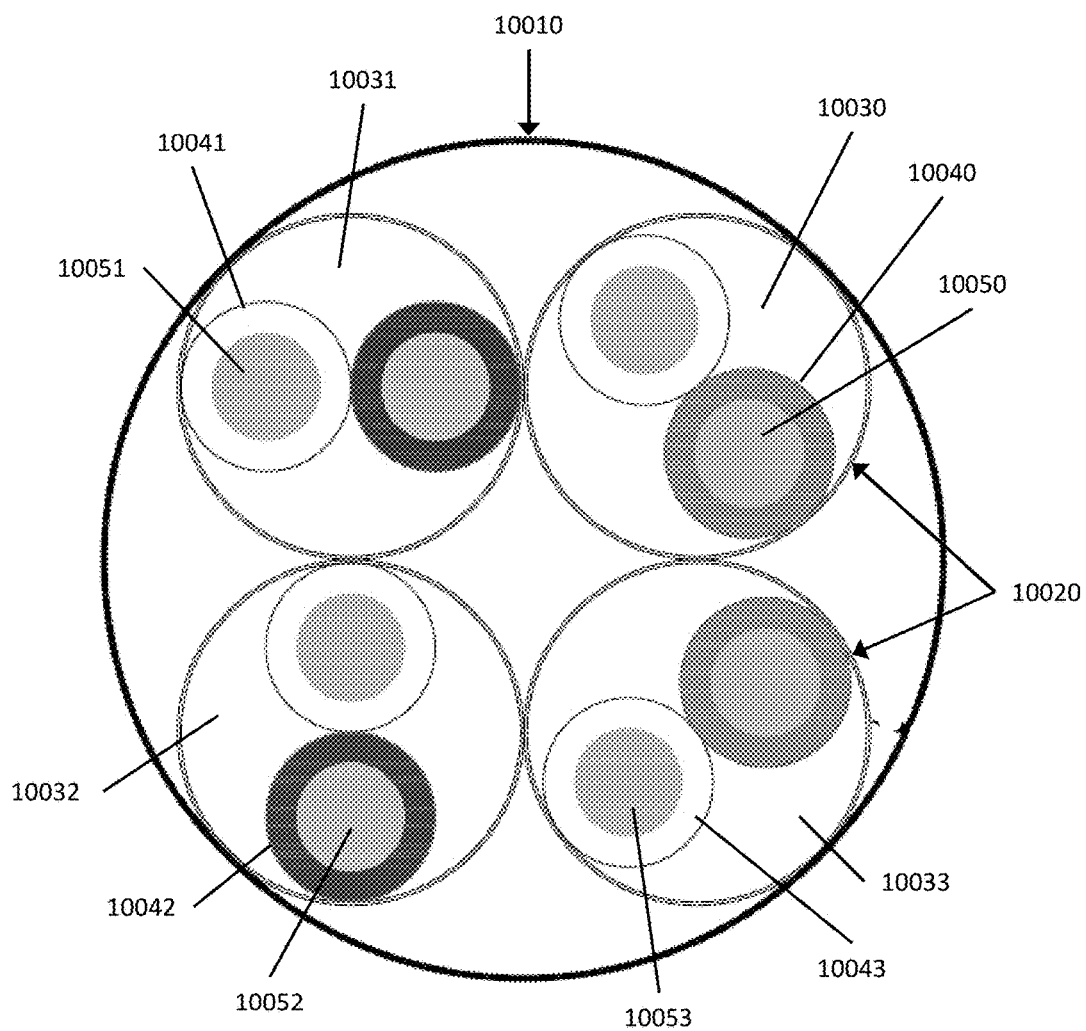
FIG. 20 schematically depicts a cross-sectional view of four twisted pairs surrounded by tape in accordance with an embodiment of the invention.

Referring to FIG. 20, tape 10010 can be wrapped around twisted pairs 10030, 10031, 10032 and 10033 (e.g., pairs of copper conductors). Each twisted pair can also be wrapped in a tape 10020. In some embodiments, one or more (e.g., 1, 2, 3, 4, 5, 6, 7, 8, 9, 10, 11, 12 or more) twisted pairs are wrapped together in a tape.

Cable Jackets

In another aspect, the invention provides a jacket for a cable, e.g., a communications cable. As discussed in more detail below, the jacket can comprise one or more of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof. While in some embodiments, a cable jacket according to the present teachings can have a solid structure, in other embodiments it can have a foamed structure.

By way of example, FIG. 4 schematically depicts a cable jacket 150 according to one embodiment of the invention that has an elongate tubular shape and extends from a proximal end to a distal end. The elongate tubular shape of the cable jacket forms a shell, e.g., a polymeric shell, having an interior lumen, which can be employed to house cable components such as one or more conductors, separators, optical fibers, etc.

In some embodiments, a cable jacket according to the present teachings is substantially free of a halogen. By way of example, the cable jacket can be formed as a solid or foamed structure comprising one or more of a polyolefin, PPS, PEI, PSU, PPSU, PES/PESU, PEEK, PAEK, PEKK, or PEK or a combination thereof and be substantially free of any halogen.

In many embodiments, the cable jacket 150 can be particularly effective in lowering alien cross-talk. For example, the cable jacket 150 can be effective at reducing alien cross-talk with a frequency range up to about 30 GHz. For example, the cable jacket can be effective in reducing or mitigating the alien cross-talk beyond the industry-specified swept frequency limits. Examples of these industry-specified standards are TIA-568-C.2. and ISO 11801. If a product mitigates alien cross-talk, it can also have the same effect on ingress noise. For example, in a cable tray where many different types of cables are routed throughout the building, it is normal to have power cable and data cables next to each other. Transient power spikes regularly pass down power cables. These spikes can interrupt data transmission for brief moments. In an unshielded twisted pair cable, the balanced pairs are the first mitigating feature, the jacket is the second.

The above cable jackets can be manufactured in a variety of ways. In one exemplary method of manufacturing the cable jackets, the foamable composition can be extruded to form the jacket.

Communication Cables

In another aspect, the invention provides cables, e.g., communications cables, which can comprise one or more of the articles described herein. For example, the communication cables can comprise any one of the separators, conductors having insulation according to the present teachings, tapes, cable jackets and/or the nonwoven fabrics described herein to provide the properties described herein, such as, for example, electromagnetic shielding of the conductors disposed in the cable and flame and smoke retardant properties.

By way of example, FIG. 4 schematically depicts a communications cable 100 accordingly to one embodiment. The cable 100 includes separator 110 in accordance with the present teachings, e.g., similar to separator 10 discussed above, which provides four channels 160A, 160B, 160C and 160D for receiving transmission media. In this embodiment, the separator 110 has a foamed structure and comprises any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof. Further, in this embodiment of the communications cable 100, the separator 110 is substantially halogen free.

In this embodiment, transmission media 131 disposed in each channel comprises a twisted pair of conductors 130. Each conductor 131 includes an insulation 140 comprising an inner layer 141 and outer layer 142 according to the present teachings. In this embodiment, the insulation 140 is substantially halogen free.

In some embodiments, the communications cable 100 further comprises a tape (not shown) that completely, or partially, surrounds each of the insulated twisted pair of electrical conductors 130.

The communications cable 100 further comprises a cable jacket 150 formed according to the present teachings. For example, in this embodiment, jacket 150 comprises any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof. In this embodiment, jacket 150 has a solid structure and comprises a tensile strength of about 2,000 psi to about 10,000 psi. Further, in this embodiment, the jacket 150 is substantially halogen free. In other embodiments, the jacket 150 can have a foamed structure, and can be substantially free of halogens.

Thus, in this embodiment, the communications cable 100 is substantially halogen free.

Communications cable 100 can also be configured as a Power over Ethernet (PoE) cable, in accordance with the present teachings. In some embodiments, at least one of the twisted pairs can transmit electrical power along with or without electrical data, e.g., power in the range of about 1 watt to about 25 watts.

Another exemplary embodiment of a communications cable comprising a separator is depicted in FIG. 5. Communication cable 200 comprises separator 210 that provides channels 260A, 260B, 260C and 260D for receiving transmission media. In this embodiment, the separator 210 has a foamed structure and comprises any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof. Separator 210 has center channel 270 configured for receiving a fiber optic cable, twisted pair, coax, or strength member. The center channel 270 includes a cavity that runs along the length of the separator 210 in which, for example, a fiber optic cable may be inserted. Further, in this embodiment of the communications cable 200, the separator 210 is substantially halogen free.

In some embodiments, center channel 270 can be empty (i.e., it does not receive a fiber optic cable). This configuration can allow for the dissipation (e.g., by convection) of heat generated from the electrical conductors from the channels defined by the separator 210.

In this embodiment, transmission media 231 disposed in each channel comprises a twisted pair of conductors 230. Each conductor 231 includes an insulation 240 comprising an inner layer 241 and outer layer 242 according to the present teachings. In this embodiment, the insulation 240 is substantially halogen free.

In this embodiment, the communications cable 200 further comprises a tape 220 that completely, or partially, surrounds each of the insulated twisted pair of electrical conductors 230.

The communications cable 200 further comprises a cable jacket 250 formed according to the present teachings. For example, in this embodiment, jacket 250 comprises any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof. Jacket 250 has a solid structure and comprises a tensile strength of about 2,000 psi to about 10,000 psi. Further, in this embodiment, the jacket 250 is substantially halogen free.

Thus, in this embodiment, the communications cable 200 in FIG. 5 is substantially halogen free.

Figure 9:
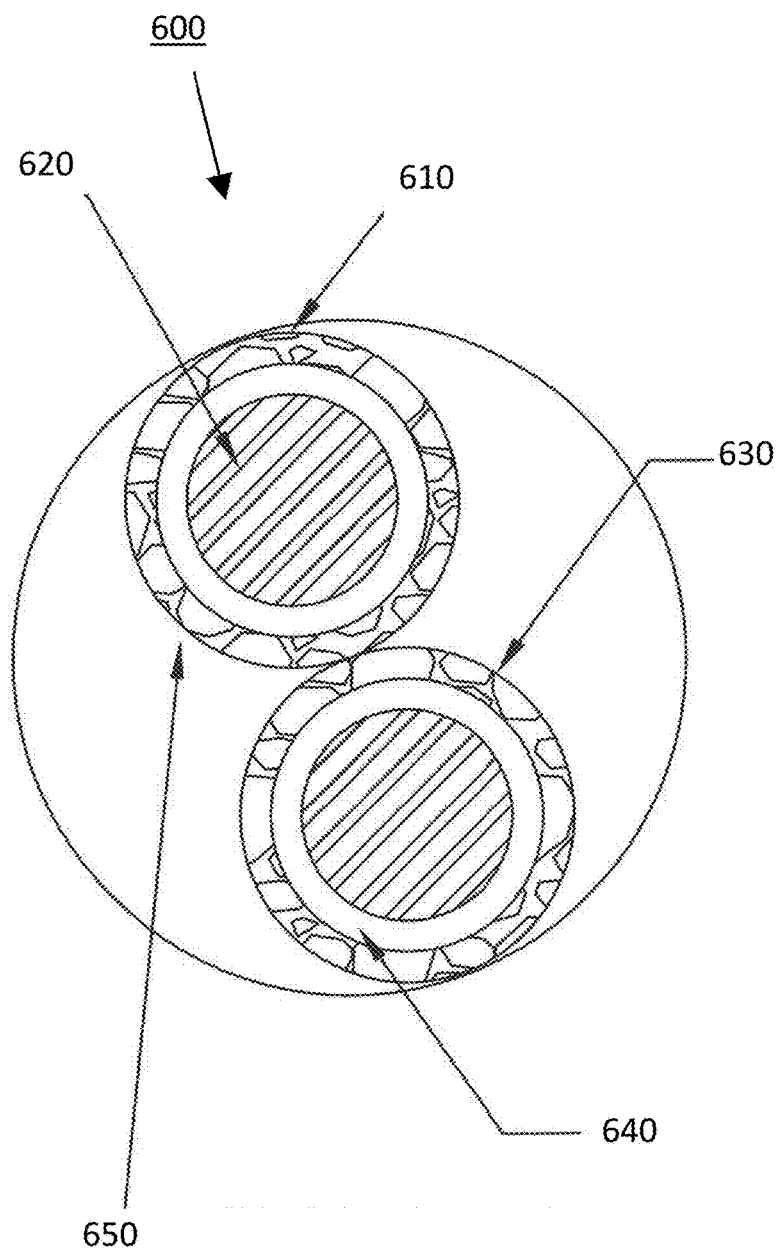
FIG. 9 schematically depicts a cross-sectional view of a twisted pair in accordance with an embodiment of the invention.

By way of further illustration, FIG. 9 depicts a twisted pair of conductors disposed in a channel 600 provided by a separator according to the present teachings. Each conductor comprises an electrically conductive core 620, e.g., copper core, surrounded by an inner layer 640 and outer layer 650. In this embodiment, the inner layer 640 comprises an engineered resin and can have a thickness in a range of approximately 1 to about 7 mm. A foamed or solid outer layer 630 comprises an engineered resin such as, for example, PEI, PSU, PPSU, PEEK, and/or PEK. Alternatively, the outer layer 650 can comprise polyethylene, polypropylene or cyclic olefin. The outer layer 610 can have a thickness in a range of approximately 3 mm to about 35 mm.

In other embodiments, the separator comprises a center channel or center region that extends along the longitudinal length of the cable. The center channel or center region can be configured for a fiber optic cable, twisted pair, coax, or strength member. The center region can include a cavity that runs the length of the separator in which, for example, a fiber optic cable may be inserted.

In some embodiments, a strength member may be added to the cable. The strength member can be located in the central region of the separator and can run the longitudinal length of the separator. The strength member can be formed, e.g., of a solid polyethylene or other suitable plastic, textile (nylon, aramid, etc.), fiberglass flexible or rigid (FGE rod), or metallic material.

Figure 29:
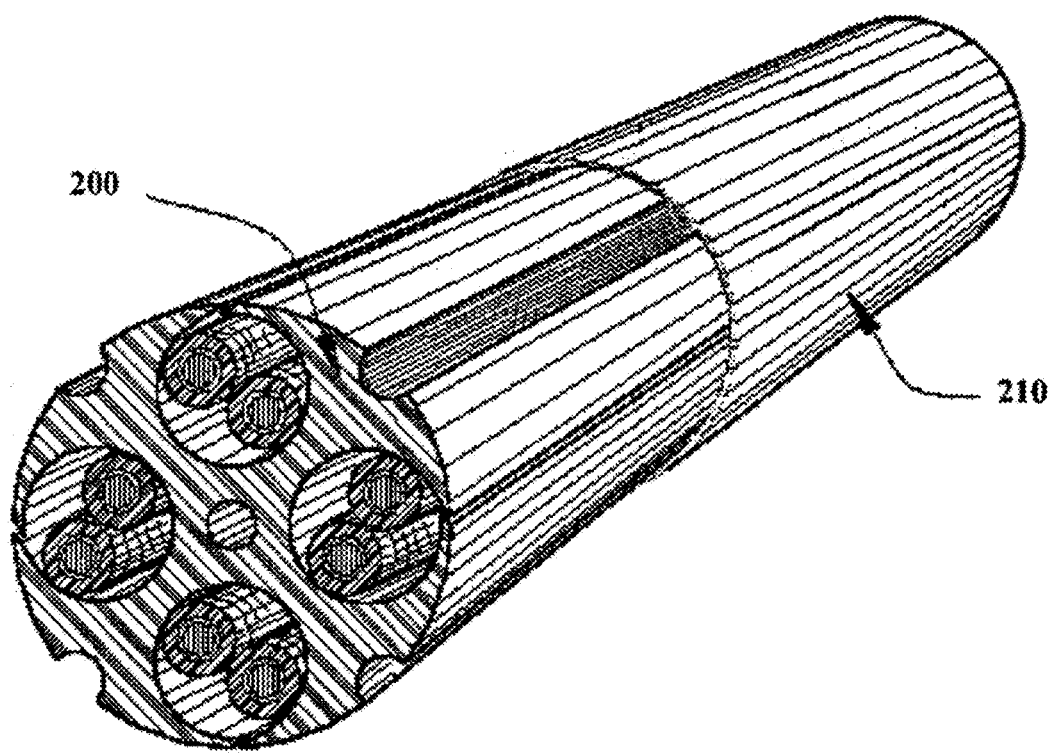
FIG. 29 is a top-right view of one embodiment of the cable and separator that includes an anvil-shaped separator and a smooth/ribbed jacket.

Cable 200, as shown in FIG. 29 is an example of a high performance cable (e.g., a PoE cable) having electrical conductors that carry data, electrical power, or a combination thereof. The cable has an optional outer jacket 210 that can be solid or foamed, comprising a substantially halogen free polymeric material (e.g., an engineered resin). Additionally, the jacket can be smooth/ribbed 210. Any of the separators described herein, e.g., separators illustrated in FIGS. 25-28, can be surrounded by jacket 210. For example, having a separator depicted in FIG. 28A or 28B, having channels can allow for the dissipation of heat from one or more electrical conductors (e.g., through convention).

Tight and Loose Buffer Cables

Figure 11:
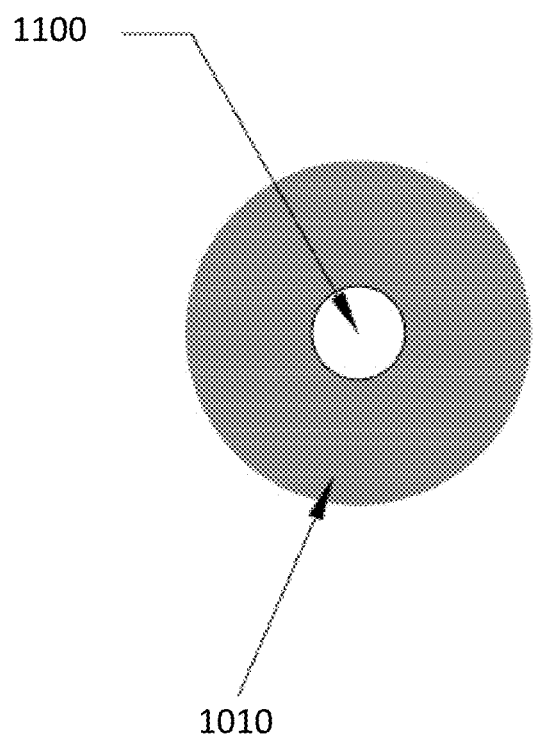
FIG. 11 schematically depicts a cross-sectional view of a tight buffer in accordance with an embodiment of the invention.

Tight buffer construction cables offer an enhanced design for commercial communication applications that require a high level of performance for optical fibers. Due to the diverse applications, there is a need for these cables to exhibit excellent fiber protection, flexibility, ease of handling and termination, and meet stringent flame-retardant standards. By way of illustration, FIG. 11 depicts a buffer cable 1000 comprising a buffer 1010, which can have in some embodiments an outer diameter ranging from about 250 microns to about 900 microns and inner diameter ranging from about 7 microns to about 250 microns. The buffer 1010 encloses fiber optic and cladding 1100. The buffer 1010 can comprise one or more of the polymers discussed herein. For example, in this embodiment, the buffer 1010 can comprise any of PPS, PEI, PSU, PPSU, PES/PESU, PEEK, PAEK, PEKK, or PEK, or a combination thereof and be substantially free of any halogen. Further, in some embodiments, the buffer 1010 can have a foamed structure, e.g., a foamed structure exhibiting a foaming level in a range of about 10% to about 70%, e.g., in a range of about 20% to about 60%. Alternatively, in some embodiments, the buffer 1010 can have a solid structure.

Figure 12:
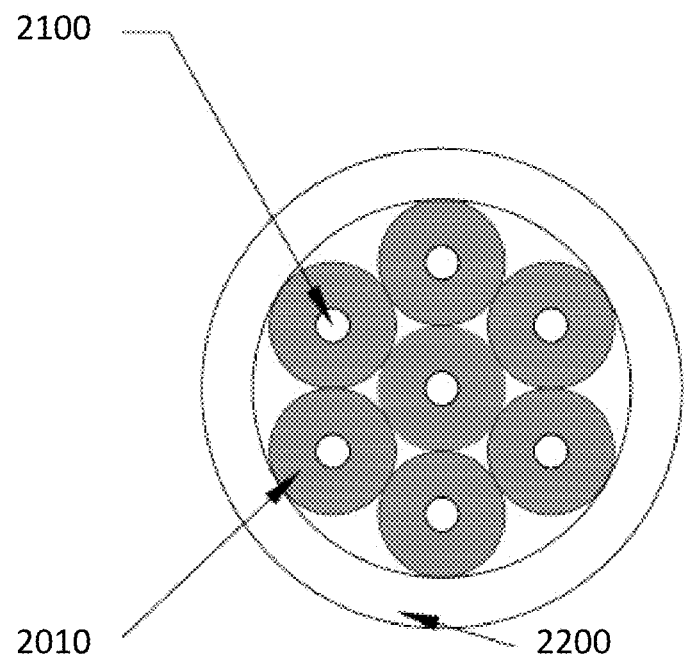
FIG. 12 schematically depicts a cross-sectional view of a plurality of tight buffers disposed in a jacket in accordance with an embodiment of the invention.

FIG. 12 schematically demonstrates a plurality of buffers 2010, similar to the buffer 1010, that are surrounded by a jacket 2200. In this embodiment, each of the buffers 2010 can comprise any of PPS, PEI, PSU, PPSU, PES/PESU, PEEK, PAEK, PEKK, or PEK, or a combination thereof and be substantially free of any halogen. In addition, the jacket 2200 can comprise PPS, PEI, PSU, PPSU, PES/PESU, PEEK, PAEK, PEKK, or PEK, or a combination thereof and be substantially free of any halogen. While in some embodiments the jacket 2200 can be in the form of a solid structure, in other embodiments the jacket 2200 can have a foamed structure. Further, the jacket 2200 can include flame and/or smoke retardant additives.

Figure 13:
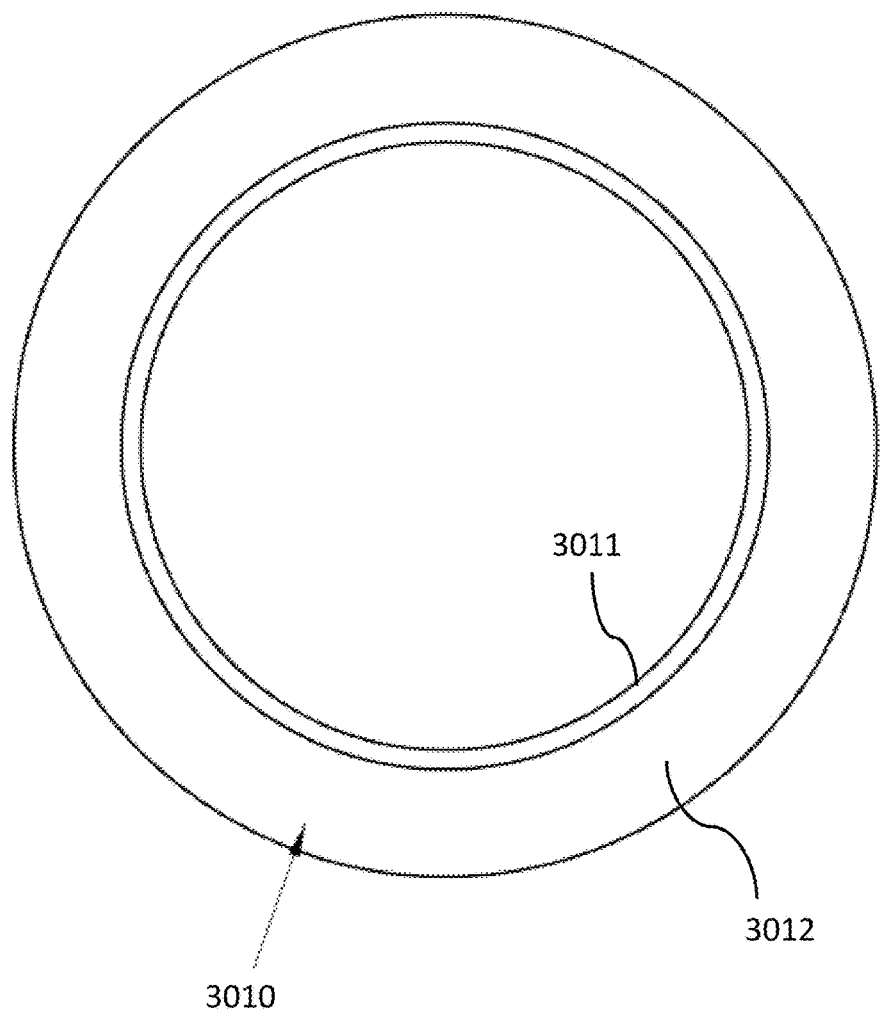
FIG. 13 schematically depicts a cross-sectional view of a loose buffer with a co-extruded inner surface in accordance with an embodiment of the invention.

Loose buffer construction cables may be buried underground or installed within the ducts of a building. Thus, they must provide superior fiber protection and withstand the adverse effects of the harshest environments. As a result, they are subject to various standards and requirements. In one aspect, FIG. 13 provides blown tubing 3010 for fiber optics that includes a multi-layered structure, which can in many embodiments facilitate compliance with various standards and requirements for protection of optical fibers enclosed by the tubing 3010. In some embodiments, such insulation can have a multi-layer structure formed, e.g., of different polymeric materials. For example, the insulation can include a bi-layer structure in which the inner layer 3011 is a foamed polymeric layer, and the outer layer 3012 is either a foamed or a solid polymeric layer. For example, the inner layer can comprise polyolefin and the outer layer can comprise any of PPS, PEI, PSU, PPSU, PES/PESU, PEEK, PAEK, PEKK, or PEK, or a combination thereof. In some embodiments, one or both layers include flame retardant and/or smoke suppressant additives, such as the additives discussed above. This bi-layer structure is extruded, either in tandem or via co-extrusion. In some embodiments, insulation 3010 can be substantially free of any halogen.

Figure 14:
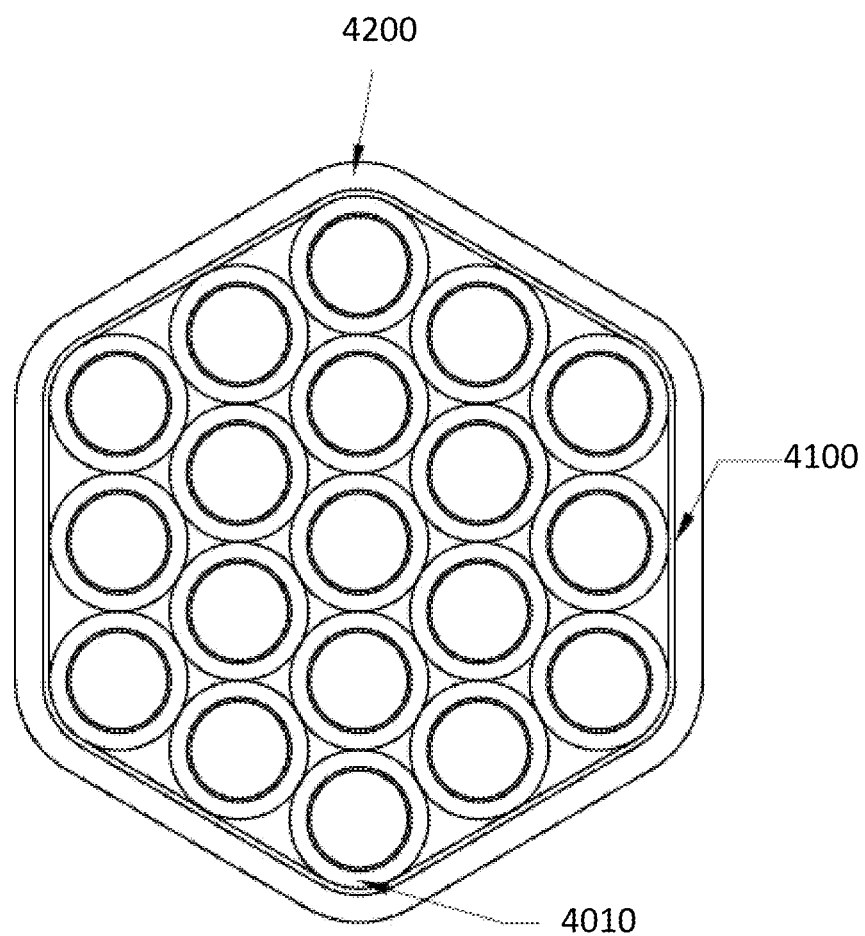
FIG. 14 schematically depicts a cross-sectional view of a plurality of loose buffers with co-extruded inner surfaces, wrapped in tape, and disposed in a jacket in accordance with an embodiment of the invention.

FIG. 14 schematically demonstrates a plurality of blown tubes 4010 that are wrapped in tape 4100 with a jacket 4200 surrounding the tape 4100. The blown tubes 4010 can be formed as discussed above. Similarly, in some embodiments, the tape 4100 can be fabricated in accordance with the present teachings. In this embodiment, this jacket 4200 can comprise PPS, PEI, PSU, PPSU, PES/PESU, PEEK, PAEK, PEKK, PEK, or a combination thereof and be substantially free of any halogen. In some embodiments, the jack 4200 can be formed as a solid structure, and in other embodiments, it can be formed as a foamed structure, e.g., with a foaming level in a range of about 10% to about 70%. Further, the jacket can include one or more flame and/or smoke retardant additives, such as those discussed above.

Power Over Ethernet (PoE)

Figure 15:
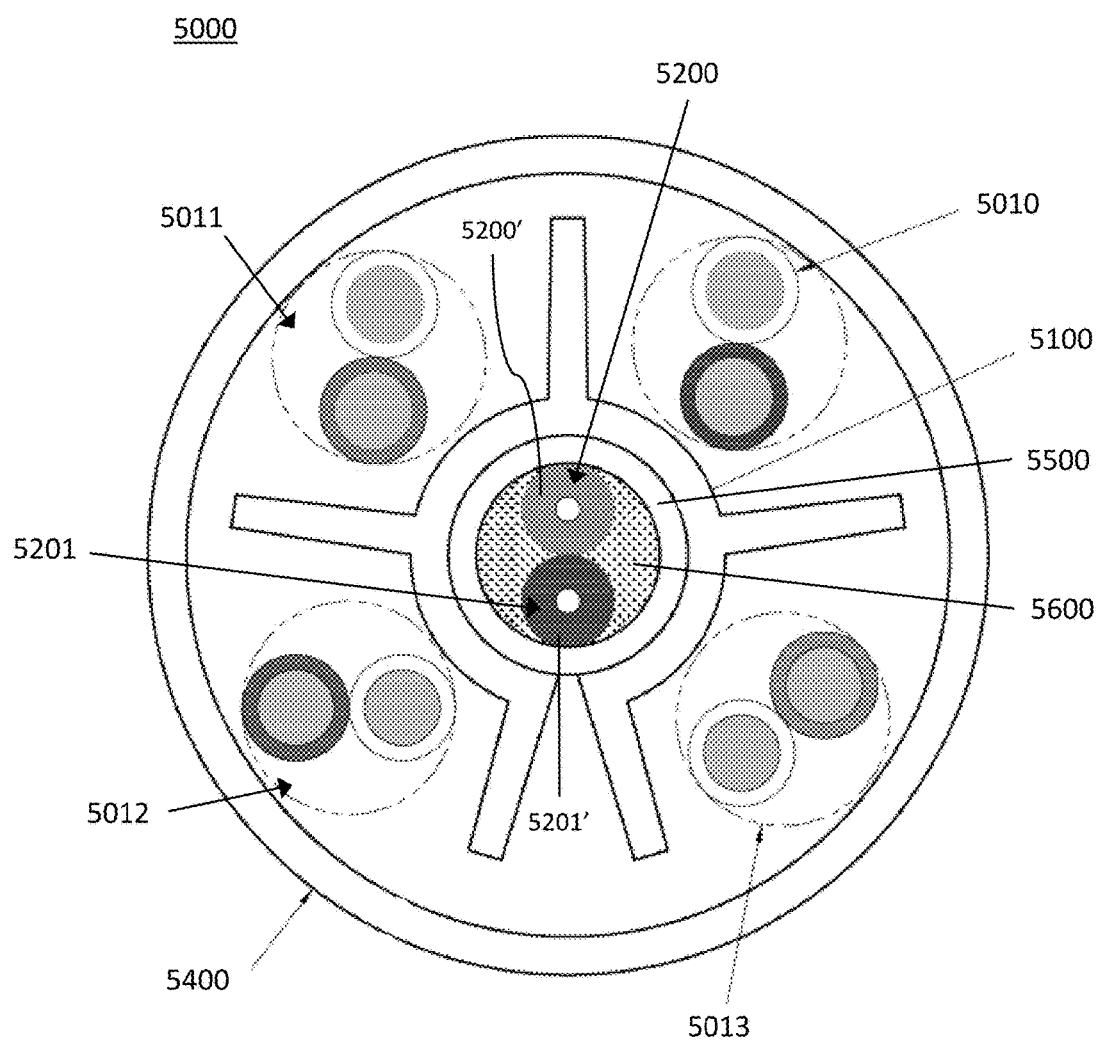
FIG. 15 illustrates a Power over Ethernet 4-pair copper cable with two fiber channels embedded within a crossweb design for plenum and riser applications comprising non-halogen materials.
Figure 16:
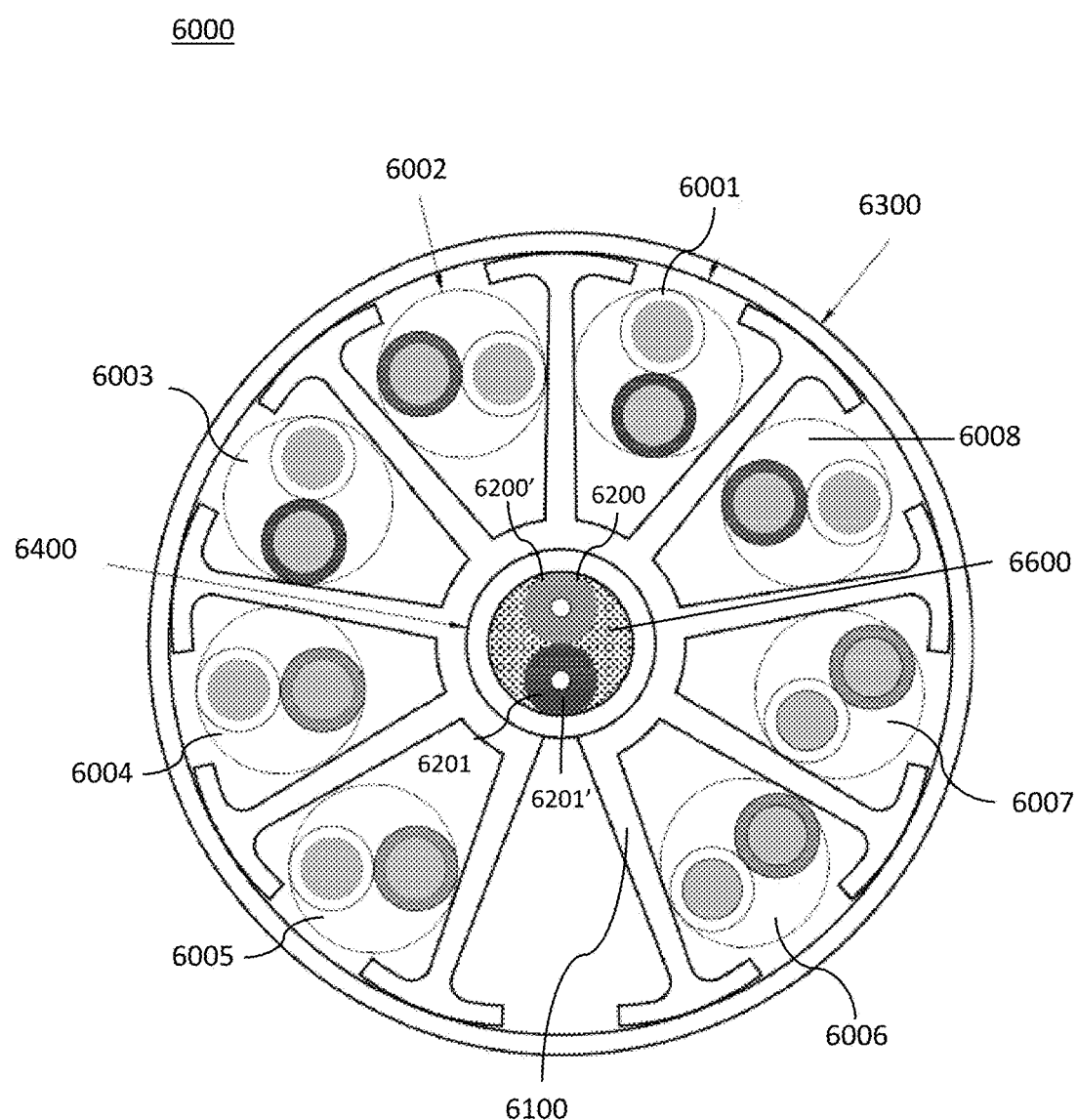
FIG. 16 illustrates a Power over Ethernet 8-pair copper cable with two fiber channels embedded within a crossweb design for plenum and riser applications comprising non-halogen materials.

As the demand for Wi-Fi access points, network security cameras, building access controls (door locks/digital signs, etc.) and light emitting diodes (LED) grows dramatically, the need for cables that can support both copper wires and optical fibers increases. In some embodiments, the present teachings provide hybrid fiber/copper cables that utilize a 4 or 8-pair copper design with an embedded fiber optic duplex or two-fiber design as depicted in FIGS. 15, 16 and 17. Currently, for both Riser and Plenum Hybrid Cable POE Design, a halogen-free solution does not exist; nor is there a solution to the need for higher temperature rated design from the 60° C. rating to the greater than 125° C. rating that this invention can offer with foamed or solid engineered polymers.

Referring to FIG. 15, a Power Over Ethernet cable 5000 includes 4 pairs of copper cables 5010, 5011, 5012 and 5013, with each pair disposed in one of four longitudinal channels provided by a crossweb separator 5100, and two optical fiber channels 5200 and 5201, which are disposed within a central channel of the crossweb 5100. Although cable 5000 is shown having two optical fiber cables 5200 and 5201 in center channel, in some aspects the center channel can be empty, i.e., not have optical fiber cables 5200 and 5201. Such a configuration can allow for the rapid dissipation of heat generated from, e.g., twisted pairs 5010, 5011, 5012, and/or 5013. The copper cables can have insulation according to the present teachings, which can be in some cases substantially free of halogens. The insulation can comprise a solid or foamed non-halogen polymer. The insulation can be a composite insulation, for example, as shown in FIG. 9, or the slotted or airspace design shown in FIGS. 7 and 8.

The crossweb 5100 can also be formed according to the present teachings (see, e.g., the discussion of separators above) and can be in some embodiments substantially free of halogens. In some embodiments, the crossweb 5100 can have a foamed structure.

Each of the optical fiber channels includes a blown tube (5200' and 5201'), which encloses an optical fiber. The blown tubes can be formed in accordance with the teachings provided herein (see, e.g., FIGS. 11, 12, and 13 and the associated discussion). In some embodiments, the blown tubes can be substantially free of halogens. A jacket 5500 surrounds the blown tubes. The jacket 5500 can be formed in accordance with the present teachings, and can be in some cases substantially free of halogens. In some embodiments, a yarn 5600 (e.g., Aramid yarn) fills the space between the blown tubes. The yarn 5600 can comprise one or more of the engineered resins disclosed herein. For example, the Aramid yarn or yarns can comprise any of polyphenylenesulfide (PPS), polyetherimide (PEI), polysulfone (PSU), polypheyl-sulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polyproplylene (PP), cyclic olefin copolymer (COC), polycarbonate (PC), polyphenylene ether (PPE), liquid crystal polymer (LCP), and/or combinations thereof.

Further, the cable 5000 includes an outer jacket 5400, which can also be formed according to the present teachings and can be in some cases substantially free of any halogens (see, e.g., FIG. 4 and the associated discussion). By way of example, the cable 5000 can be used in plenum and riser applications. comprising one or more non-halogen polymers described herein.

FIG. 16 schematically depicts a Power Over Ethernet cable 6000 according to another embodiment. The cable 6000 includes a separator 6001 that provides 8 channels in each of which a pair of copper wires (6002, 6003, 6004, 6005, 6006, 6007, and 6008) is disposed. The insulation of the copper wires as well as the separator are formed according to the present teachings, and can be in some embodiments substantially fee of halogens. Similar to the previous embodiment, the cable 6000 includes two buffered optical fibers 6200 and 6201, which are enclosed within a buffer tube 6400 that is disposed within a hollow central channel of the separator 6100. The buffered fibers 6200 and 6201 as well as the buffer tube 6400 can be formed in accordance with the present teachings and in some cases can be substantially free of halogens. In some embodiments, cable 6000 does not include buffered fibers 6200 and 6201 in a center channel, leaving it unoccupied for improved heat dissipation (e.g., through convection) of the twisted pairs (of copper wires). The cable 6000 further includes an outer jacket 6300, which can also be formed in accordance with the present teachings and can be in some cases substantially free of halogens. By way of example, the cable 6000 can be used for plenum and riser applications.

Figure 17A:
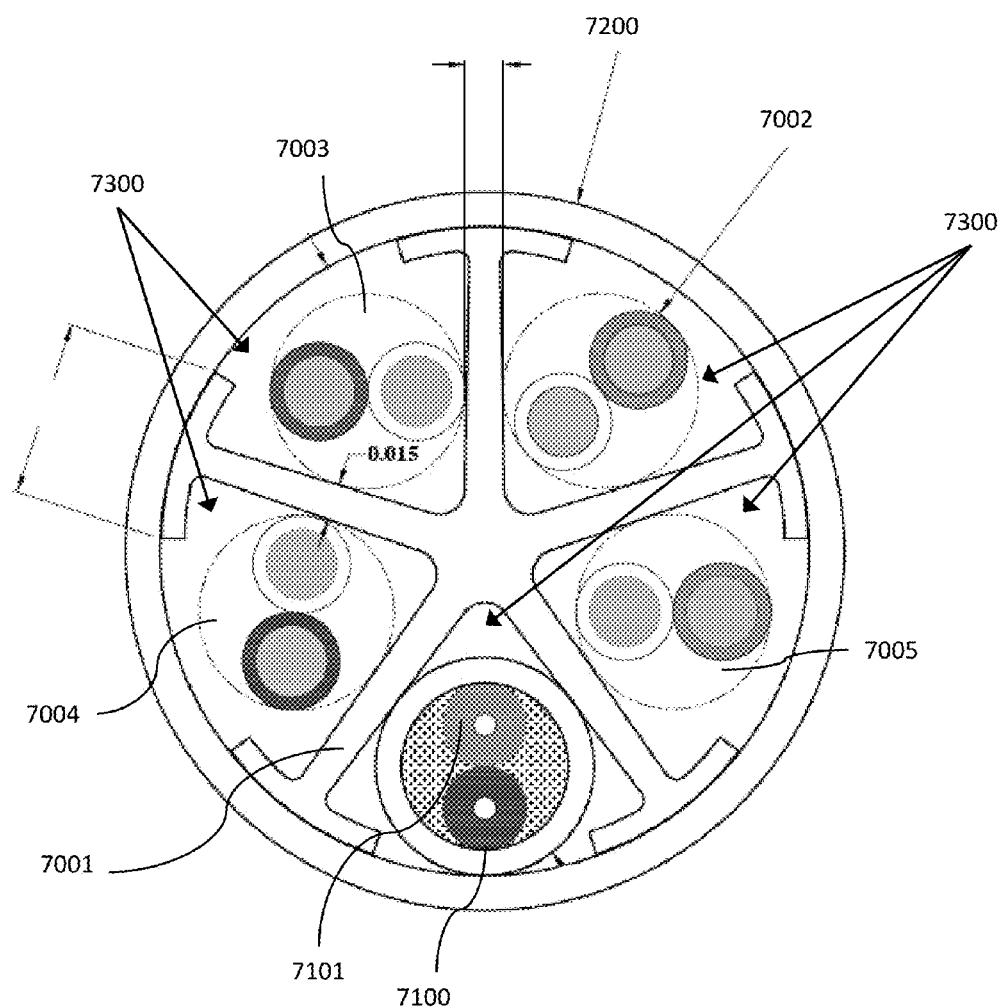
FIG. 17A illustrates a Power over Ethernet 4-pair copper cable having five slots (channels) with the fifth slot comprising two nested fiber optic cables.

By way of further illustration, FIG. 17A depicts another embodiment of a Power Over Ethernet cable 7000 according to the present teachings, which includes a separator 7001 that provides five longitudinal channels. In four of these channels, 4 pairs of copper wires (e.g., twisted pairs) (7002, 7003, 7004, and 7005) are disposed. In the remaining channel, two nested buffered optical fibers 7100 and 7101 are disposed. The optical fibers are similar to those discussed above in connection with the previous embodiments. One or both of the electrical conductors of the twisted pairs 7002, 7003, 7004, and 7005 can be configured to carry electrical data, power, or combinations thereof. A jacket 7200 surrounds the internal components of the cable. In this embodiment, the insulation of the copper wires, the separator, the fiber optic channels and the jacket are formed in accordance with the present teachings, and are preferably substantially free of halogens. Further, in this embodiment, the separator has a flap top design that can mitigate alien crosstalk.

While the separator 7001 shown in FIG. 17A is formed as a solid polymeric structure, in other embodiments it can be foamed. For example, referring to FIG. 17B, PoE cable 7000 includes separator 7001 that is foamed, having substantially uniformly sized cells 7400. Separator 7001 provides five longitudinal channels 7300. In four of these channels, 4 twisted pairs (e.g., pairs of copper conductors) 7002, 7003, 7004, and 7005 are disposed. In the remaining channel, two nested buffered optical fibers 7100 and 7101 are disposed. The optical fibers are similar to those discussed above in connection with the previous embodiments. One or both of the copper conductors of the twisted pairs 7002, 7003, 7004, and 7005 can be configured to carry electrical data, power, or combinations thereof. A jacket 7200 surrounds the internal components of the cable. In this embodiment, the insulation of the copper wires, the separator 7001, the fiber optic channels and the jacket are formed in accordance with the present teachings, and are preferably substantially free of halogens. Further, in this embodiment, the separator has a flap top design that can mitigate alien crosstalk. The foaming level of the separator 7001 can be, for example, in a range of about 20% to about 40%, such as about 30%. Further the cells 7400, which can be filled with air, can have a size (i.e., a maximum dimension) in a range of about 0.0005 inches to about 0.003 inches. In some cases, the foamed cells 7400 can have an average diameter of about 0.0008 inches. Further, in some embodiments, at least about 50%, or at least about 60%, or at least about 70%, or at least about 80% of the cells 7400 have a closed structure.

Figure 17B:
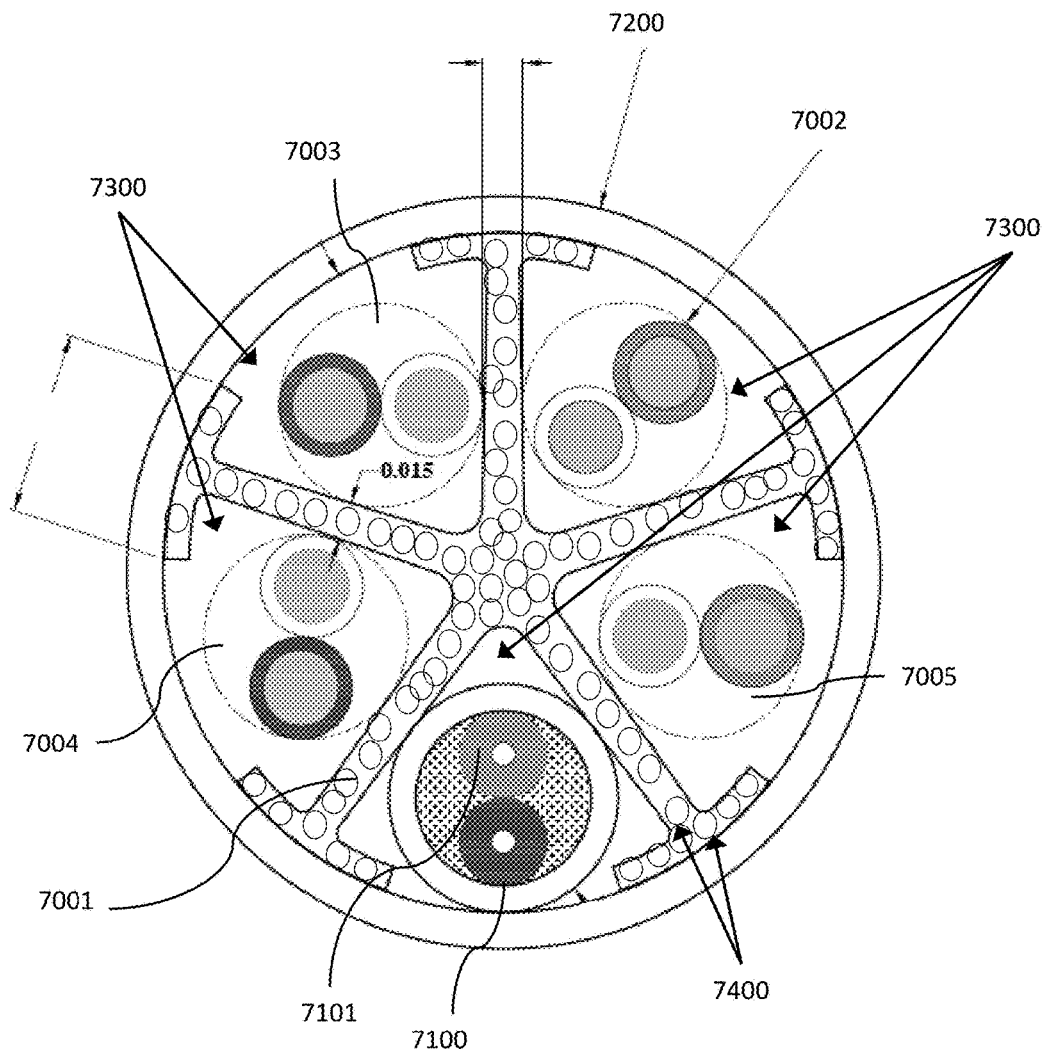
FIG. 17B illustrates a Power over Ethernet 4-pair copper cable having a foamed separator with five channels with the fifth channel comprising two nested fiber optic cables for plenum and riser applications comprising non-halogen materials.
Figure 17C:
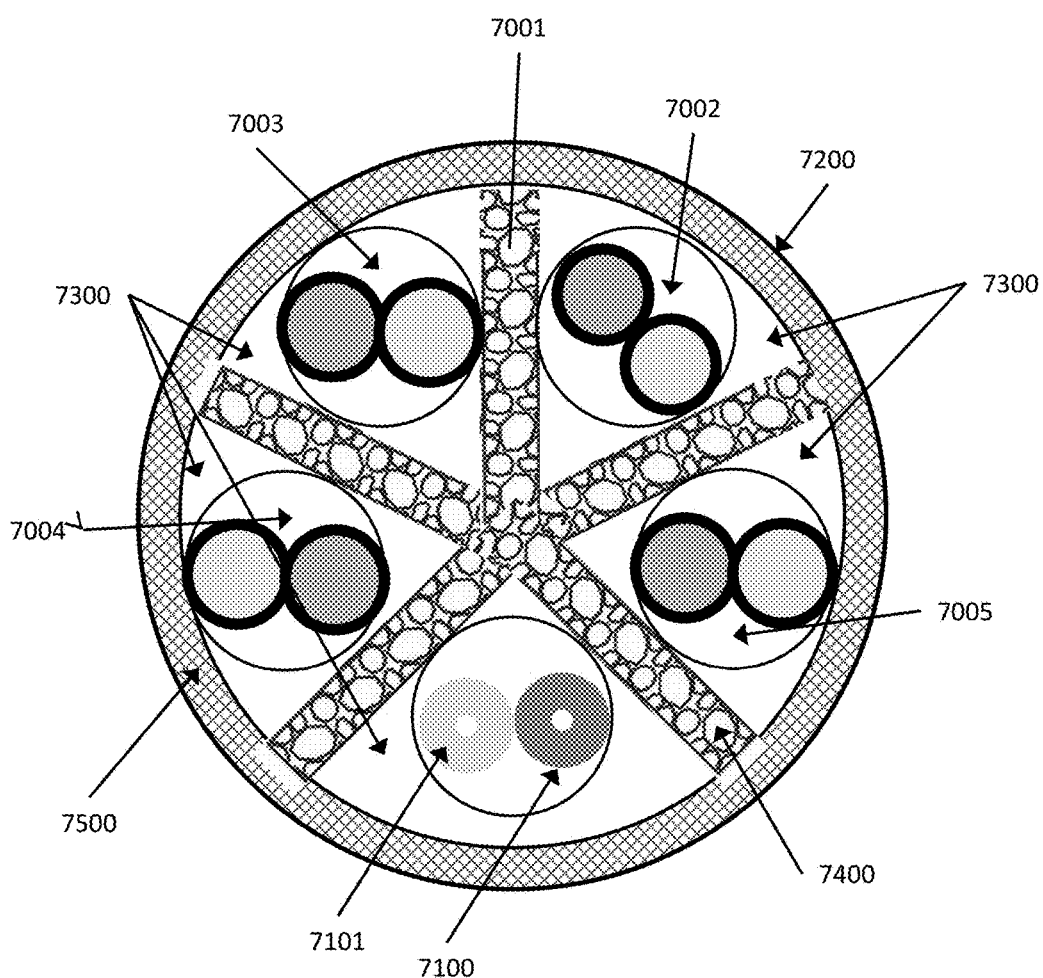
FIG. 17C illustrates a Power over Ethernet 4-pair copper cable for plenum and riser applications comprising non-halogen materials in accordance with an embodiment of the invention.

While the jacket 7200 shown in FIG. 17B is formed as a solid polymeric structure, in other embodiments, it can be foamed. For example, referring to FIG. 17C, PoE cable 7000 includes jacket 7200 that is foamed, having substantially uniformly sized cells 7500. The foaming level of the jacket 7200 can be, for example, in a range of about 20% to about 40%, such as about 30%. Further the cells 7500, which can be filled with air, can have a size (i.e., a maximum dimension) in a range of about 0.0005 inches to about 0.003 inches. In some cases, the foamed cells 7500 can have an average diameter of about 0.0008 inches. Further, in some embodiments, at least about 50%, or at least about 60%, or at least about 70%, or at least about 80% of the cells 7500 have a closed structure. PoE cable 7000 also includes a foamed separator 7001. Similar to FIG. 17A, one or both of the copper conductors of the twisted pairs 7002, 7003, 7004, and 7005 in FIG. 17B or 17C can be configured to carry electrical data, power, or combinations thereof.

Figure 18A:
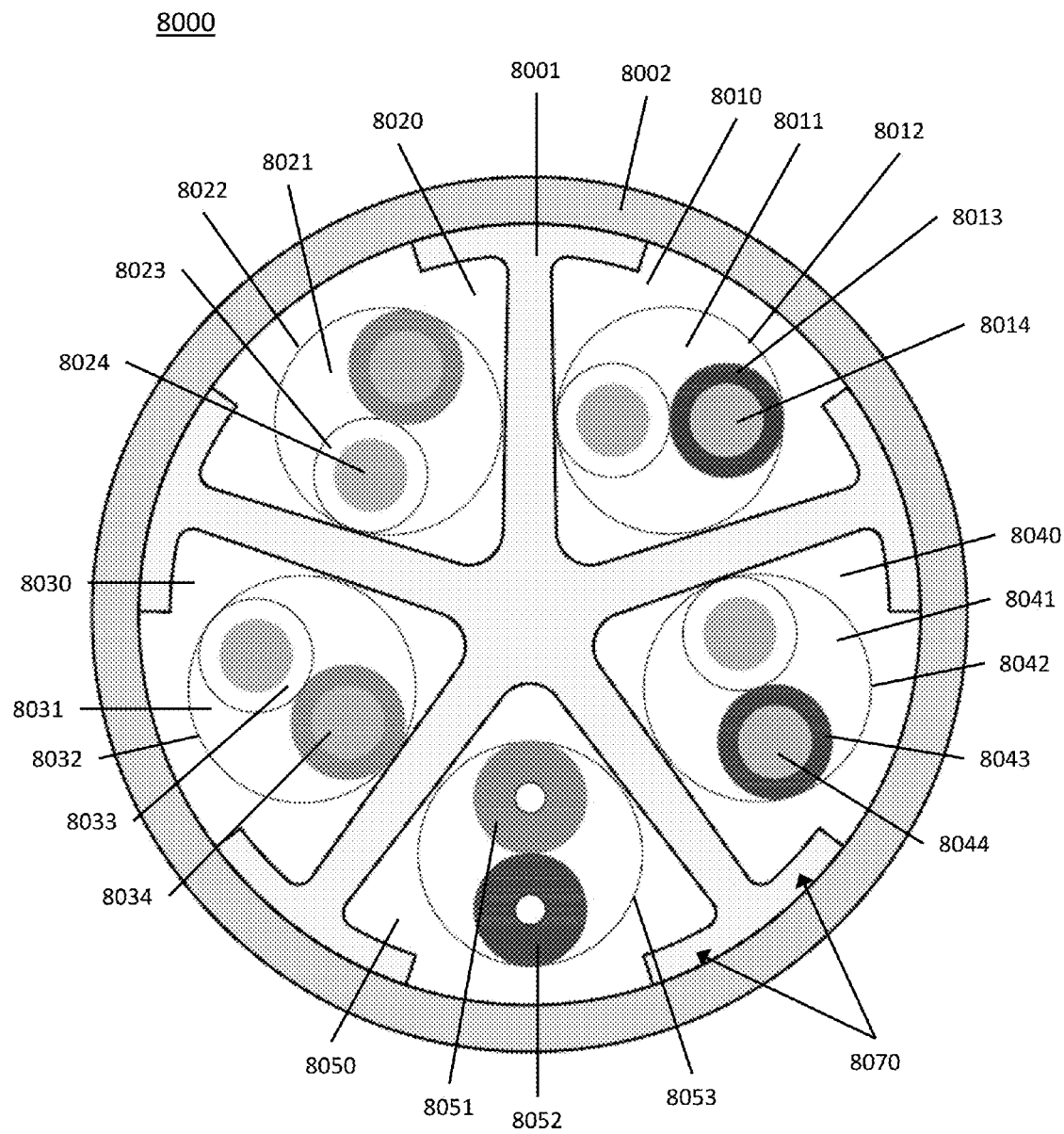
FIG. 18A illustrates an embodiment of a Power over Ethernet 4-pair copper cable having five channels with one channel having two fiber optic cables for plenum and riser applications.

FIG. 18A schematically depicts a Power over Ethernet cable 8000 according to another embodiment. The PoE cable 8000 includes a separator 8001 that provides 5 longitudinal channels (8010, 8020, 8030, 8040 and 8050). The separator 8001 can be in some embodiments substantially free of halogens. Each of the channels 8010, 8020, 8030, and 8040 can have and receive a twisted pair 8011, 8021, 8031 and 8041, respectively. One or both of the copper conductors of the twisted pairs 8011, 8021, 8031 and 8041 can be configured to carry electrical data, power, or combinations thereof. Also, each twisted pair 8011, 8021, 8031 and 8041 can have a tape 8012, 8022, 8032 and 8042 wrapped around it. The tape can be formed in accordance with the present teachings, as discussed herein. For example, the tape can be formed of an engineered resin. In some embodiments, the tape is foamed. The insulation of the twisted pairs, e.g., insulation 8013 on conductor 8014 can be in some embodiments substantially fee of halogens. Similar to the other embodiments, the cable 8000 includes two buffered optical fibers (e.g. fibers 8051 and 8052), which are enclosed within a buffer tube 8053 that is disposed within channel 8050 of the separator 8001. The buffered fibers 8051 and 8052 as well as the buffer tube 8053 can be formed in accordance with the present teachings and in some cases can be substantially free of halogens. The cable 8000 further includes an outer jacket 8002, which can also be formed in accordance with the present teachings and can be in some cases substantially free of halogens. In some embodiments, the insulation of the conductors and/or the jacket can be foamed. Further, in this embodiment, the separator 8001 has a flap top design, having flap tops 8070, partially enclosing the channels to mitigate alien crosstalk. By way of example, the cable 8000 can be used for plenum and riser applications.

Figure 18B:
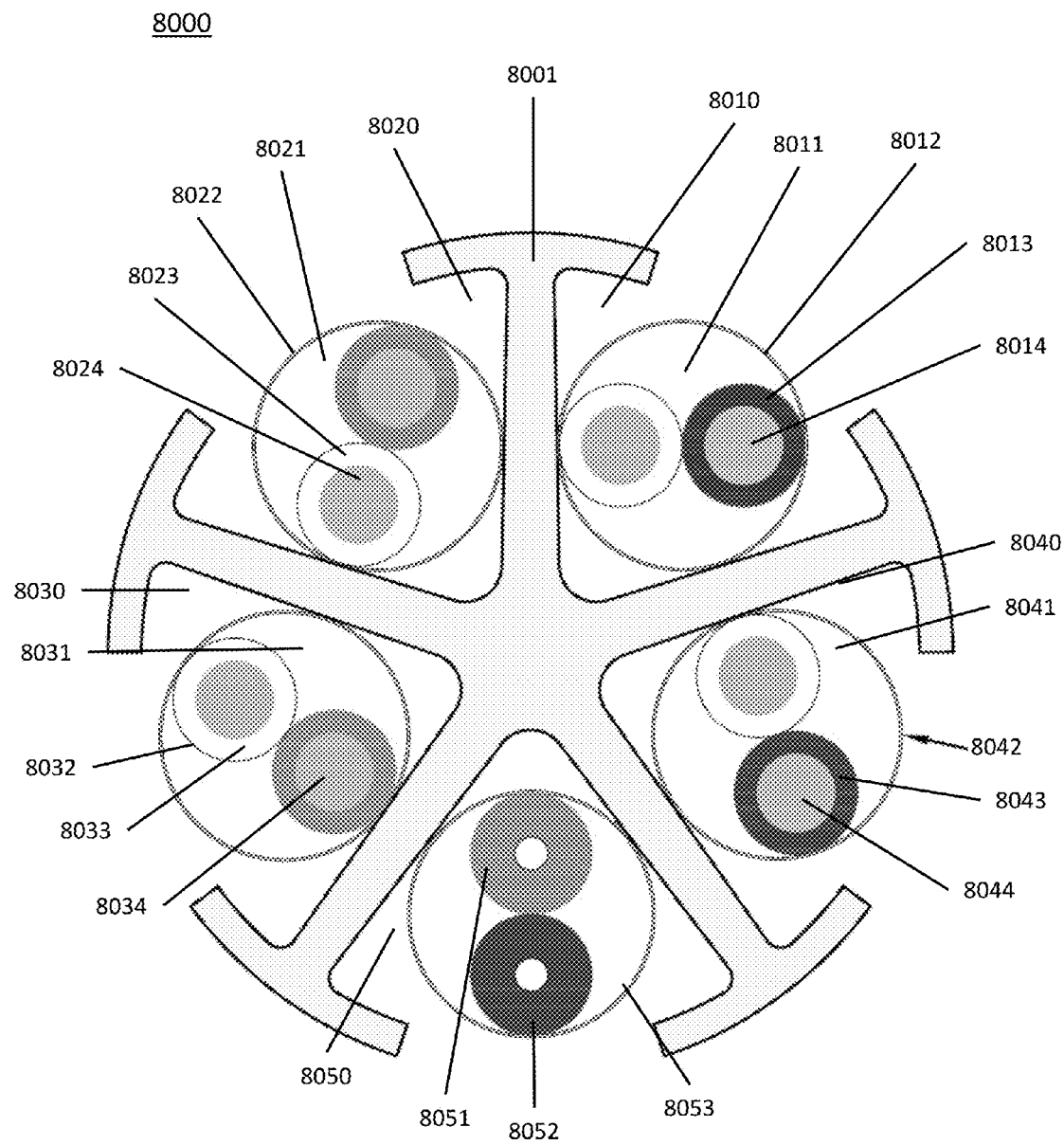
FIG. 18B schematically depicts a cross-sectional view of a separator and a plurality of conductors and fiber optic cables disposed in longitudinal channels provided by the separator in accordance with an embodiment of the invention.

FIG. 18B depicts an unjacketed PoE cable 8000. As described herein, channels 8010, 8020, 8030, 8040 and 8050 can contain any configuration of twisted pairs (e.g., pairs of copper conductors) and fiber optic cables. For example, as illustrated in FIGS. 18A and 18B, channels 8010, 8020, 8030, and 8040 each have a twisted pairs 8011, 8021, 8031 and 8041, respectively. Channel 8050 has two optical fibers 8051 and 8052. Each of the twisted pairs 8011, 8021, 8031 and 8041 can be configured to carry electrical data, power, or combinations thereof.

Figure 18C:
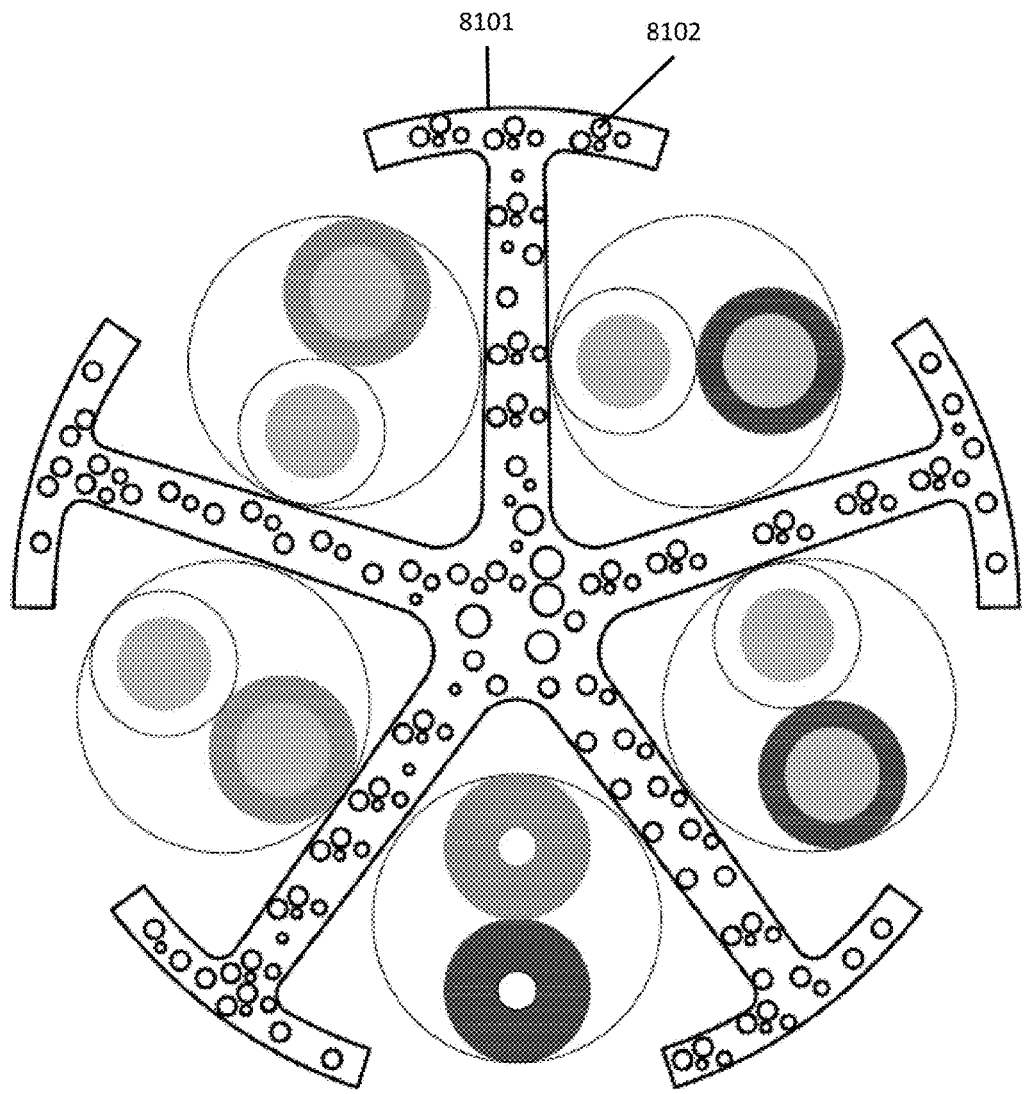
FIG. 18C schematically depicts a cross-sectional view of a foamed separator and a plurality of conductors and fiber optic cables disposed in longitudinal channels provided by the separator in accordance with an embodiment of the invention.
Figure 18D:
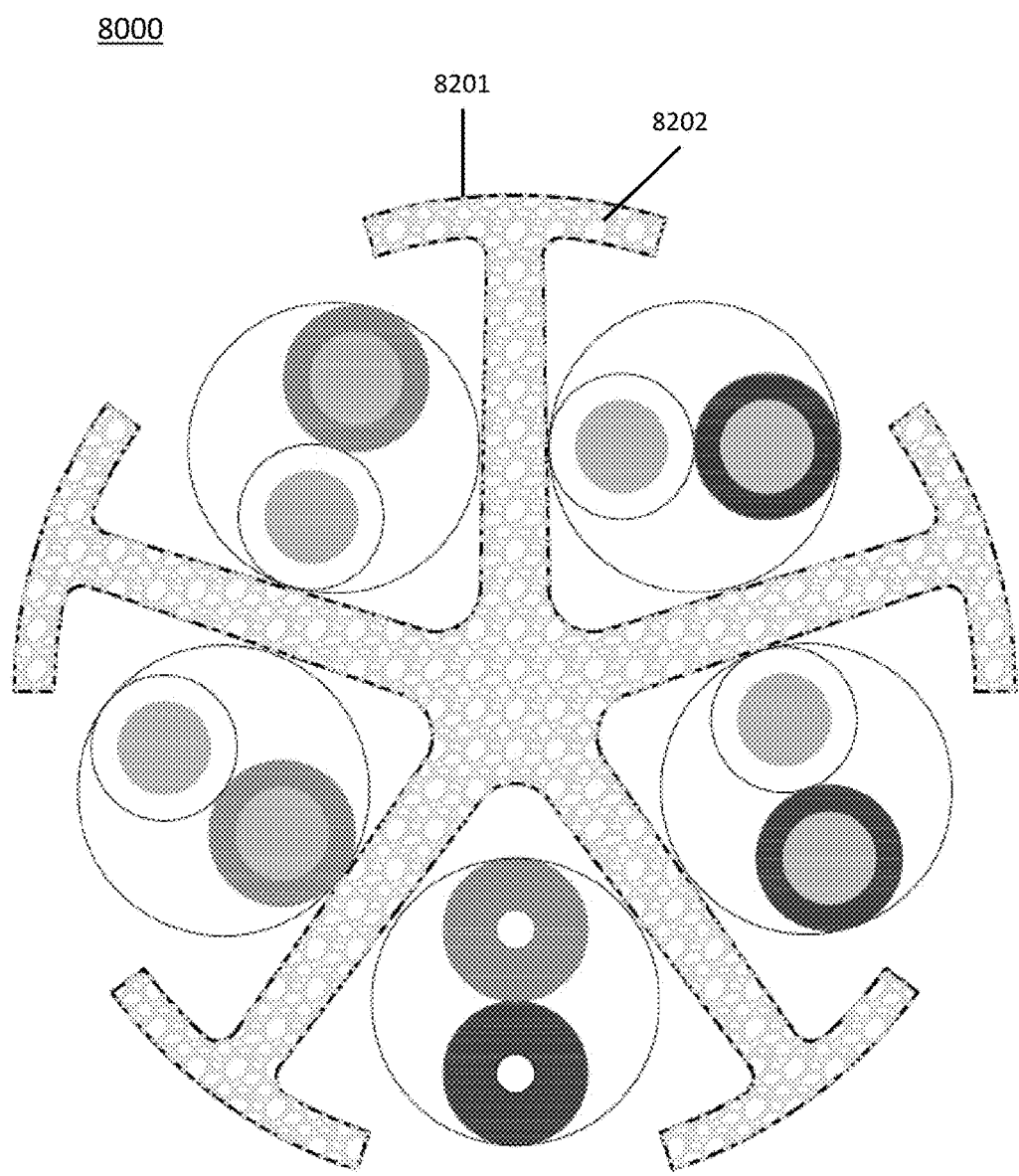
FIG. 18D schematically depicts a cross-sectional view of a foamed separator and a plurality of conductors and fiber optic cables disposed in longitudinal channels provided by the separator in accordance with an embodiment of the invention.

FIGS. 18C and 18D depict unjacketed PoE cable 8000. Separators 8101 and 8201 are foamed in accordance with the present teachings. For example, foamed separators 8101 and 8201 can have a foaming level in a range of about 20% to about 40%, e.g., about 30%. Cells 8102 of separator 8101 can have varying sizes. Cells 8202 can have substantially uniform size and distribution within separator 8201. The foamed separators 8101 or 8201 can comprise foamed cells having diameters in a range of about 0.0005 inches to about 0.003 inches. In some cases, the foamed cells can have an average diameter of about 0.0008 inches. The foamed cells can have a closed cell structure, an open cell structure, or a combination thereof. In some embodiments, a majority of the foamed cells (e.g., greater than 50%) have a closed cell structure.

Figure 19A:
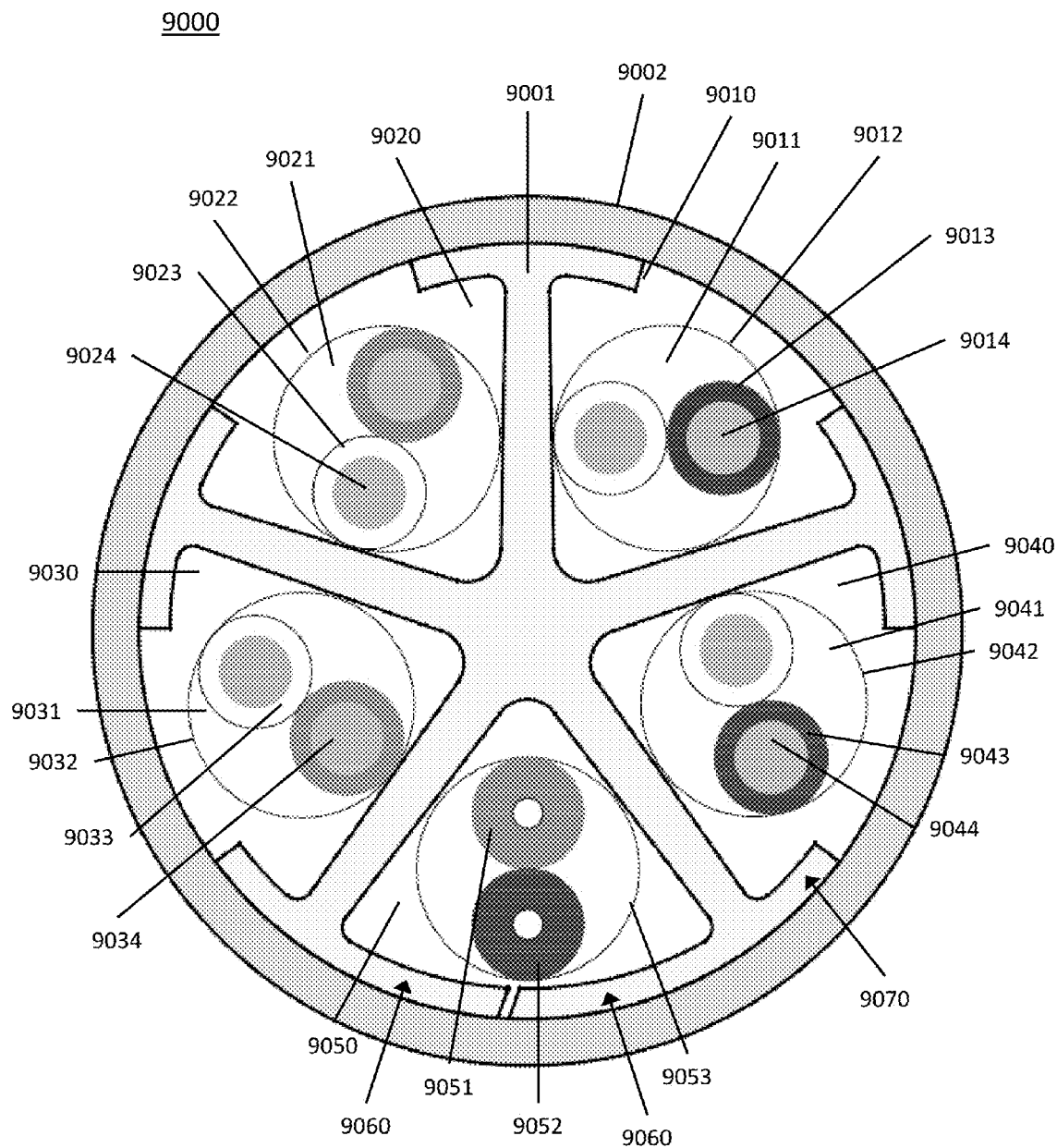
FIG. 19A illustrates an embodiment of a Power Over Ethernet 4-pair copper cable having five channels with one channel having two fiber optic cables for plenum and riser applications.

FIG. 19A depicts PoE cable 9000 according to another embodiment. Separator 9001 has a flap top design and provides 5 longitudinal channels (9010, 9020, 9030, 9040 and 9050). Similar to the previous embodiments, the separator 9001 can comprise engineered resins and can be solid or foamed. Channel 9050 is substantially enclosed by flap tops. Channels 9010, 9020, 9030 and 9040 are partially enclosed by flap tops 9070. The separator 9001 can be in some embodiments substantially free of halogens. Channels 9010, 9020, 9030, and 9040 each include a twisted pair 9011, 9021, 9031 and 9041, respectively. One or both of the copper conductors of the twisted pairs 9011, 9021, 9031 and 9041 can be configured to carry electrical data, power, or combinations thereof. Each twisted pair 9011, 9021, 9031 and 9041 can have a tape 9012, 9022, 9032 and 9042 wrapped around it. The tape can be formed in accordance with the present teachings. The insulation of the twisted pairs, e.g., insulation 9013 on conductor 9014 can be in some embodiments substantially fee of halogens. The cable 9000 includes two buffered optical fibers (e.g. fibers 9051 and 9052), which are substantially enclosed by flap tops 9060 within a buffer tube 9053 that is disposed within channel 9050 of the separator 9001. The buffered fibers 9051 and 9052 as well as the buffer tube 9053 can be formed in accordance with the present teachings and in some cases can be substantially free of halogens. The cable 9000 further includes an outer jacket 9002, which can also be formed in accordance with the present teachings and can be in some cases substantially free of halogens. By way of example, the PoE cable 9000 can be used for plenum and riser applications.

Figure 19B:
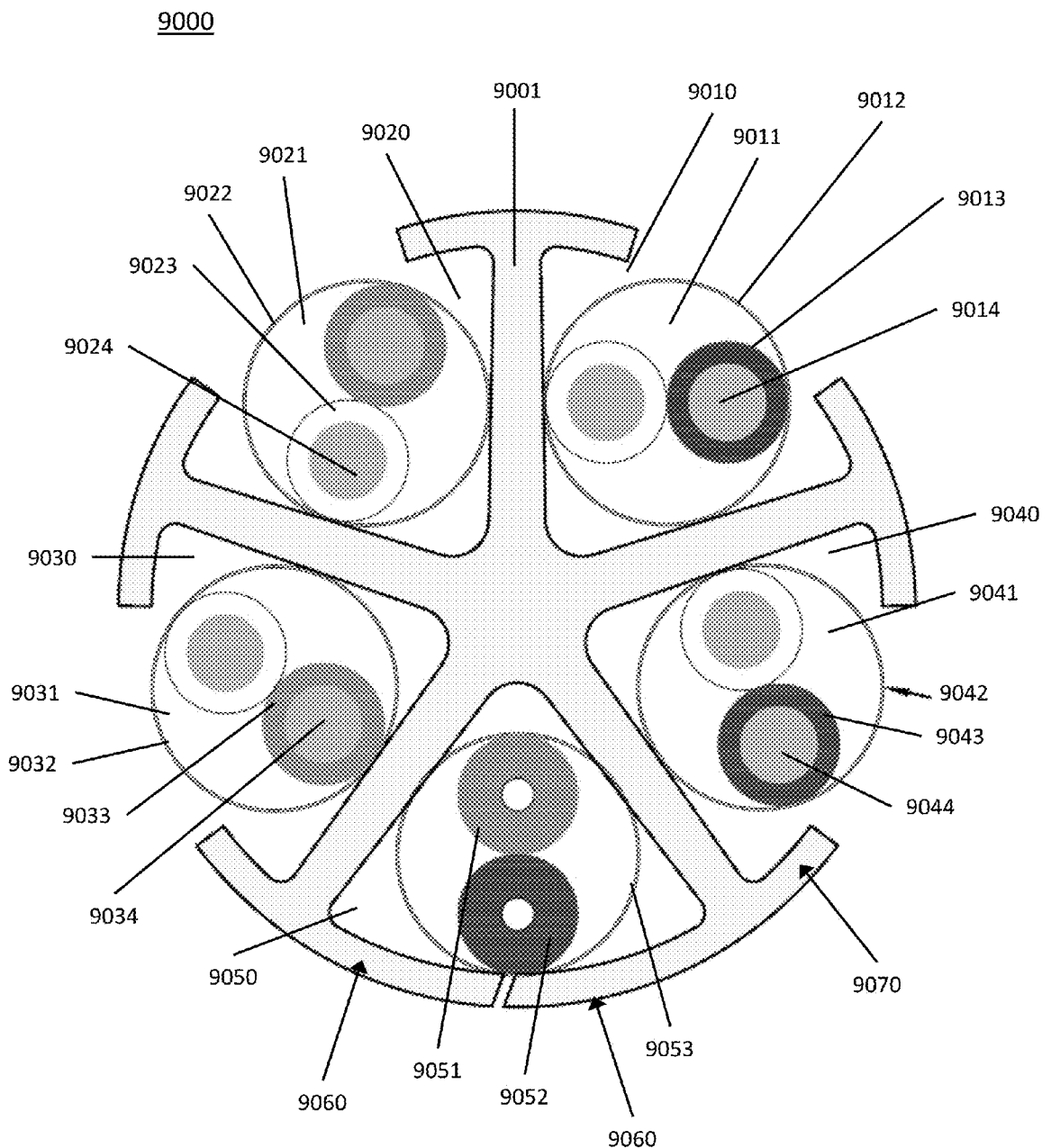
FIG. 19B schematically depicts a cross-sectional view of a separator and a plurality of conductors and fiber optic cables disposed in longitudinal channels provided by the separator in accordance with an embodiment of the invention.

FIG. 19B illustrates the unjacketed cable 9000 shown in FIG. 19A. As described herein, channels 9010, 9020, 9030, 9040 and 9050 can comprise any configuration and/or combination of twisted pairs (e.g., pairs of copper conductors) and fiber optic cables. For example, as illustrated in FIGS. 19A and 19B, channels 9010, 9020, 9030, and 9040 each have a twisted pairs 9011, 9021, 9031 and 9041, respectively. One or both of the copper conductors of the twisted pairs 9011, 9021, 9031 and 9041 can be configured to carry electrical data, power, or combinations thereof. Channel 9050 has two optical fibers 9051 and 9052. Channels 9010, 9020, 9030 and 9040 are partially enclosed by flap tops 9070 and channel 9050 is substantially enclosed by flap tops 9060. Each of the twisted pairs 9011, 9021, 9031 and 9041 can be configured to carry electrical data, power, or combinations thereof.

Figure 19C:
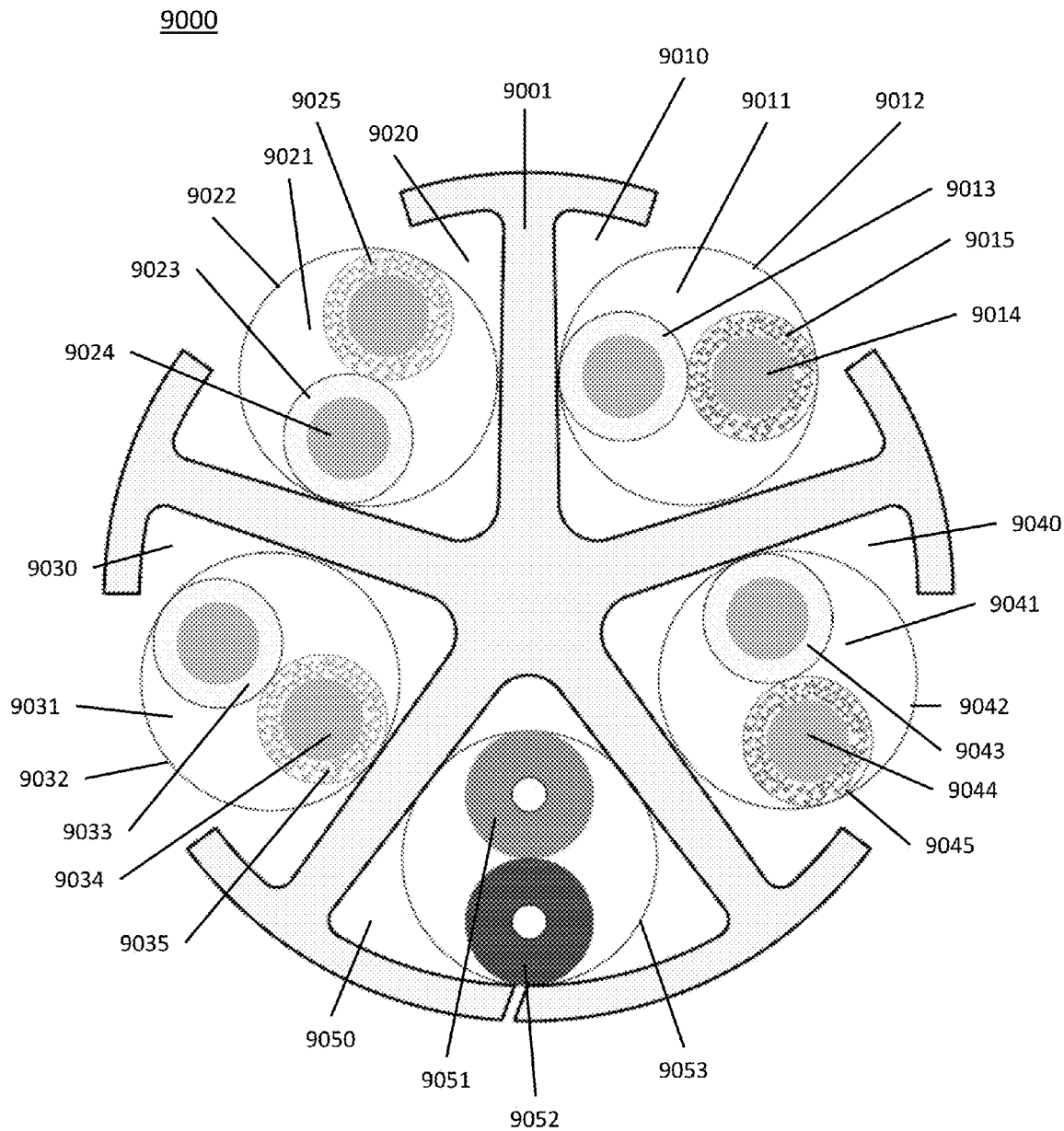
FIG. 19C schematically depicts a cross-sectional view of a separator and a plurality of conductors having foamed insulation and fiber optic cables disposed in longitudinal channels provided by the separator in accordance with an embodiment of the invention.

FIG. 19C illustrates another embodiment of the unjacketed cable 9000. Insulation 9015, 9025, 9035 and 9045 of copper conductors 9014, 9024, 9034 and 9044 can be foamed in accordance with the present teachings and in some cases substantially free of halogens. The insulation of one or both copper conductors in a twisted pair can be foamed. One or both of the copper conductors (e.g., conductors 9014, 9024, 9034 and 9044) of the twisted pairs 9011, 9021, 9031 and 9041 can be configured to carry electrical data, power, or combinations thereof.

The PoE communications cables, cable components and articles described herein can support the transmission of electrical power, electrical data, fiber optic data, or combinations thereof. As depicted, for example, in FIGS. 15-19C, a separator (e.g., 7001 in FIG. 17A) according to an embodiment of the present teachings can include a plurality of channels (e.g., channels 7200), each of which can receive at least one copper conductor, and typically a twisted pair of copper conductors. In FIG. 15, copper pairs 5010, 5011, 5012 and 5013 can be each configured to carry electrical power. For example, electrical conductors (e.g., copper cables) 5010, 5011, 5012, and/or 5013 can carry 0 to about 25 watts of power. In some aspects, each electrical conductor can carry about 1 watt, about 5 watts, about 10 watts, about 15 watts, about 20 watts, about 25 watts, or about 30 watts of power. The total power that is carried by a single communications cable is equal to the sum of the power carried by the individual copper cables. In some aspects, the total power carried by the electrical conductors in a single communication cable described herein is about 1 watt to about 300 watts, e.g., about 1 watt, about 10 watts, about 20 watts, about 50 watts, about 75 watts, about 100 watts, about 150 watts, about 200 watts, or about 300 watts.

In some embodiments, the electrical conductors can have an AWG (American Wire Gauge) in a range of about 22 to about 26. In some aspects, each electrical conductor can support an electrical current (ampere) in the range of about 1 milliamp (mA) to about 2 amps (A). Additionally or alternatively, each electrical conductors can be maintained at an electrical potential in the range of about 1 volt to about 240 volts.

As described herein, power over Ethernet (PoE) cables allow power to be transmitted over long cable lengths. The power can be carried on the same conductors as the data, or it may be carried on dedicated conductors in the same cable. In some aspects, some or all of the copper cables present in a communications cable according to the present teachings can carry electrical power. There are several common techniques for transmitting power over Ethernet cabling. For example, two of these techniques have been standardized by IEEE 802.3. Since only two of the four pairs are needed for 10BASE-T or 100BASE-TX, power can be transmitted on the unused conductors of a cable. This is referred to as Alternative B (IEEE). The leading number ("10" in 10BASE-T) refers to the transmission speed in Mbit/s. "BASE" denotes that baseband transmission is used. The "T" designates twisted pair cable. Where there are several standards for the same transmission speed, they are distinguished by a letter or digit following the T, such as "TX."

Alternatively, power can be transmitted on the data conductors by applying a common-mode voltage to each pair. Since twisted-pair Ethernet uses differential signaling, this does not interfere with data transmission. The common mode voltage is extracted using the center tap of the standard Ethernet pulse transformer. This is similar to the phantom power technique commonly used for powering audio microphones. This is referred to as Alternative A.

Accordingly, a communications cable (e.g., see FIGS. 15, 16, 17A-17C, 18A-18D, or 19A-19C) can be configured so that some (at least one) or all of the electrical (e.g., copper) conductors carry electrical power. In some embodiments, at least one electrical (e.g., copper) conductor, or conductor pair, carries electrical power. In some embodiments, at least 2 electrical (e.g., copper) conductors, or conductor pairs, carry electrical power. In some embodiments, at least 3 electrical (e.g., copper) conductors, or conductor pairs, carry electrical power. In some embodiments, at least 4 electrical (e.g., copper) conductors, or conductor pairs, carry electrical power.

Also, a communications cable can be configured so that some (at least one) or all of the electrical (e.g., copper) conductors carry electrical power and electrical data on the same conductor. For example, in a communications cable having 4 copper conductor pairs (e.g., twisted copper pairs 7002, 7003, 7004, and/or 7005 in FIG. 17), 1, 2, 3 or 4 of the copper conductors can each carry electrical power (e.g., DC power) along with electrical data.

Table 5 below, adapted from IEEE 802.3-2005, section 2, table 33-3, shows the power range for each class, defined by IEEE.

TABLE 5

Power Levels for PoE

| Class | Current (mA) | Power range (Watts) | 4-Pair Cable (total watts) |
|---|---|---|---|
| 0 | 0-4 | 0.44-12.94 | 51.76 |
| 1 | 9-12 | 0.44-3.84 | 15.36 |
| 2 | 17-20 | 3.84-6.49 | 25.96 |
| 3 | 26-30 | 6.49-12.95 | 51.8 |
| 4 | 36-44 | 12.95-25.5 | 102 |

For example, the communication cables described herein can fully support and power any number of PoE devices, such as voice over IP (VoIP) and wireless networking (WLAN) devices. For VoIP applications, DC power is transmitted along with data. For WLAN applications, it may be impractical or expensive to run AC power at certain access points. The ability to use the same cable for data and power decreases the cost of deploying IP technology.

Other examples of devices capable of using PoE include, but is not limited to industrial control/automation, lighting, flat screen TV's, security systems, video/surveillance cameras, media hubs, smart phone media control, fire protection, environmental monitoring, extended wireless networks, and artificial intelligence that stabilizes and optimizes networks, heating/cooling (HVAC) systems.

In some embodiments, the communications cables described herein are capable of carrying data (network) transmission and power transmission. For example, the communications cable according to some embodiments can comply with TIA 568-C.2 and ISO 11801 specifications. These cables are designed specifically for data transmission and utilize copper conductors that are typically 22-26 AWG (American Wire Gauge). Power cables, for example, used in buildings can be about 12-14 AWG. As described herein, the cables can have a balance of power transmission and data transmission while maintaining the safety standards, outlined in Table 2, above.

A current carried by an electrical conductor can cause heating of the conductor in accordance with the following relationship:

$$I^2Rt = H$$

where:
R denotes electrical resistance of the conductor;
I denotes current carried by the conductor;
t denotes the time period during which the current has been carried by the conductor and;
H denotes heat generated in the conductor.

By way of example, the resistivity of copper increases as the circular mils of the conductor is reduced. Smaller wires, for example those used in data cables, produce more heat than, for example, typical power wiring. Also, resistivity increases as the temperature of the copper conductor increases. Accordingly, in some aspects, the communication cables described herein comply with TIA 568-C.2 and ISO 11801 cabling standards, wherein conductors utilized in balanced twisted pair cable can be in accordance with ASTM D4566 and shall not exceed 9.38Ω/100 meters (328 ft.).

Thermal conductivity is the amount of heat a material can carry through it in unit time. Thermal conductivity is expressed in W/(mk); watts per meter kelvin. Thermal Conductivity (often denoted k, λ, or κ) is evaluated primarily in terms of Fourier's Law for Heat Conduction. For example, heat transfer occurs at a lower rate across materials of low thermal conductivity than across materials of high thermal conductivity. The reciprocal of thermal conductivity is called thermal resistivity.

Air bubbles in dielectric materials of a cable can provide increased thermal resistivity, thus reducing the heat transfer from the conductors to other areas of the cable, such as other insulated conductors, fillers, tapes (including shielding tapes) and jackets. Thermal conductance is additive, so thermal resistivity is additive inverse. Because thermal resistivity is additive inverse each additional foamed component that is added further reduces the amount of heat energy that is transferred to the next layer or area surrounding the cable or bundle of cables. For example, a cable comprising a foamed insulation can transfer less heat than a cable comprising non-foamed insulation. A cable comprising both a foamed insulation and a foamed jacket can provide less heat transfer than a cable with only foamed insulations. A cable comprising a foamed insulation, a foamed filler such as a cross web, tape, woven or non-woven material, and a foamed jacket can provide less heat transfer than the non-foamed products. Shielded cables comprising foamed insulation, foamed shielding tape, with or without additional fillers and a foamed jacket can provide less heat transfer than other non-foamed or partial foamed cable constructions.

Existing PoE and newer requirements, described herein, require conductors to carry higher currents. As shown above, as current increases, the temperature of the copper conductor increases. In some cases, an increase in the conductor's temperature can require the use of a thermal insulator, e.g., a material having a high thermal resistivity, to reduce, and preferably inhibit, transfer of heat from the conductor to adjacent components of the cable. This can be important because transferring excessive heat can affect other materials in the cable, such as drying the plasticizer out of PVC materials, which can cause the affected material to become brittle and decrease the life of the cable while also increasing the risk of electrical fires.

Table 6, below, provides examples of twisted pair data transmission cable and the most common twisted-pair cables.

TABLE 6

Examples of Twisted Pair Data Transmission Cable

| Name | Typical construction | Bandwidth | Applications |
|---|---|---|---|
| Level 1 | | 0.4 MHz | Telephone and modem lines |
| Level 2 | | 4 MHz | Older terminal systems, e.g. IBM 3270 |
| Cat.3 | UTP | 16 MHz | 10BASE-T and 100BASE-T4Ethernet |
| Cat.4 | UTP | 20 MHz | 16 Mbit/s Token Ring |
| Cat.5 | UTP | 100 MHz | 100BASE-TX & 1000BASE-TEthernet |
| Cat.5e | UTP | 100 MHz | 100BASE-TX & 1000BASE-TEthernet |
| Cat.6 | UTP | 250 MHz | 10GBASE-T Ethernet |
| Cat.$6_A$ | U/FTP, F/UTP | 500 MHz | 10GBASE-T Ethernet |
| Cat.7 | F/FTP, S/FTP | 600 MHz | 10GBASE-T Ethernet.POTS/CATV/1000BASE-T over single cable |
| Cat.$7_A$ | F/FTP, S/FTP | 1000 MHz | 10GBASE-T Ethernet.POTS/CATV/1000BASE-T over single cable |
| Cat.8/8.1 | U/FTP, F/UTP | 1600-2000 MHz | 40GBASE-T Ethernet.POTS/CATV/1000BASE-T over single cable |
| Cat.8.2 | F/FTP, S/FTP | 1600-2000 MHz | 40GBASE-T Ethernet.POTS/CATV/1000BASE-T over single cable |

Table 7, below, provides examples of common industry abbreviations, as used herein. In Table 7, under column "TIA; ISO 11801," the code before the slash designates the shielding for the cable itself, while the code after the slash determines the shielding for the individual pairs:

U=unshielded
F=foil shielding
S=braided shielding (outer layer only)
TP=twisted pair

TABLE 7

Common Industry Abbreviations for Cable Construction

| Industry acronyms | TIA; ISO 11801 | Cable shielding | Pair shielding |
|---|---|---|---|
| UTP | U/UTP | none | none |
| STP, ScTP, PiMF | U/FTP | none | foil |
| FTP, STP, ScTP | F/UTP | foil | none |
| STP, ScTP | S/UTP | braiding | none |
| SFTP, S-FTP, STP | SF/UTP | braiding, foil | none |
| FFTP | F/FTP | foil | foil |
| SSTP, SFTP, STP PiMF | S/FTP | braiding | foil |
| SSTP, SFTP | SF/FTP | braiding, foil | foil |

Table 8, below, illustrates various materials used in communication cables and their associated thermal conductivity.

TABLE 8

Various Materials Used in Data Cables and their associated Thermal Conductivity:

| Material | Description | Thermal Conductivity |
|---|---|---|
| Air | Gaseous Mixture | 0.026 |
| Copper | Non-Ferrous Conductive Metal | 401 |
| PEEK | Polyether Ether Ketone | 0.25 |
| PES | Polyethersulfone | 0.15 |
| PPSU | Polyphenylsulfone | 0.35 |
| PSU | Polysulphone | 0.35 |
| PEI | Polyetherimide | 0.22 |

The foaming of plastic materials (e.g., of one or more engineered resins), can allow heat to dissipate through convection more quickly. For example, the thermal conductivity of PEEK with the addition of air to the dielectric is calculated:

$$PEEK: \ 0.25 \times 70\% = 0.175$$

$$Air: \ 0.026 \times 30\% = \underline{0.0078}$$

$$= 0.1828$$

In the calculation above, the sum of the thermal conductivities of the relative contributions from PEEK and air is calculated. In this example, a 30% foam level was assumed, i.e., air contributes 30% and PEEK contributes 70%.

Table 9, below, lists the thermal conductivity of various polymers. Using the thermal conductivity of air, the overall thermal conductivity of the material is calculated at both a 30% foam level and a 50% foam level.

TABLE 9

Material Thermal Conductivity

| Material | Thermal Cond. | Thermal Cond. Air | 30% Foam | 50% Foam |
|---|---|---|---|---|
| PEEK | 0.25 | 0.026 | 0.1828 | 0.138 |
| PES | 0.15 | 0.026 | 0.1128 | 0.088 |
| PEI | 0.22 | 0.026 | 0.1618 | 0.123 |
| PSU | 0.35 | 0.026 | 0.2606 | 0.188 |
| PPSU | 0.35 | 0.026 | 0.2606 | 0.188 |

As shown in Table 9, the addition of air to a material reduces the thermal conductivity and increases thermal resistivity. Besides the process of foaming, any method of adding air to materials can reduce the thermal conductivity and can increase the thermal resistivity.

Thus, it is an aspect of the invention described herein, that the addition of air (e.g., through foaming) to a polymeric dielectric material such as those used in the cable construction described herein, to reduce the heat transfer and/or increase the heat resistivity of the material, Accordingly, as described herein, foamed insulations, foamed fillers, foamed tapes, foamed jackets, and/or foamed separators can reduce the amount of heat released to areas surrounding the cable or bundle of cables due to increased thermal resistivity. Since thermal resistivity is the reciprocal of heat transfer, the addition of a foamed material into a cable construction further reduces heat transfer to surrounding areas. Also, reducing the heat transfer to outer layers of the cable and areas surrounding increases the fire safety of the cable.

Therefore, it is an aspect of the present teachings to increase the thermal resistivity of a communications cable and/or components of communications cables (e.g., insulation, filler, tape, jacket, and/or separator). Further, construction of communication cables and components of communication cables with increased thermal resistivity can reduce the amount of heat that cable will absorb from its environment (surroundings). Particular environments where this type of communications cable would be useful, includes, for example, high temperature areas using cabling in industrial applications, plenum areas in which extreme heat is normal, down hole applications. As described herein, increasing the thermal resistivity can be from, for example, foaming the polymeric materials. It is also another aspect to reduce the fuel in a communications cable. Also, it is an aspect to reduce the amount of peak smoke and average smoke in the communication cables described herein that can be emitted during Safety testing such as NFPA 262 Standard Method of Test for Flame Travel and Smoke of Wires and Cables for use in Air-Handling Spaces.

ANSI/TIA 568-C.2 (Table G3) provides well known guidelines for de-rating cable length based on increased insertion loss for temperature rise of both unscreened and screened cables. This table is primarily for cables installed in high temperature environments. The same effect on transmission can be seen through radiant heating of conductors due to increased current. Lower thermal conductivity of cable materials can reduce insertion loss allowing a signal to travel farther. In fixed installations running active Ethernet protocol increasing heat of the cable will reduce the length of the signal by increasing insertion loss thus increasing the possibility of lost packets of information (BIT Error Rate). The loss of ethernet packets cause systems to resend information thus lowering the network's efficiency.

Formula from ANSI/TIA 568-C.2—Annex G $$IL_{20}=IL_t/1+\delta_1(T-20)+1+\delta_2(T-40)$$

Where:

$IL_t$=Measured insertion loss at temperature T $IL_{20}$=Insertion loss corrected to 20° C.

T=Measured temperature in ° C.

TABLE 10

Maximum horizontal cable length de-rating for different temperatures (Annex G; TIA 568-C.2)

| | Temperature (° C.) | $\delta_1$ | $\delta_2$ |
|---|---|---|---|
| UTP | 20 ≤ T ≤ 40 | 0.0004 | 0 |
| | 40 ≤ T ≤ 60 | 0.0004 | 0.00248 |
| F/UTP | 20 ≤ T ≤ 60 | 0.002 | 0 |

Below are examples of Power over Ethernet formats.

POE per IEEE 802.af maximum power 15.4 Watts, max current 350 mA

POE+per IEEE 802at Type 2 maximum power 30 Watts, max current 600 mA

UPOE per IEEE 802.3at-2009 maximum power 60 Watts, max current 1 AMP

HDBaseT (50 W+50 W) maximum power 200 Watts, max current 1 AMP, being defined

TABLE 11

| Converting Watts to ° C./hr | | |
|---|---|---|
| | Watts | ° C./hr |
| POE | 15.4 | 8.12 |
| POE+ | 30 | 15.83 |
| UPOE | 60 | 31.65 |
| HDBaseT | 200 | 105.51 |

Watts = 0.52752793° C./hr

While the production of heat by conductor resistivity and amperage can over time effect safety of cabling it can also cause problems that relate to physical termination between the wire conductor and the connector terminal. Tin plating on copper conductors, which reach 85° C. (185° F.), is the most common cause of fretting corrosion in tin plated connectivity systems. It is well known by those skilled in the art that fretting corrosion breaks the gas tight seal between the conductor plating and the connector plating thus increasing resistance and heat in that area, which can result in excessive heat to the point of creating fire and burning the connector. Even when the heat is not sufficient to cause a fire it can cause the connector housing to age prematurely, becoming brittle and not providing proper circuit protection. Foaming the plastic housings of the connectivity system will also promote efficient convection cooling, thus, reducing the possibilities of this occurrence. If the foamed connectivity housings use the same materials as the foamed insulation it will promote better data transmission by providing less impedance variation.

Electrically Conductive Elements

Figure 22:
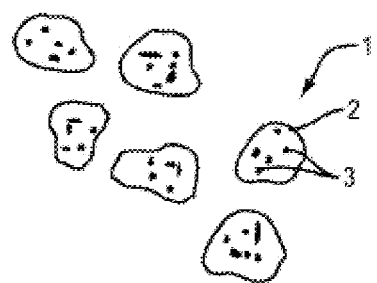
FIG. 22 schematically depicts a plurality of pellets according to an embodiment of the invention.

FIG. 22 schematically depicts a polymeric composition 1, e.g. a pellet, according to an embodiment of the invention that includes a polymer base resin 2 in which a plurality of electrically conductive inclusions 3 are dispersed. In some embodiments, the polymer base resin includes at least about 50 weight percent of the composition. For example, the polymer base resin can include about 50 to about 95 weight percent of the composition, or about 60 to about 85 weight percent, or about 60 weight percent to about 80 weight percent, or about 60 weight percent to about 75 weight percent, of the polymeric composition. The polymer base resin comprises any of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polypropylene (PP), cyclic olefin copolymer (COC), polycarbonate (PC), polyphenylene ether (PPE), liquid crystal polymer (LCP), and/or combinations thereof. In some embodiments, the polymeric composition is substantially free of halogens.

In some embodiments, the electrically conductive inclusions 3 can include about 1 weight percent to about 30 weight percent, or about 5 weight percent to about 20 weight percent, or about 5 weight percent to about 15 weight percent, or about 5 weight percent to about 10 weight percent of the polymeric composition.

In some embodiments, the electrically conductive inclusions 3 can comprise any of metal, metal oxide, or other electrically conductive materials, such as carbon nanotubes carbon fullerenes, carbon fibers, nickel coated carbon fibers, single or multi-wall graphene, or copper fibers. By way of example, in some embodiments the electrically conductive inclusions 3 include any of silver, aluminum, copper, gold, bronze, tin, zinc, iron, nickel, indium, gallium, or stainless steel. In some embodiments the electrically conductive inclusions 3 can include metal alloys, such as, for example, tin alloys, gallium alloys, or zinc alloys. In other embodiments, the electrically conductive inclusions can include metal oxides, such as, for example, copper oxide, bronze oxide, tin oxide, zinc oxide, zinc-doped indium oxide, indium tin oxide, nickel oxide, or aluminum oxide. In some embodiments, some of the electrically conductive inclusions are formed of one material while others are formed of another material. Further, in some embodiments, the electrically conductive inclusions are formed of metals and are substantially free of any metal oxides.

The electrically conductive inclusions 3 can have a variety of shapes. For example, in some embodiments, the electrically conductive inclusions are in the form of discrete particles having a variety of geometrical shapes. For example, the electrically conductive inclusions can comprise particles having any of spherical, needle-like, or flake-like shapes. In some other embodiments, the electrically conductive inclusions 3 are in the form of agglomerates of an electrically conductive material without a defined geometrical shape.

The electrically conductive inclusions can have a variety of sizes and aspect ratios. By way of example, the electrically conductive inclusions can include needle-like particles having an aspect ratio in a range of about 10 to about 1000. In some embodiments, the electrically conductive inclusions can have a maximum size in a range of about 10 microns to about 6000 microns, or in a range of about 600 microns to about 6000 microns, or in a range of about 10 microns to about 600 microns. By of example, the electrically conductive inclusions can include needle-like particles having a length in a range of about 10 microns to about 6000 microns or in a range of about 600 microns to about 6000 microns, or in a range of about 10 microns to about 600 microns. Alternatively or in addition, the electrically conductive inclusions can include spherical particles having a diameter in a range of about 10 microns to about 6000 microns, or in a range of about 600 microns to about 6000 microns, or in a range of about 10 microns to about 600 microns. In other embodiments, the electrically conductive inclusions can include flake-like particles having a maximum cross-sectional dimension in a range of about 10 microns to about 6000 microns, or in a range of about 600 microns to about 6000 microns, or in a range of about 10 microns to about 600 microns.

In some embodiments, the electrically conductive inclusions can include particles of different shapes. For example, the electrically conductive inclusions can include particles having two different shapes. In some such embodiments, one type of the particles are particularly suitable for reflecting electromagnetic radiation incident thereon, e.g., electromagnetic radiation having a frequency in a range of about 1 MHz to about 40 GHz or in a range of about 1 MHz to about 10 GHz, or in a range of about 1 MHz to about 2 GHz, or in a range of about 1 MHz to about 1.5 GHz, and the other type of particles are particularly suitable in dissipating (e.g., via heat generation or eddy current generation) the electromagnetic radiation incident thereon, e.g., electromagnetic radiation having a frequency in a range of about 1 MHz to about 40 GHz or in a range, of about 1 MHz to about 10 GHz, or in a range of about 1 MHz to about 2 GHz, or in a range of about 1 MHz to about 1.5 GHz.

For example, in some embodiments, the polymeric composition 1 can include a plurality of needle-like metallic particles and a plurality of flake-like metallic particles. In some such embodiments, the needle-like metallic particles can primarily reflect the incident electromagnetic radiation having one or more frequencies in a range of about 1 MHz to about 10 GHz and the flake-like metallic particles can primarily dissipate (e.g., via absorption) the incident electromagnetic radiation having frequencies in a range of about 1 MHz to about 10 GHz. In some such embodiments, the fraction of particles having needle-like shape relative to those having a flake-like shape, or vice versa, can be about, e.g., 50/50, 40/60, 30/70, 20/80, or 10/90.

In some embodiments, the base polymer can comprise at least about 50 weight percent, or at least about 60 weight percent, or at least about 70 weight percent, or at least about 80 weight percent, or at least about 90 weight percent or at least about 95 weight percent of the composition. The electrically conductive inclusions can in turn comprise at least about 1 weight percent, or at least about 2 weight percent, or at least about 3 weight percent, or at least about 4 weight percent, or at least about 5 weight percent, or at least about 6 weight percent, or at least about 7 weight percent, or at least about 8 weight percent, or at least about 9 weight percent, or at least about 10 weight percent, or at least about 15 weight percent, or at least about 20 weight percent of the composition. For example, the electrically conductive inclusions can comprise about 1 weight percent to about 20 weight percent of the composition. Further, the chemical foaming agent can comprise at least about 1 weight percent, or at least about 2 weight percent, or at least about 3 weight percent, or at least about 4 weight percent, or at least about 5 weight percent, or at least about 6 weight percent, or at least about 7 weight percent, or at least about 8 weight percent, or at least about 9 weight percent, or at least about 10 weight percent, or at least about 15 weight percent, or at least about 20 weight percent, or at least about 30 weight percent, of the composition.

In some embodiments, the electrically conductive inclusions are formed of a metal, in other embodiments the inclusions 86 can be formed of a metal oxide, such as, for example, copper oxide, bronze oxide, tin oxide, zinc oxide, zinc-doped indium oxide, indium tin oxide, nickel oxide, or aluminum oxide. In other embodiments, the electrically conductive inclusions can be formed of carbon nanotubes, graphene, and/or fullerenes. As known in the art, carbon nanotubes are allotropes of carbon with a cylindrical nanostructure. Nanotubes are members of the fullerene structural family, which also includes the spherical buckyballs, and the ends of a nanotube may be capped with a hemisphere of the buckyball structure.

Figure 23A:
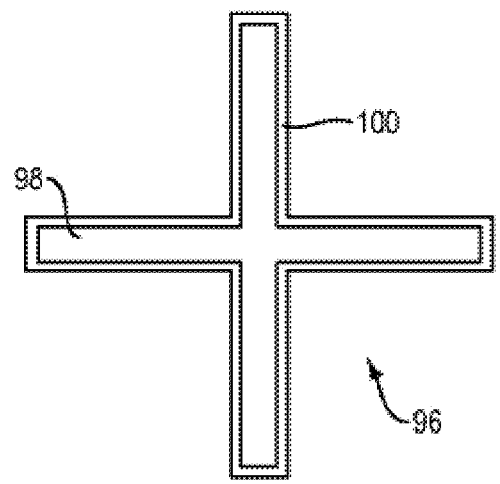
FIG. 23A schematically depicts a separator having a metal coating disposed on an external surface thereof according to an embodiment of the invention.

In some embodiments, rather than or in addition to distributing metal inclusions within, for example, a separator, an outer surface of a separator can be coated with an electrically conductive material, e.g. it can be metalized, to provide electromagnetic shielding. By way of example, FIG. 23A schematically depicts an embodiment of such a separator 96, which has a polymeric body portion 98 having a T-shaped cross-sectional profile. A thin metal coating 100 covers an outer surface of the body portion 98 to provide electromagnetic shielding. In some embodiments, a thickness of the metal coating can be, e.g., in a range of about 3 microns to about 12 microns. While in some embodiments, the metal coating has a substantially uniform thickness, in other embodiments, the thickness of the metal coating can exhibit a variation over the surface on which it is deposited. A number of metals can be utilized to form the coating 100. By way of example, the metal coating can be formed of any of copper, silver, aluminum, copper, gold, bronze, tin, zinc, iron, nickel, indium, gallium, or stainless steel. In some embodiments, a plurality of electrically conductive inclusions (e.g., metal inclusions), discussed in more detail above, can be distributed within the polymeric body portion 98.

Figure 23B:
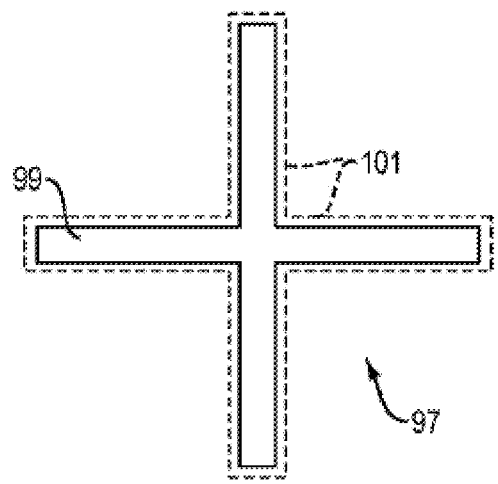
FIG. 23B schematically depicts a separator having a patchwork of metal portions disposed on an external surface thereof according to an embodiment of the invention.

While in this embodiment, the metal coating 100 covers substantially the entire outer surface of the body portion 98, in other embodiments, the metal coating can cover only portions of the outer surface. By way of example, FIG. 23B schematically depicts a separator 97 according to another embodiment having a metal coating that is in the form of a patchwork of metal portions 101 deposited on the outer surface of a polymeric body portion 99 of the separator. In this embodiment, the separator includes an engineered resin (or a mixture of two or more engineered resins) and is preferably substantially free of a halogen. Again, the thickness of each metal portion can be, e.g., in a range of about 3 microns to about 12 microns. In some cases, the metal portions cover at least about 30%, or at least about 40%, or at least about 50%, or at least about 60%, or at least about 70%, or at least about 80%, or at least about 90%, or at least about 95% of the surface area of the separator. In some embodiments, a plurality of electrically conductive inclusions, e.g., metal inclusions, can be distributed within the polymeric body portion 99.

The coating of conductive material can be applied using any suitable process known in the art. For example, the coating can be applied using a process of electroless plating. Other processes that can be used to apply the coating of conductive material can include, for example, electroplating, vacuum deposition, sputter coating, double-side plating, single-side plating. In some embodiments, the coating can be applied as a film or foil bonded or otherwise attached to or disposed on the separator. In other embodiments, the coating can be applied by passing the separator through a metal bath, e.g., a tin, bismuth-tin blend, or indium alloy bath.

Figure 24:
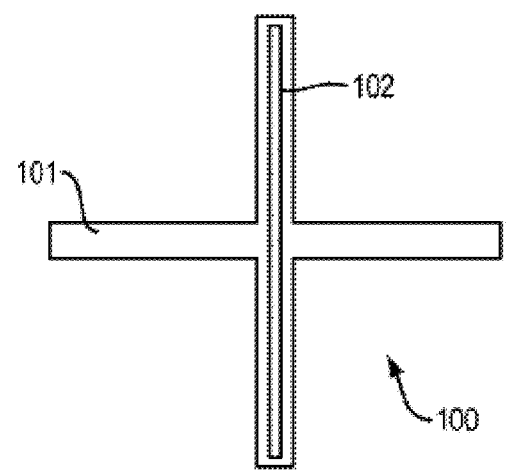
FIG. 24 schematically depicts a separator having an electrically conductive strip disposed therein according to an embodiment of the invention.

FIG. 24 schematically depicts a separator 100 according to another embodiment of the invention that includes a polymeric body portion 102, which includes one or more engineered resins, having a T-shaped cross section, which provides 4 channels in which conductors can be disposed. The separator 100 further includes an electrically conductive strip 102 (e.g., a metal strip) that is disposed internally within the body portion 101. In this embodiment, the metal strip extends along the length of the separator from a proximal end to a distal end thereof to provide electromagnetic shielding between conductors (not shown) disposed within the channels formed by the separator. In some embodiments, a thickness of the internal metal strip can be in a range of about 6 microns to about 55 microns.

Methods of Manufacturing and Making Foamed Articles

In one aspect, methods of fabricating foamed articles by processing foamable compositions according to the present teachings are disclosed. In one embodiment, a foamable composition according to the present teachings, such as the foamable compositions described above, is processed at an elevated temperature to cause foaming of the talc (or talc derivative) (that is, the disintegration of talc to generate gases) so as to foam the composition. By way of example, the processing of the foamable composition can be performed at a temperature of at least about 600° F., at least about 620° F., at least about 630° F., at least about 640° F., or at least about 650° F. The processing of the foamable composition can be performed in a variety of different ways. For example, the foamable composition can be extruded at an elevated temperature to generate a foamed article.

In some embodiments, the processing parameters are selected such that the foamed article exhibits a foaming level of about 10% to about 80%, e.g., in a range of about 15% to about 70%, or in a range of about 20% to about 60%, or in a range of about 25% to about 50%, or in a range of about 30% to about 40%. In some embodiments, the foaming level is about 10%, about 15%, about 20%, about 25%, about 30%, about 35%, about 40%, about 45%, about 50%, about 55%, about 60%, about 65%, about 70%, about 75%, or about 80%.

In some embodiments, the methods described herein can include the use of a twin-screw extruder for melting, blending and pelletizing. In some aspects, the compounding process utilizes a two-step system to ensure the foaming components are thoroughly distributed and dispersed in the base polymer of the final compound. In some embodiments, the first step includes foaming a masterbatch blend of one or more foaming agents. The foaming agents can be in the form of fine powder. A high intensity blender, (i.e. Henschel type) can be used to prepare the powder blend according to the specified formulation. A certain amount of resin, also in powder form, can be used in the first blending step as a mechanism to predisperse the foaming agents and facilitate the second extrusion compounding step.

The second stage of the compound preparation process can utilize a twin screw extrusion compounding system to incorporate the foaming agent masterbatch blend with the base resin. The design of the compounding screw is such that there is sufficient heat and mechanical energy to fully thermally melt the base polymer and incorporate the masterbatch blend with proper distribution and dispersion during mixing for homogeneity, but yet mild enough to keep the processing temperature of the compound below that in which foaming may be prematurely initiated. The final compound can be strand extruded and pelletized or alternatively an underwater pelletizing technique may be used (in other words air or water cooling is acceptable).

EXAMPLES

The following examples are provided for further illustration of various aspects of the present teachings, and are not necessarily intended to indicate optimal ways of practicing the invention.

All of the materials were determined to be halogen-free based on the Underwriter's Laboratories, (U.L. 2885) protocol:

IEC 60754-1, Test on gases evolved during combustion of materials from cables—Part 1: Determination of the halogen acid gas content and/or;

IEC 60754-2, and/or "Test on Gases Evolved During Combustion of Materials from Cables—Part 2: Determination of acidity (By pH Measurement) and Conductivity."

Draft IEC 62821-1 "Halogen free low smoke thermoplastic insulated and sheathed cables of rated voltages up to and including 450/750 V.

Specific gravity ($S_g$) tests were performed both on the solid and compounded pellet to ASTM D792. The tensile and elongation testing was performed to ASTM D638. The method for measuring the foam by the weight method involved extruding a 10 foot foamed sample and dividing that weight by the theoretical 10 foot weight of a solid sample. The method for measuring the foam by the specific gravity included using ASTM D792 to obtain the specific gravity of the sample and dividing that by the specific gravity of the solid pellets. Talc utilized in the following examples was obtained from D. N. Lukens under trade designation Artic Mist (AMPXXPNBJ). In all of the following examples, the ratios provided are weight ratios.

Example 1

PSU

Manufacture of a Pelletized Foamable Composition

PSU, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/7.5/92.25 was formed by sequential additions through a feeder section of a twin screw extruder. Temperature profile in the melt twin screw extruder was the following (from zone 1 to 11): 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.). The extruder was equipped with a pelletizer to produce pellets to a shape that is preferable for extrusion processes.

Example 2

PSU

Manufacture of a PSU, Wax, and Talc Derivative (Masterbatch Composition)

Aclyn® wax or Genioplast Silicone or Dow Corning Si Powder Resin, halogen-free, powdered siloxane, Dow Corning 4-7105 or 4-7081 commercially available from M. F. Cachat and a talc derivative of chemical composition $Mg_3Si_4O_{10}(OH)$ was melt compounded with a non-halogenated resin, namely PSU, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/15.0/84.75, in a twin screw extruder, with the following temperature profile: 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.).

Example 3

PSU

Manufacture of Foamed Articles from a Mixture of Pellets

Pellets obtained from example 1 or pellets obtained from example 2, blended with PEI at a weight ratio of 50/50, are then placed in the hopper of a 24 to 1 ratio high temperature extruder with heat zones 1 through 6 set at the following temperatures 500° F. (260° C.), 522° F. (272° C.), 600° F. (316° C.), 617° F. (325° C.), 644° F. (340° C.), and 565° F. (296° C.) to form one of several foamed articles including an extruded profile such as used for separators, wire insulation, or jackets for cabling.

Foamed articles were found to possess an outstanding cells structure, with tunable foaming level, and outstanding insulating properties as described in the following examples.

Example 4

PSU

A tape cable support-separator was manufactured with a 1.5 inch high temperature extruder using the following materials and conditions:

A tape die with a high compression screw, a line speed of 361 ft./min., with a 16 RPM screw speed and a melt temperature of 625 F (330° C.) was used. The extruder was loaded with a pellet master batch, the pellets consisted of 7.5% talc, 0.25% Aclyn® wax or Genioplast Silicone or Dow Corning Si Powder Resin, halogen-free, powdered siloxane, Dow Corning 4-7105 or 4-7081 and 82.25% PEI. The pellet master batch was not blended down, but rather was used at 100%. This resulted in an extruded tape that was 44% foamed with an average foamed cell size of 0.0007 inches.

Example 5

PPS

Manufacture of a Pelletized Foamable Composition

A mixture of a non-halogenated resin, namely PPS, talc and Aclyn® wax or Genioplast Silicone or Dow Corning Si Powder Resin, halogen-free, powdered siloxane, Dow Corning 4-7105 or 4-7081 in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/7.5/92.25 was formed by sequential additions through feeder section of the twin screw extruder. Temperature profile in the melt twin screw extruder was the following (from zone 1 to 11): 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.). The extruder was equipped with a pelletizer to produce pellets to a shape that is preferable for extrusion processes.

Example 6

PPS

Manufacture of a PEI, Wax, and Talc Derivative (Masterbatch Composition)

Aclyn® wax or Genioplast Silicone or Dow Corning Si Powder Resin, halogen-free, powdered siloxane, Dow Corning 4-7105 or 4-7081 commercially available from M. F. Cachat and a talc derivative of chemical composition Mg3Si4O10(OH) was melt compounded with a non-halogenated resin, namely PPS, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/15.0/84.75, in a twin screw extruder, with the following temperature profile: 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.).

Example 7

PPS

Manufacture of Foamed Articles from a Mixture of Pellets;

Pellets obtained from example 1 or pellets obtained from example 2, blended with PPS at a weight ratio of 50/50, were placed in the hopper of a 24 to 1 ratio high temperature extruder with heat zones 1 through 5 set at the following temperatures: 520° F. (321° C.), 540° F. (332° C.), 560° F. (343° C.), 570° F. (349° C.), and 560° F. (343° C.) to form one of several foamed articles including an extruded profile such as used for separators, wire insulation, or jackets for cabling.

The foamed articles were found to possess an outstanding cells structure, with tunable foaming level, and outstanding insulating properties as described in the following examples.

Example 8

PPS

A tape cable support-separator was manufactured with a 1.5 inch high temperature extruder using the following materials and conditions:

A tape die with a high compression screw, a line speed of 48 ft./min., with a 4 RPM screw speed and a melt temperature of 536° F. (280° C.) was used. The extruder was loaded with a pellet master batch, the pellet comprising 7.5% talc, 0.25% Aclyn® wax or Genioplast Silicone or Dow Corning Si Powder Resin, halogen-free, powdered siloxane, Dow Corning 4-7105 or 4-7081 and 82.25% PPS. The pellet master batch was not blended down, but rather was used at 100%. This resulted in an extruded tape that was 39% foamed with an average foamed cell size of 0.0007 inches.

Example 9

PEEK

Manufacture of a Pelletized Foamable Composition

A mixture of a non-halogenated resin, namely PEEK, talc and Aclyn® wax or Genioplast Silicone or Dow Corning Si Powder Resin, halogen-free, powdered siloxane, Dow Corning 4-7105 or 4-7081 in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/7.5/92.25 was formed by sequential additions through feeder section of a twin screw extruder. Temperature profile in the melt twin screw extruder was the following (from zone 1 to 11): 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.). The extruder was equipped with a pelletizer to produce pellets to a shape that is preferable for extrusion processes.

Example 10

PEEK

Manufacture of a PEI, Wax, and Talc Derivative (Masterbatch Composition)

Aclyn® wax or Genioplast Silicone or Dow Corning Si Powder Resin, halogen-free, powdered siloxane, Dow Corning 4-7105 or 4-7081 commercially available from M. F. Cachat and a talc derivative of chemical composition $Mg_3Si_4O_{10}(OH)$ was melt compounded with a non-halogenated resin, namely PEEK, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/15.0/84.75, in a twin screw extruder, with the following temperature profile: 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.).

Example 11

PEEK

Manufacture of Foamed Articles from a Mixture of Pellets;

Pellets obtained from example 1 or pellets obtained from example 2, blended with PEEK at a weight ratio of 50/50, were placed in the hopper of a 24 to 1 ratio high temperature extruder with heat zones 1 through 6 set at the following temperatures 680° F. (410° C.), 710° F. (426° C.), 730° F. (438° C.), 740° F. (443° C.), 760° F. (454° C.), and 760° F. (454° C.) to form one of several foamed articles including an extruded profile such as used for separators, wire insulation, or jackets for cabling.

The foamed articles were found to possess an outstanding cells structure, with tunable foaming level, and outstanding insulating properties as described in the following example.

Example 12

PEEK

A tape cable support-separator was manufactured with a 1.5 inch high temperature extruder using the following materials and conditions:

Aa tape die with a high compression screw, a line speed of 192 ft./min., with a 40 RPM screw speed and a melt temperature of 649° F. (343° C.) was used. The extruder was loaded with a pellet master batch, the pellet comprising 7.5% talc, 0.25% Aclyn® wax or Genioplast Silicone or Dow Corning Si Powder Resin, halogen-free, powdered siloxane, Dow Corning 4-7105 or 4-7081 and 82.25% PEI. The pellet master batch was not blended down, but rather was used at 100%. This resulted in an extruded tape that was 45% foamed with an average foamed cell size of 0.0007 inches.

Example 13

PPSU

Manufacture of a Pelletized Foamable Composition

A mixture of a non-halogenated resin, namely PPSU, talc and Aclyn® wax or Genioplast Silicone or Dow Corning Si Powder Resin, halogen-free, powdered siloxane, Dow Corning 4-7105 or 4-7081 in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/7.5/92.25 was formed by sequential additions through feeder section of a twin screw extruder. Temperature profile in the melt twin screw extruder was the following (from zone 1 to 11): 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.). The extruder was equipped with a pelletizer to produce pellets to a shape that is preferable for extrusion processes.

Example 14

PPSU

Manufacture of a PEI, Wax, and Talc Derivative (Masterbatch Composition)

Aclyn® wax or Genioplast Silicone or Dow Corning Si Powder Resin, halogen-free, powdered siloxane, Dow Corning 4-7105 or 4-7081 commercially available from M. F. Cachat and a talc derivative of chemical composition Mg3Si4O10(OH) was melt compounded with a non-halogenated resin, namely PPSU, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/15.0/84.75, in a twin screw extruder, with the following temperature profile: 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.).

Example 15

PPSU

Manufacture of Foamed Articles from a Mixture of Pellets:

Pellets obtained from example 1 or pellets obtained from example 2, blended with PPSU at a weight ratio of 50/50, were placed in the hopper of a 24 to 1 ratio high temperature extruder with heat zones 1 through 6 set at the following temperatures: 650° F. (393° C.), 660° F. (399° C.), 680° F. (410° C.), 690° F. (415° C.), 715° F. (429° C.) and 715° F. (429° C.) to form one of several foamed articles including an extruded profile such as used for separators, wire insulation, or jackets for cabling.

The foamed articles were found to possess an outstanding cells structure, with tunable foaming level, and outstanding insulating properties as described in the following examples.

Example 16

PPSU

A tape cable support-separator was manufactured with a 1.5 inch high temperature extruder using the following materials and conditions;

A tape die with a high compression screw, a line speed of 360 ft./min., with a 20 RPM screw speed and a melt temperature of 707° F. (375° C.) was used. The extruder was loaded with a pellet master batch, the pellet comprising 7.5% talc, 0.25% Aclyn® wax or Genioplast Silicone or Dow Corning Si Powder Resin, halogen-free, powdered siloxane, Dow Corning 4-7105 or 4-7081 and 82.25% PEI. The pellet master batch was not blended down, but rather was used at 100%. This resulted in an extruded tape that was 54% foamed with an average foamed cell size of 0.0007 inches.

Example 17

PES/PESU

Manufacture of a Pelletized Foamable Composition

A of a non-halogenated resin, namely PES/PESU, talc and Aclyn® wax or Genioplast Silicone or Dow Corning Si Powder Resin, halogen-free, powdered siloxane, Dow Corning 4-7105 or 4-7081 in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/7.5/92.25 was formed by sequential additions through feeder section of a twin screw extruder. Temperature profile in the melt twin screw extruder was the following (from zone 1 to 11): 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.). The extruder was equipped with a pelletizer to produce pellets to a shape that is preferable for extrusion processes.

Example 18

PES/PESU

Manufacture of a PEI, Wax, and Talc Derivative (Masterbatch Composition)

Aclyn® wax or Genioplast Silicone or Dow Corning Si Powder Resin, halogen-free, powdered siloxane, Dow Corning 4-7105 or 4-7081 commercially available from M. F. Cachat and a talc derivative of chemical composition Mg3Si4O10(OH) was melt compounded with a non-halogenated resin, namely PES/PESU, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/15.0/84.75, in a twin screw extruder, with the following temperature profile: 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.).

Example 19

PES/PESU

Manufacture of Foamed Articles from a Mixture of Pellets;

Pellets obtained from example 1 or pellets obtained from example 2, blended with PES/PESU at a weight ratio of 50/50, were placed in the hopper of a 24 to 1 ratio high temperature extruder with heat zones 1 through 6 set at the following temperatures 635° F. (385° C.), 645° F. (390° C.), 655° F. (396° C.), 665° F. (401° C.), 680° F. (410° C.) and 680° F. (410° C.) to form one of several foamed articles including an extruded profile such as used for separators, wire insulation, or jackets for cabling.

The foamed articles were found to possess an outstanding cells structure, with tunable foaming level, and outstanding insulating properties as described in the following examples.

Example 20

PES/PESU

A tape cable support-separator was manufactured with a 1.5 inch high temperature extruder using the following materials and conditions;

A tape die with a high compression screw, a line speed of 290 ft./min., with a 12 RPM screw speed and a melt temperature of 689° F. (365° C.) was used. The extruder was loaded with a pellet master batch, the pellet comprising 7.5% talc, 0.25% Aclyn® wax or Genioplast Silicone or Dow Corning Si Powder Resin, halogen-free, powdered siloxane, Dow Corning 4-7105 or 4-7081 and 82.25% PEI. The pellet master batch was not blended down, but rather was used at 100%. This resulted in an extruded tape that was 58% foamed with an average foamed cell size of 0.0007 inches.

Example 21

PEI

Manufacture of a Pelletized Foamable Composition

A mixture of a non-halogenated resin, namely PEI, talc and Aclyn® wax or Genioplast Silicone or Dow Corning Si Powder Resin, halogen-free, powdered siloxane, Dow Corning 4-7105 or 4-7081 in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/7.5/92.25 was formed by sequential additions through feeder section of the twin screw extruder. Temperature profile in the melt twin screw extruder was the following (from zone 1 to 11): 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.). The extruder was equipped with a pelletizer to produce pellets to a shape that is preferable for extrusion processes.

Example 22

PEI

Manufacture of a PEI, Wax, and Talc Derivative (Masterbatch Composition)

Aclyn® wax or Genioplast Silicone or Dow Corning Si Powder Resin, halogen-free, powdered siloxane, Dow Corning 4-7105 or 4-7081 commercially available from M. F. Cachat and a talc derivative of chemical composition $Mg_3Si_4O_{10}(OH)$ was melt compounded with a non-halogenated resin, namely PEI, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/15.0/84.75, in a twin screw extruder, with the following temperature profile: 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.).

Example 23

PEI

Manufacture of Foamed Articles from a Mixture of Pellets;

Pellets obtained from example 1 or pellets obtained from example 2, blended with PEI at a weight ratio of 50/50, were placed in the hopper of a 24 to 1 ratio high temperature extruder with heat zones 1 through 5 set at the following temperatures 560° F. (293° C.), 600° F. (316° C.), 630° F. (332° C.), 625° F. (329° C.), and 620° F. (327° C.) to form one of several foamed articles including an extruded profile such as used for separators, wire insulation, or jackets for cabling.

The foamed articles were found to possess an outstanding cell structure, with tunable foaming level, and outstanding insulating properties as described in the following examples.

Example 24

PEI

A tape cable support-separator was manufactured with a 1 inch high temperature extruder using the following materials and conditions;

A tape die with a high compression screw, a line speed of 125 ft./min., with a 10 RPM screw speed and a melt temperature of 570° F. (300° C.) was used. The extruder was loaded with a pellet master batch, the pellet comprising 7.5% talc by weight, 0.25% Aclyn® wax or Genioplast Silicone or Dow Corning Si Powder Resin, halogen-free, powdered siloxane, Dow Corning 4-7105 or 4-7081 by weight and 82.25% PEI by weight. The pellet master batch was not blended down, but rather was used at 100%. This resulted in an extruded tape that was 22% foamed with an average foamed cell size of 0.0007 inches.

Example 25

LCP

Manufacture of a Pelletized Foamable Composition

A non-halogenated resin, namely LCP, talc and Aclyn® wax or Genioplast Silicone or Dow Corning Si Powder Resin, halogen-free, powdered siloxane, Dow Corning 4-7105 or 4-7081 in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/7.5/92.25 was formed by sequential additions through feeder section of the twin screw extruder. Temperature profile in the melt twin screw extruder was the following (from zone 1 to 11): 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.). The extruder was equipped with a pelletizer to produce pellets to a shape that is preferable for extrusion processes.

Example 26

LCP

Manufacture of a PEI, Wax, and Talc Derivative (Masterbatch Composition)

Aclyn® wax or Genioplast Silicone or Dow Corning Si Powder Resin, halogen-free, powdered siloxane, Dow Corning 4-7105 or 4-7081 commercially available from M. F. Cachat and a talc derivative of chemical composition $Mg_3Si_4O_{10}(OH)$ was melt compounded with a non-halogenated resin, namely LCP, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/15.0/84.75, in a twin screw extruder, with the following temperature profile: 475°

F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.).

Example 27

LCP

Manufacture of Foamed Articles from a Mixture of Pellets:

Pellets obtained from example 1 or pellets obtained from example 2, blended with LCP at a weight ratio of 50/50, were placed in the hopper of a 24 to 1 ratio high temperature extruder with heat zones 1 through 5 set at the following temperatures 520° F. (321° C.), 540° F. (332° C.), 560° F. (343° C.), 570° F. (349° C.), and 560° F. (343° C.) to form one of several foamed articles including an extruded profile such as used for separators, wire insulation, or jackets for cabling.

The foamed articles were found to possess an outstanding cell structure, with tunable foaming level, and outstanding insulating properties as described in the following examples.

Example 28

LCP

A tape cable support-separator was manufactured with a 1 inch high temperature extruder using the following materials and conditions:

A tape die with a high compression screw, a line speed of 48 ft./min., with a 4 RPM screw speed and a melt temperature of 536° F. (280° C.) was used. The extruder was loaded with a pellet master batch, the pellet comprising 7.5% talc (weight), 0.25% (weight) Aclyn® wax or Genioplast Silicone or Dow Corning Si Powder Resin, halogen-free, powdered siloxane, Dow Corning 4-7105 or 4-7081 and 82.25% (weight) PEI. The pellet master batch was not blended down, but rather was used at 100%. This resulted in an extruded tape that was 39% foamed with an average foamed cell size of 0.0007 inches.

Example 29

PEKK

Manufacture of a Pelletized Foamable Composition

Admixture of a non-halogenated resin, namely PEKK, talc and Aclyn® wax or Genioplast Silicone or Dow Corning Si Powder Resin, halogen-free, powdered siloxane, Dow Corning 4-7105 or 4-7081 in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/7.5/92.25 was formed by sequential additions through feeder section of the twin screw extruder. Temperature profile in the melt twin screw extruder was the following (from zone 1 to 11): 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.). The extruder was equipped with a pelletizer to produce pellets to a shape that is preferable for extrusion processes.

Example 30

PEKK

Manufacture of a PEI, Wax, and Talc Derivative (Masterbatch Composition)

Aclyn® wax or Genioplast Silicone or Dow Corning Si Powder Resin, halogen-free, powdered siloxane, Dow Corning 4-7105 or 4-7081 commercially available from M. F. Cachat and a talc derivative of chemical composition $Mg_3Si_4O_{10}(OH)$ was melt compounded with a non-halogenated resin, namely PEKK, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/15.0/84.75, in a twin screw extruder, with the following temperature profile: 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.).

Example 31

PEKK

Manufacture of Foamed Articles from a Mixture of Pellets;

Pellets obtained from example 1 or pellets obtained from example 2, blended with PEKK at a weight ratio of 50/50, were placed in the hopper of a 24 to 1 ratio high temperature extruder with heat zones 1 through 5 set at the following temperatures 520° F. (321° C.), 540° F. (332° C.), 560° F. (343° C.), 570° F. (349° C.), and 560° F. (343° C.) to form one of several foamed articles including an extruded profile such as used for separators, wire insulation, or jackets for cabling.

The foamed articles were found to possess an outstanding cells structure, with tunable foaming level, and outstanding insulating properties as described in the following examples.

Example 32

PEKK

A tape cable support-separator was manufactured with a 1.5 inch high temperature extruder using the following materials and conditions;

A tape die with a high compression screw, a line speed of 48 ft./min., with a 4 RPM screw speed and a melt temperature of 536° F. (280° C.) was used. The extruder was loaded with a pellet master batch, the pellet comprising 7.5% talc, 0.25% Aclyn® wax or Genioplast Silicone or Dow Corning Si Powder Resin, halogen-free, powdered siloxane, Dow Corning 4-7105 or 4-7081 and 82.25% PEI. The pellet master batch was not blended down, but rather was used at 100%. This resulted in an extruded tape that was 39% foamed with an average foamed cell size of 0.0007 inches.

Example 33

PC

Manufacture of a Pelletized Foamable Composition

A mixture of a non-halogenated resin, namely PC, talc and Aclyn® wax or Genioplast Silicone or Dow Corning Si Powder Resin, halogen-free, powdered siloxane, Dow Corning 4-7105 or 4-7081 in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/7.5/92.25 was formed by sequential additions through feeder section of the twin screw extruder. Temperature profile in the melt twin screw extruder was the following (from zone 1 to 11): 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.). The extruder was equipped with a pelletizer to produce pellets to a shape that is preferable for extrusion processes.

Example 34

PC

Manufacture of a PEI, Wax, and Talc Derivative (Masterbatch Composition)

Aclyn® wax or Genioplast Silicone or Dow Corning Si Powder Resin, halogen-free, powdered siloxane, Dow Corning 4-7105 or 4-7081 commercially available from M. F. Cachat and a talc derivative of chemical composition $Mg_3Si_4O_{10}(OH)$ was melt compounded with a non-halogenated resin, namely PC, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/15.0/84.75, in a twin screw extruder, with the following temperature profile: 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.).

Example 35

PC

Manufacture of Foamed Articles from a Mixture of Pellets;

Pellets obtained from example 1 or pellets obtained from example 2, blended with PC at a weight ratio of 50/50, were placed in the hopper of a 24 to 1 ratio high temperature extruder with heat zones 1 through 5 set at the following temperatures 520° F. (321° C.), 540° F. (332° C.), 560° F. (343° C.), 570° F. (349° C.), and 560° F. (343° C.) to form one of several foamed articles including an extruded profile such as used for separators, wire insulation, or jackets for cabling.

The foamed articles were found to possess an outstanding cells structure, with tunable foaming level, and outstanding insulating properties as described in the following working examples;

Example 36

PC

A tape cable support-separator was manufactured with a 1.5 inch high temperature extruder using the following materials and conditions;

A tape die with a high compression screw, a line speed of 48 ft./min., with a 4 RPM screw speed and a melt temperature of 536° F. (280° C.) was used. The extruder was loaded with a pellet master batch, the pellet comprising 7.5% talc, 0.25% Aclyn® wax or Genioplast Silicone or Dow Corning Si Powder Resin, halogen-free, powdered siloxane, Dow Corning 4-7105 or 4-7081 and 82.25% PEI. The pellet master batch was not blended down, but rather was used at 100%. This resulted in an extruded tape that was 39% foamed with an average foamed cell size of 0.0007 inches.

Example 37

PPE

Manufacture of a Pelletized Foamable Composition

A mixture of a non-halogenated resin, namely PPE, talc, and Aclyn® wax or Genioplast Silicone or Dow Corning Si Powder Resin, halogen-free, powdered siloxane, Dow Corning 4-7105 or 4-7081 in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/7.5/92.25 was formed by sequential additions through feeder section of the twin screw extruder. Temperature profile in the melt twin screw extruder was the following (from zone 1 to 11): 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.). The extruder was equipped with a pelletizer to produce pellets to a shape that is preferable for extrusion processes.

Example 38

PPE

Manufacture of a PEI, Wax, and Talc Derivative (Masterbatch Composition)

Aclyn® wax or Genioplast Silicone or Dow Corning Si Powder Resin, halogen-free, powdered siloxane, Dow Corning 4-7105 or 4-7081 commercially available from M. F. Cachat and a talc derivative of chemical composition $Mg_3Si_4O_{10}(OH)$ was melt compounded with a non-halogenated resin, namely PPE, in a weight ratio of Aclyn® wax or Genioplast Silicone or Dow Corning Si Powder Resin, halogen-free, powdered siloxane, Dow Corning 4-7105 or 4-7081/talc/non-halogenated resin 0.25/15.0/84.75, in a twin screw extruder, with the following temperature profile: 475° F., 550° F. (288° C.), 550° F. (288° C.), 550° F. (288° C.), 525° F. (274° C.), 480° F. (249° C.), 525° F. (274° C.), 500° F. (260° C.), 500° F. (260° C.), 500° F. (260° C.), 575° F. (302° C.).

Example 39

PPE

Manufacture of Foamed Articles from a Mixture of Pellets:

Pellets obtained from example 1 or pellets obtained from example 2, blended with PPE at a weight ratio of 50/50, were placed in the hopper of a 24 to 1 ratio high temperature extruder with heat zones 1 through 5 set at the following temperatures 520° F. (321° C.), 540° F. (332° C.), 560° F. (343° C.), 570° F. (349° C.), and 560° F. (343° C.) to form one of several foamed articles including an extruded profile such as used for separators, wire insulation, or jackets for cabling.

The foamed articles were found to possess an outstanding cells structure, with tunable foaming level, and outstanding insulating properties as described in the following example.

Example 40

PPE

A tape cable support-separator was manufactured with a 1.5 inch high temperature extruder using the following materials and conditions;

A tape die with a high compression screw, a line speed of 48 ft./min., with a 4 RPM screw speed and a melt temperature of 536° F. (280° C.) was used. The extruder was loaded with a pellet master batch, the pellet comprising 7.5% talc, 0.25% Aclyn® wax or Genioplast Silicone or Dow Corning Si Powder Resin, halogen-free, powdered siloxane, Dow Corning 4-7105 or 4-7081 and 82.25% PEI. The pellet master batch was not blended down, but rather was used at 100%. This resulted in an extruded tape that was 39% foamed with an average foamed cell size of 0.0007 inches.

The teachings of all patents, published applications and references cited herein are incorporated by reference in their entirety.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

What is claimed is:

1. A support-separator for use in a communications cable, the support separator comprising:
    a foamed polymeric preformed elongate body configured to extend from a proximal end to a distal end, the foamed polymeric elongate body comprising a plurality of channels each configured to receive a transmission medium configured to carry electrical power or telecommunication data, said foamed polymeric preformed elongate body further comprising a plurality of foamed cells, wherein each cell comprises a maximum diameter in range of about 0.0005 inches to about 0.003 inches;
    wherein said foamed polymeric performed elongate body further comprises at least one base polymer selected from a group consisting of polyphenylenesulfide (PPS), polyetherimide (PEI), polysulfone (PSU), polypheylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polypropylene (PP), cyclic olefin copolymer (COC), polycarbonate (PC), polyphenylene ether (PPE), liquid crystal polymer (LCP), or combinations thereof.

2. The support-separator of claim 1, wherein the transmission medium received by at least one of the plurality of channels comprises an electrical conductor and wherein the electrical conductor comprises a twisted pair of wires conductor.

3. The support-separator of claim 2, wherein the twisted pair of wires conductor is configured to carry about 10 watts to about 50 watts of electrical power.

4. The support-separator of claim 2, wherein each wire of the twisted pair of wires comprises an AWG in a range of about 22 to about 26.

5. The support-separator of claim 1, wherein the plurality of channels comprise at least five channels and the transmission medium received by each channel comprises one of an electrical conductor or an optical fiber cable.

6. The support-separator of claim 5, wherein the transmission medium received by each of at least four of the at least five channels comprises an electrical conductor and the transmission medium received by at least one of the at least five channels comprises an optical fiber cable.

7. The support-separator of claim 6, wherein the electrical conductor is configured to carry about 10 watts to about 50 watts of electrical power.

8. The support-separator of claim 1, further comprising a central channel configured to receive at least one of a fiber optic cable or a copper conductor.

9. The support-separator of claim 1, wherein said foamed polymeric preformed elongate body further comprises a plurality of electrically conductive elements distributed in said at least one base polymer.

10. The support-separator of claim 9, wherein said electrically conductive elements comprise a metal, a metal oxide, a carbon nanotube, a carbon fiber, a nickel coated carbon fiber, a single or a multi-wall graphene, a copper fiber, or a $C_{60}$ fullerene.

11. The support-separator of claim 10, wherein said metal comprises silver, aluminum, copper, gold, bronze, tin, zinc, iron, nickel, indium, gallium, stainless steel metal, or a combination thereof.

12. The support-separator of claim 10, wherein said metal oxide comprises copper oxide, bronze oxide, tin oxide, zinc oxide, zinc-doped indium oxide, indium tin oxide, nickel oxide, aluminum oxide, or a combination thereof.

13. The support-separator of claim 9, wherein a weight ratio of the electrically conductive elements to the at least one base polymer is in a range of about 1% to about 30%.

14. The support-separator of claim 1, wherein said foamed polymeric preformed elongate is configured to exhibit a foaming level in a range of about 20% to about 60%.

15. The support-separator of claim 1, wherein said foamed polymeric preformed elongate body comprises a tensile strength of about 2,500 psi to about 10,000 psi.

16. The support-separator of claim 1, wherein said foamed polymeric preformed elongate body comprises a specific gravity of about 1.10 to about 1.30.

17. The support-separator of claim 1, wherein the at least one base polymer comprises a substantially halogen-free polymer.

18. The support-separator of claim 1, wherein greater than 50% of said plurality of foamed cells exhibit a closed structure.

19. The support-separator of claim 1, wherein greater than 60% of said plurality of foamed cells exhibit a closed structure.

20. The support-separator of claim 1, wherein greater than 70% of said plurality of foamed cells exhibit a closed structure.

21. The support-separator of claim 1, wherein greater than 80% of said plurality of foamed cells exhibit a closed structure.

22. The support-separator of claim 1, wherein greater than 90% of said plurality of foamed cells exhibit a closed structure.

23. The support-separator of claim 1, further comprising a flame retardant additive distributed within said support-separator.

* * * * *